US012684004B2

(12) United States Patent
Jeyakumar et al.

(10) Patent No.: US 12,684,004 B2
(45) Date of Patent: Jul. 14, 2026

(54) APPROACHES TO DOCUMENTING AND VISUALIZING INDICATIONS OF RISK DISCOVERED THROUGH AN ANALYSIS OF DIGITAL ACTIVITIES PERFORMED ACROSS DIFFERENT SERVICES AND USING THE SAME FOR DETECTING THREATS

(71) Applicant: Abnormal Security Corporation, San Francisco, CA (US)

(72) Inventors: Sanjay Jeyakumar, Oakland, CA (US);
Abhijit Bagri, Oakland, CA (US);
David Hagar, London (GB); Tanooj Parekh, Mountain View, CA (US);
Sanish Mahadik, Fremont, CA (US);
Cheng-Lin Yeh, San Mateo, CA (US);
Yingkai Gao, Brooklyn, NY (US);
Thomas Dawes, Northamptonshire (GB); Lucas Sonnabend, London (GB); Tejas Khot, Seattle, WA (US)

(73) Assignee: ABNORMAL AI, INC., San Francisco, CA (US)

( * ) Notice: Subject to any disclaimer, the term of this patent is extended or adjusted under 35 U.S.C. 154(b) by 0 days.

(21) Appl. No.: 18/645,183

(22) Filed: Apr. 24, 2024

(65) Prior Publication Data

US 2024/0354680 A1     Oct. 24, 2024

Related U.S. Application Data

(60) Provisional application No. 63/497,889, filed on Apr. 24, 2023.

(51) Int. Cl.
*H04L 9/40*          (2022.01)
*G06N 3/02*          (2006.01)
(Continued)

(52) U.S. Cl.
CPC ........... *H04L 63/1433* (2013.01); *G06N 3/02* (2013.01); *G06Q 10/0635* (2013.01);
(Continued)

(58) Field of Classification Search
CPC .............. H04L 63/1433; H04L 67/535; H04L 63/1416; H04L 63/1425; H04L 63/1441; G06N 3/02; G06Q 10/0635
(Continued)

(56) References Cited

U.S. PATENT DOCUMENTS 11,178,010 B2 * 11/2021 Kozhaya .................. G06N 5/04
11,423,281 B2 * 8/2022 De Magalhaes ....... G06N 20/00
(Continued)

FOREIGN PATENT DOCUMENTS

EP          3528458 A1    8/2019

*Primary Examiner* — Liang Che A Wang
(74) *Attorney, Agent, or Firm* — Perkins Coie LLP; Andrew T. Pettit

(57)          ABSTRACT

Introduced here is a network-accessible platform (or simply "platform") that is designed to monitor digital activities that are performed across different services to ascertain, in real time, threats to the security of an enterprise. In order to surface insights into the threats posed to an enterprise, the platform can apply machine learning models to data that is representative of digital activities performed on different services with respective accounts. Each model may be trained to understand what constitutes normal behavior for a corresponding employee with respect to a single service or multiple services. Not only can these models be autonomously trained for the employees of the enterprise, but they can also be autonomously applied to detect, characterize, and catalog those digital activities that are indicative of a threat.

13 Claims, 35 Drawing Sheets

(51) Int. Cl.
  G06Q 10/0635 (2023.01)
  H04L 67/50 (2022.01)

(52) U.S. Cl.
  CPC ...... H04L 63/1416 (2013.01); H04L 63/1425
    (2013.01); H04L 63/1441 (2013.01); H04L
    67/535 (2022.05)

(58) Field of Classification Search
  USPC .......................................................... 726/23
  See application file for complete search history.

(56)                References Cited

U.S. PATENT DOCUMENTS

| | | | |
|---|---|---|---|
| 12,099,515 B1 * | 9/2024 | Azam ................. | G06F 16/2477 |
| 12,105,801 B2 * | 10/2024 | Garchery .............. | G06F 21/316 |
| 12,265,459 B1 * | 4/2025 | Ross ..................... | G06F 11/076 |
| 2017/0032015 A1 * | 2/2017 | Shkapenyuk ......... | G06F 16/283 |
| 2018/0129900 A1 * | 5/2018 | Kiraly ................... | G06V 10/95 |
| 2019/0260794 A1 | 8/2019 | Woodford et al. | |
| 2021/0056489 A1 * | 2/2021 | Wright ................... | G06Q 10/10 |
| 2021/0273957 A1 * | 9/2021 | Boyer .................. | H04L 67/141 |
| 2021/0273973 A1 * | 9/2021 | Boyer ................ | H04L 63/1416 |
| 2022/0230094 A1 * | 7/2022 | Panitsas ............. | G06F 11/3447 |

* cited by examiner

FIG. 3

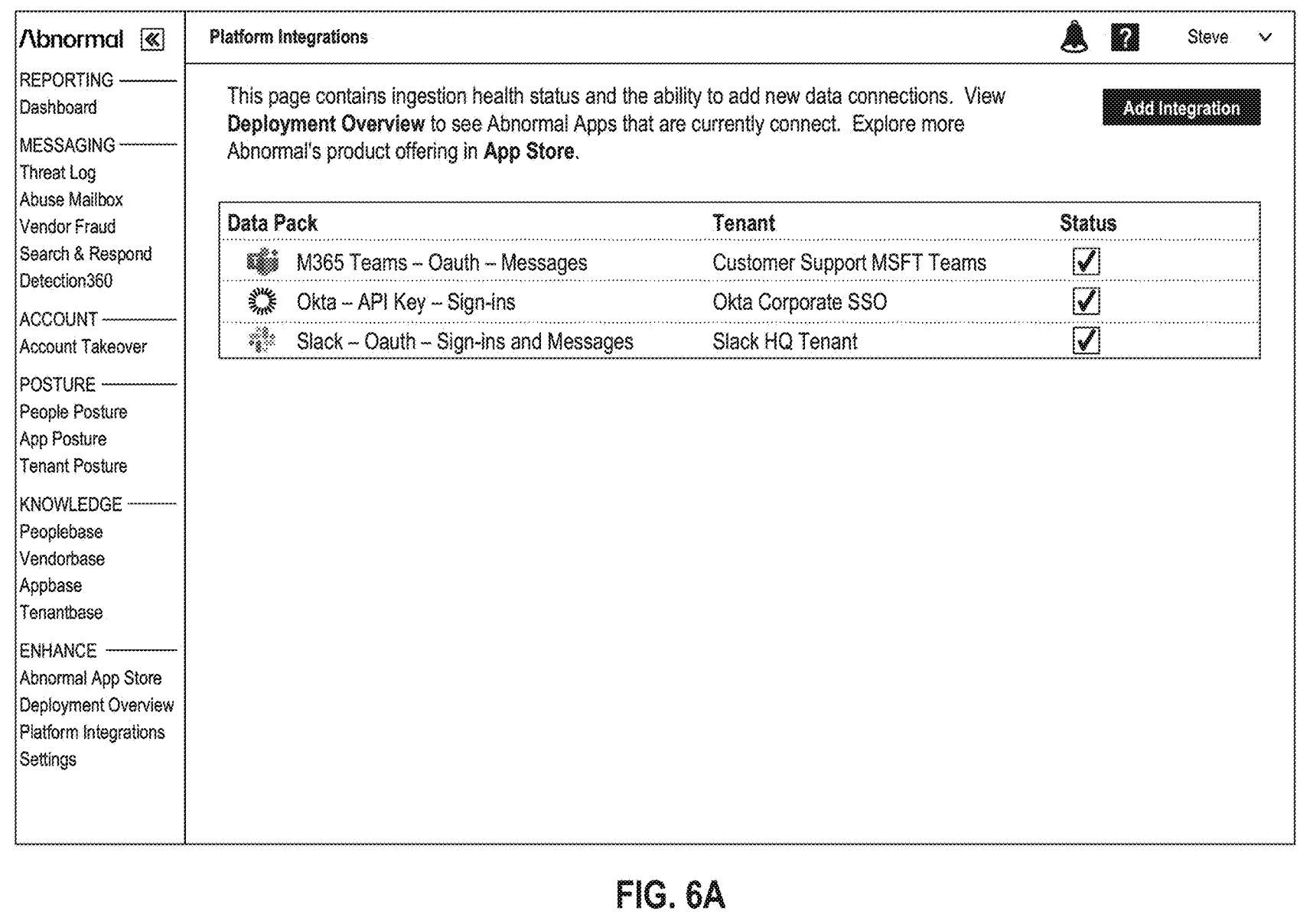

Platform Integrations

This page contains ingestion health status and the ability to add new data connections. View Deployment Overview to see Abnormal Apps that are currently connect. Explore more Abnormal's product offering in App Store.

Steve ⌄

Add Integration

| Data Pack | Tenant | Status |
|---|---|---|
| M365 Teams – Oauth – Messages | Customer Support MSFT Teams | ✓ |
| Okta – API Key – Sign-ins | Okta Corporate SSO | ✓ |
| Slack – Oauth – Sign-ins and Messages | Slack HQ Tenant | ✓ |

Abnormal ⊯

REPORTING ———
Dashboard
MESSAGING ———
Threat Log
Abuse Mailbox
Vendor Fraud
Search & Respond
Detection360
ACCOUNT ———
Account Takeover
POSTURE ———
People Posture
App Posture
Tenant Posture
KNOWLEDGE ———
Peoplebase
Vendorbase
Appbase
Tenantbase
ENHANCE ———
Abnormal App Store
Deployment Overview
Platform Integrations
Settings

FIG. 6A

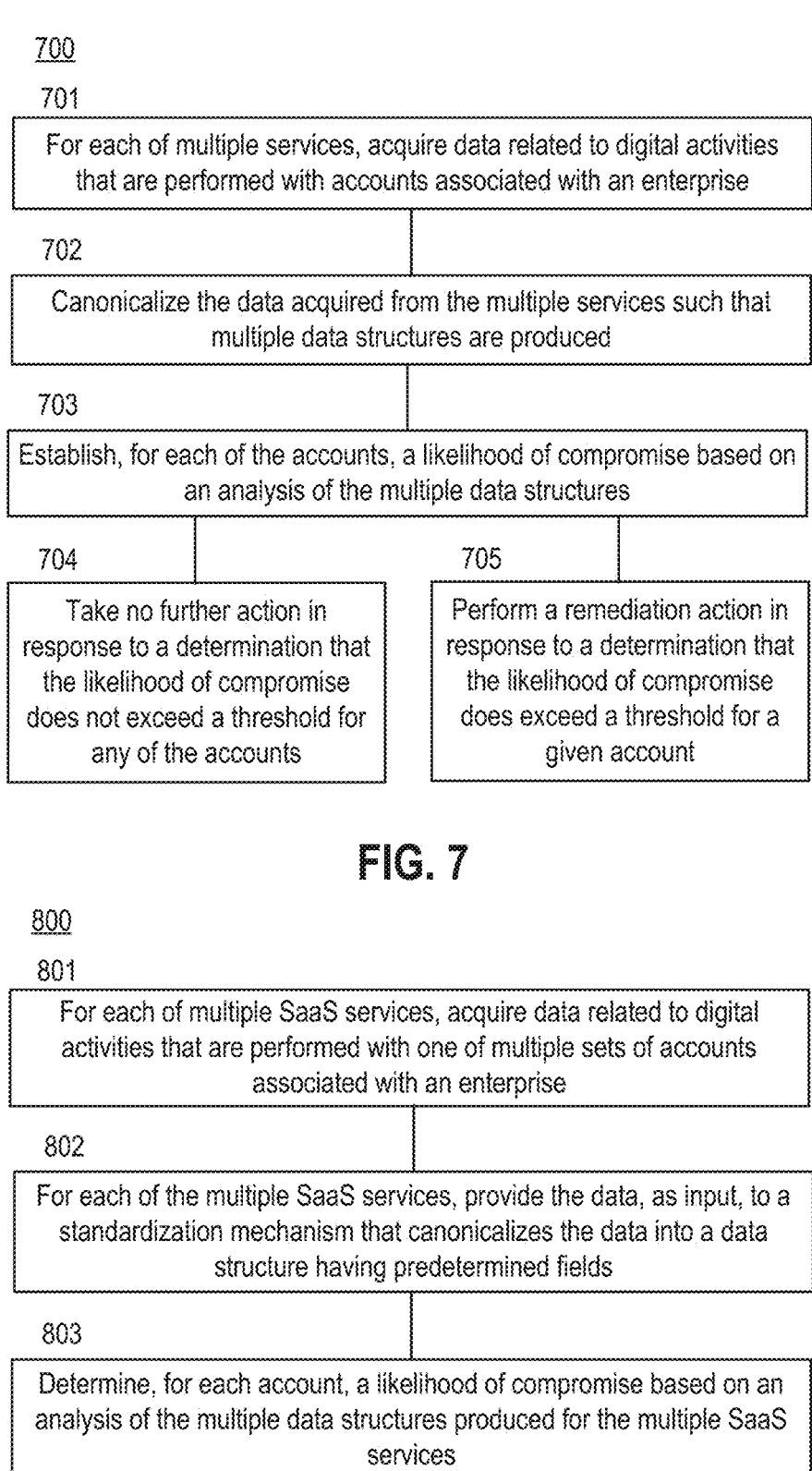

700

701

For each of multiple services, acquire data related to digital activities that are performed with accounts associated with an enterprise

702

Canonicalize the data acquired from the multiple services such that multiple data structures are produced

703

Establish, for each of the accounts, a likelihood of compromise based on an analysis of the multiple data structures

704

Take no further action in response to a determination that the likelihood of compromise does not exceed a threshold for any of the accounts

705

Perform a remediation action in response to a determination that the likelihood of compromise does exceed a threshold for a given account

For each of multiple SaaS services, acquire data related to digital activities that are performed with one of multiple sets of accounts associated with an enterprise

802

For each of the multiple SaaS services, provide the data, as input, to a standardization mechanism that canonicalizes the data into a data structure having predetermined fields

803

Determine, for each account, a likelihood of compromise based on an analysis of the multiple data structures produced for the multiple SaaS services

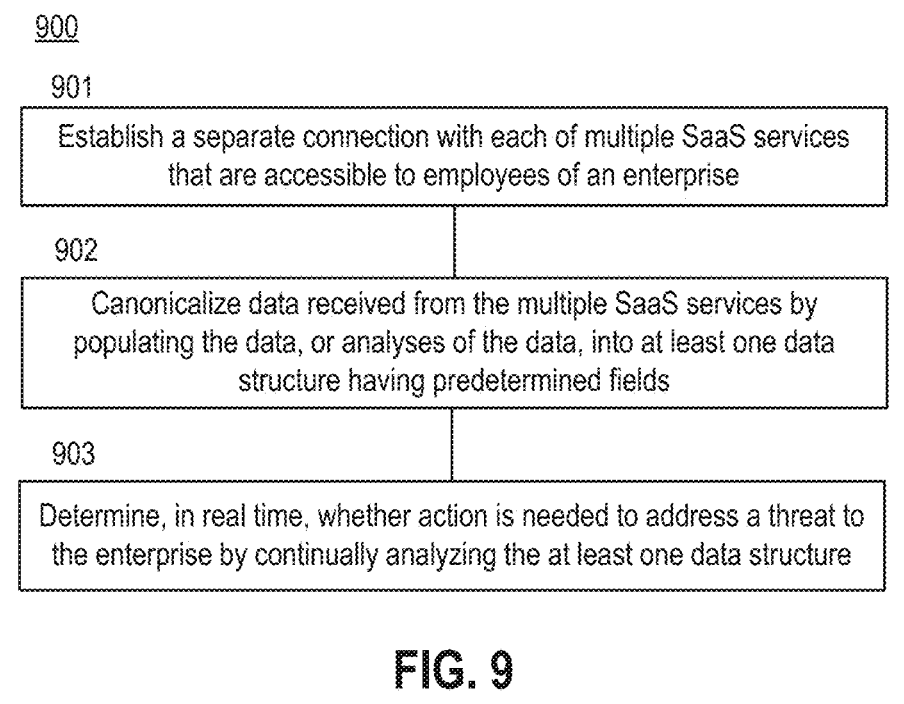

Establish a separate connection with each of multiple SaaS services that are accessible to employees of an enterprise

902

Canonicalize data received from the multiple SaaS services by populating the data, or analyses of the data, into at least one data structure having predetermined fields

903

Determine, in real time, whether action is needed to address a threat to the enterprise by continually analyzing the at least one data structure

FIG. 9

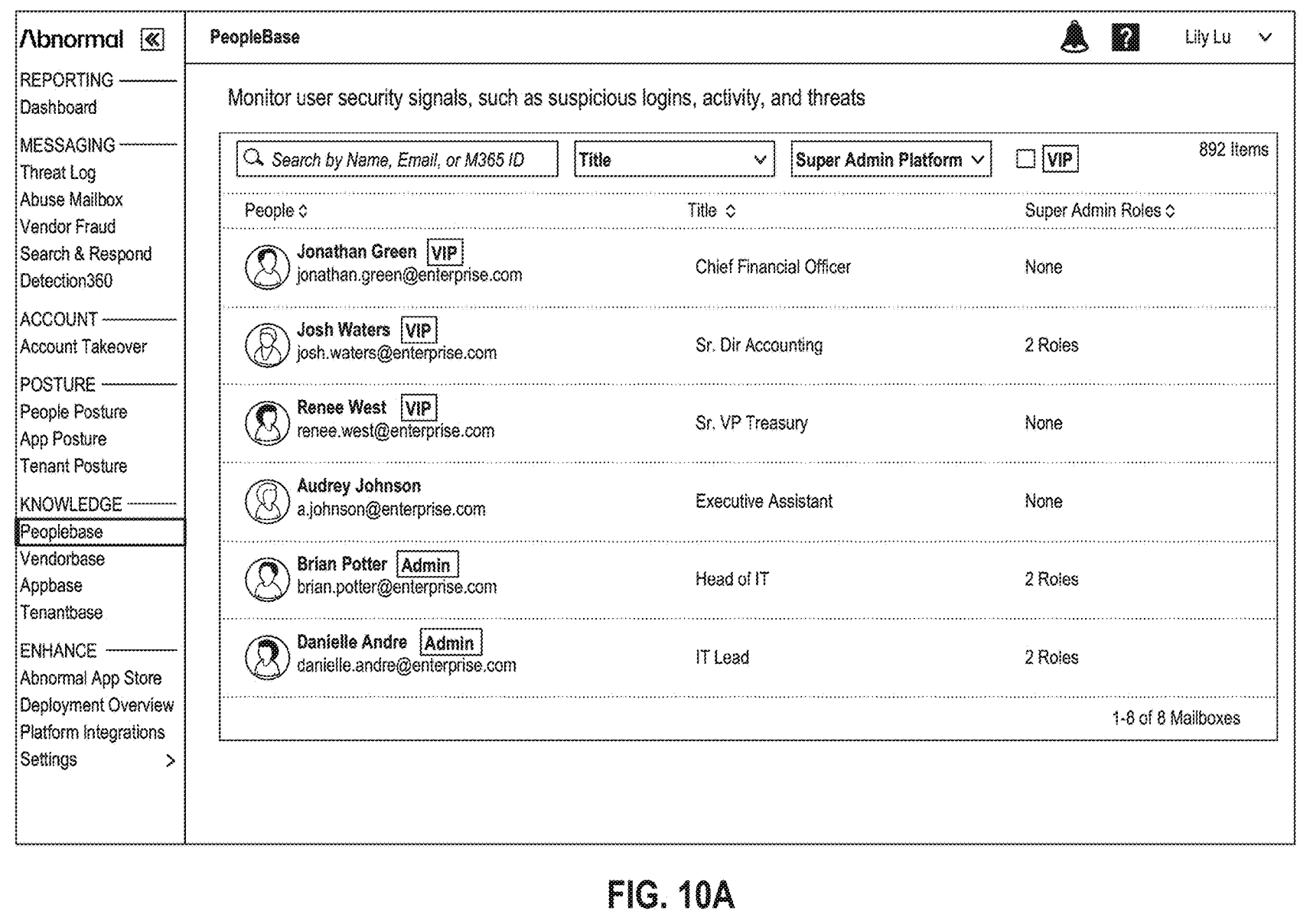

Abnormal ≪

REPORTING
Dashboard

MESSAGING
Threat Log
Abuse Mailbox
Vendor Fraud
Search & Respond
Detection360

ACCOUNT
Account Takeover

POSTURE
People Posture
App Posture
Tenant Posture

KNOWLEDGE
Peoplebase
Vendorbase
Appbase
Tenantbase

ENHANCE
Abnormal App Store
Deployment Overview
Platform Integrations
Settings   ⌄

PeopleBase     🔔   👤    Lily Lu ⌄

Monitor user security signals, such as suspicious logins, activity, and threats

🔍 Search by Name, Email, or M365 ID    | Title   ⌄ |    | Super Admin Platform ⌄ |    □ VIP    892 Items

| People ◇ | Title ◇ | Super Admin Roles ◇ |
|---|---|---|
| Jonathan Green [VIP]<br>jonathan.green@enterprise.com | Chief Financial Officer | None |
| Josh Waters [VIP]<br>josh.waters@enterprise.com | Sr. Dir Accounting | 2 Roles |
| Renee West [VIP]<br>renee.west@enterprise.com | Sr. VP Treasury | None |
| Audrey Johnson<br>a.johnson@enterprise.com | Executive Assistant | None |
| Brian Potter [Admin]<br>brian.potter@enterprise.com | Head of IT | 2 Roles |
| Danielle Andre [Admin]<br>danielle.andre@enterprise.com | IT Lead | 2 Roles |

1-6 of 8 Mailboxes

FIG. 10A

Figure 10B:
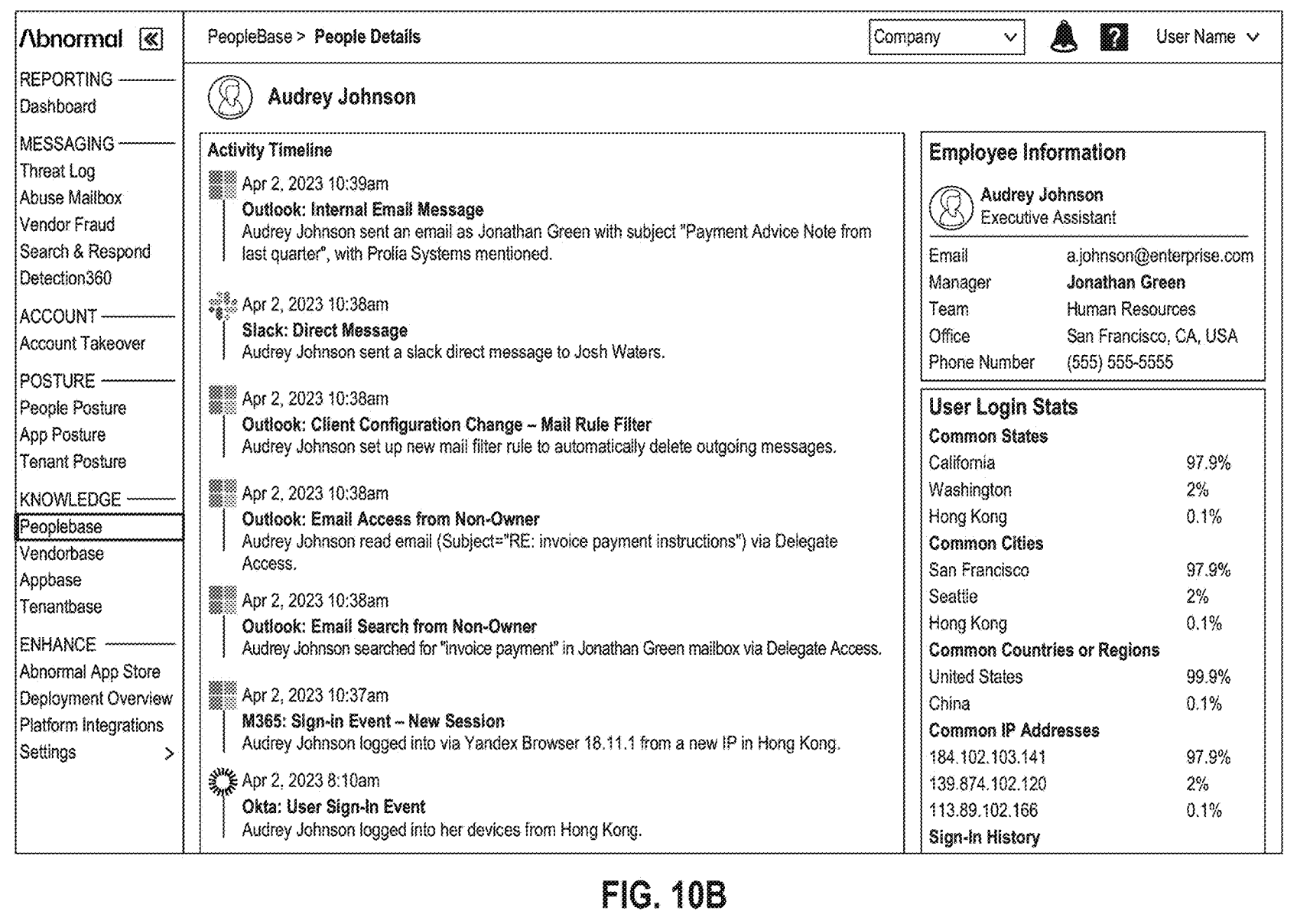

Company ∨    🔔  👤²    User Name ∨

PeopleBase > People Details

Audrey Johnson

REPORTING
Dashboard

MESSAGING
Threat Log
Abuse Mailbox
Vendor Fraud
Search & Respond
Detection360

ACCOUNT
Account Takeover

POSTURE
People Posture
App Posture
Tenant Posture

KNOWLEDGE
Peoplebase
Vendorbase
Appbase
Tenantbase

ENHANCE
Abnormal App Store
Deployment Overview
Platform Integrations
Settings ∧

Activity Timeline

Apr 2, 2023 10:39am
Outlook: Internal Email Message
Audrey Johnson sent an email as Jonathan Green with subject "Payment Advice Note from last quarter", with Profia Systems mentioned.

Apr 2, 2023 10:38am
Slack: Direct Message
Audrey Johnson sent a slack direct message to Josh Waters.

Apr 2, 2023 10:38am
Outlook: Client Configuration Change – Mail Rule Filter
Audrey Johnson set up new mail filter rule to automatically delete outgoing messages.

Apr 2, 2023 10:38am
Outlook: Email Access from Non-Owner
Audrey Johnson read email (Subject="RE: invoice payment instructions") via Delegate Access.

Apr 2, 2023 10:38am
Outlook: Email Search from Non-Owner
Audrey Johnson searched for "invoice payment" in Jonathan Green mailbox via Delegate Access.

Apr 2, 2023 10:37am
M365: Sign-in Event – New Session
Audrey Johnson logged into via Yandex Browser 18.11.1 from a new IP in Hong Kong.

Apr 2, 2023 8:10am
Okta: User Sign-In Event
Audrey Johnson logged into her devices from Hong Kong.

Employee Information

Audrey Johnson
Executive Assistant

| | |
|---|---|
| Email | a.johnson@enterprise.com |
| Manager | Jonathan Green |
| Team | Human Resources |
| Office | San Francisco, CA, USA |
| Phone Number | (555) 555-5555 |

User Login Stats

Common States
California          97.9%
Washington          2%
Hong Kong           0.1%

Common Cities
San Francisco       97.9%
Seattle             2%
Hong Kong           0.1%

Common Countries or Regions
United States       99.9%
China               0.1%

Common IP Addresses
184.102.103.141     97.9%
139.874.102.120     2%
113.89.102.156      0.1%

Sign-In History

Figure 11:
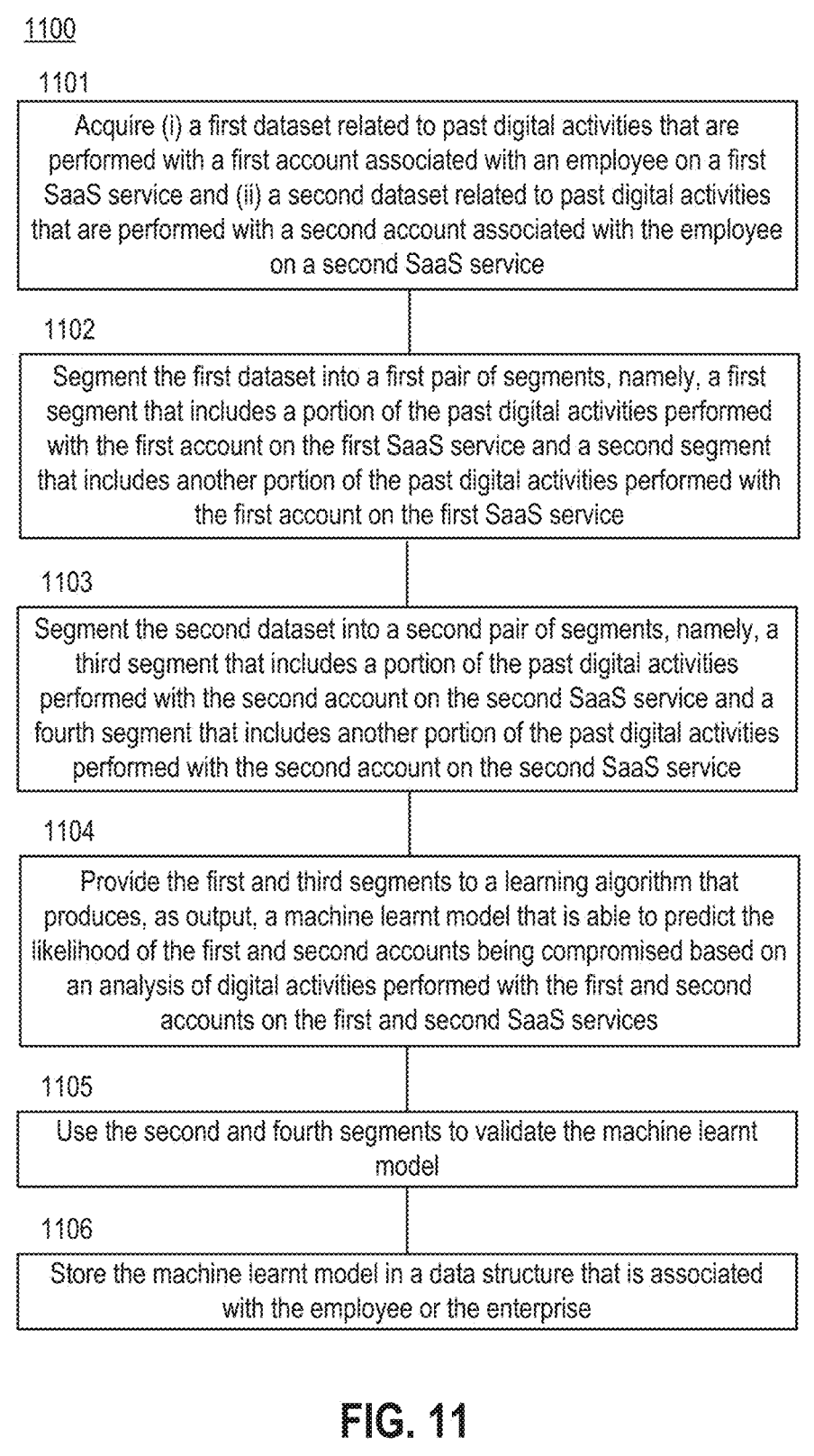

Acquire (i) a first dataset related to past digital activities that are performed with a first account associated with an employee on a first SaaS service and (ii) a second dataset related to past digital activities that are performed with a second account associated with the employee on a second SaaS service

1102

Segment the first dataset into a first pair of segments, namely, a first segment that includes a portion of the past digital activities performed with the first account on the first SaaS service and a second segment that includes another portion of the past digital activities performed with the first account on the first SaaS service

1103

Segment the second dataset into a second pair of segments, namely, a third segment that includes a portion of the past digital activities performed with the second account on the second SaaS service and a fourth segment that includes another portion of the past digital activities performed with the second account on the second SaaS service

1104

Provide the first and third segments to a learning algorithm that produces, as output, a machine learnt model that is able to predict the likelihood of the first and second accounts being compromised based on an analysis of digital activities performed with the first and second accounts on the first and second SaaS services

1105

Use the second and fourth segments to validate the machine learnt model

1106

Store the machine learnt model in a data structure that is associated with the employee or the enterprise

For each of multiple SaaS services that are accessible to an employee, acquire data that is related to past activities performed with one of multiple accounts that are associated with the employee

1202

Provide the data, as input, to a standardization mechanism that canonicalizes the data into at least one data structure having predetermined fields

1203

Train a neural network using the at least one data structure, such that the neural network learns what constitutes normal activity for the employee on each of the multiple SaaS services separately and across the multiple SaaS services collectively

FIG. 12

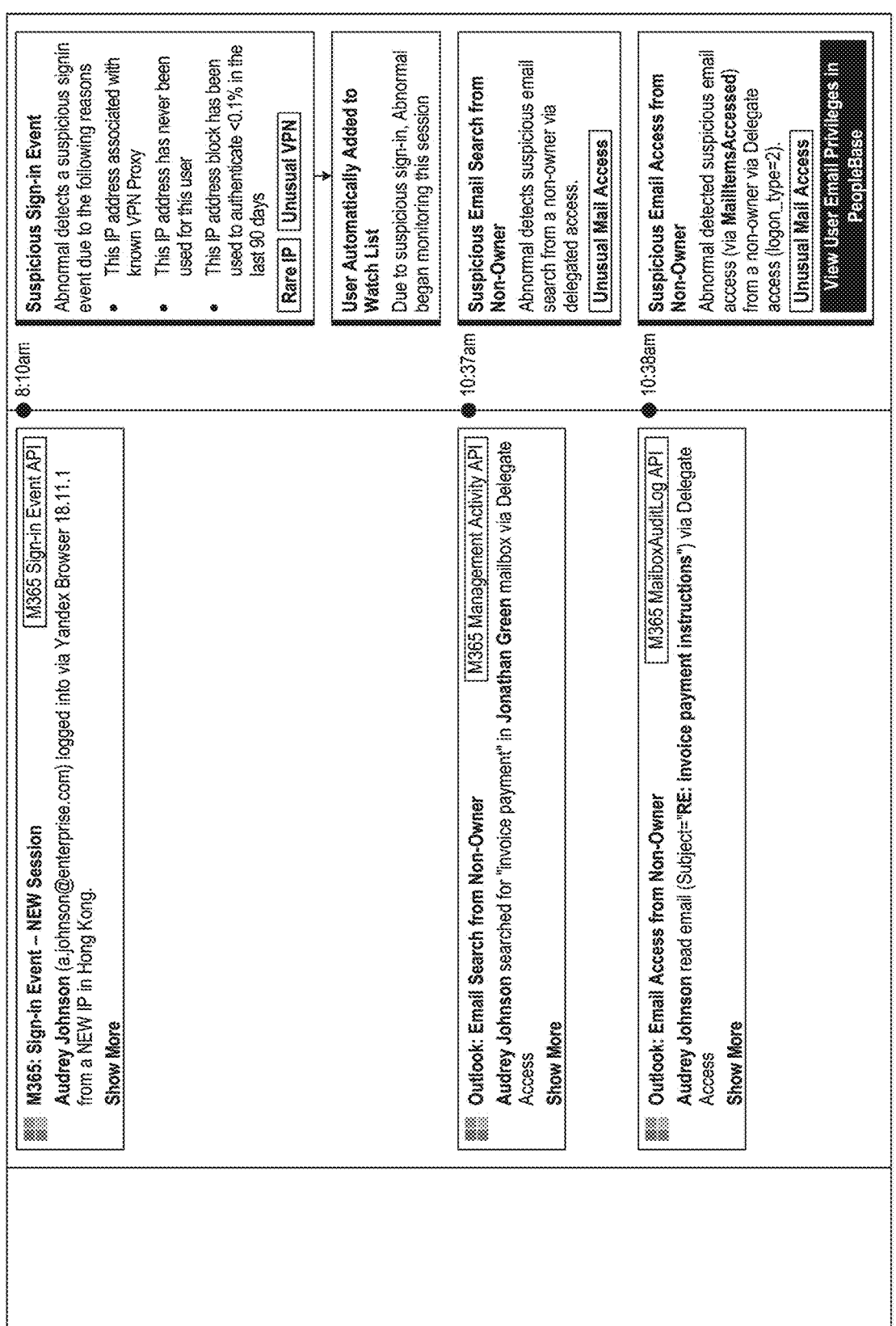
FIG. 13, CONT.

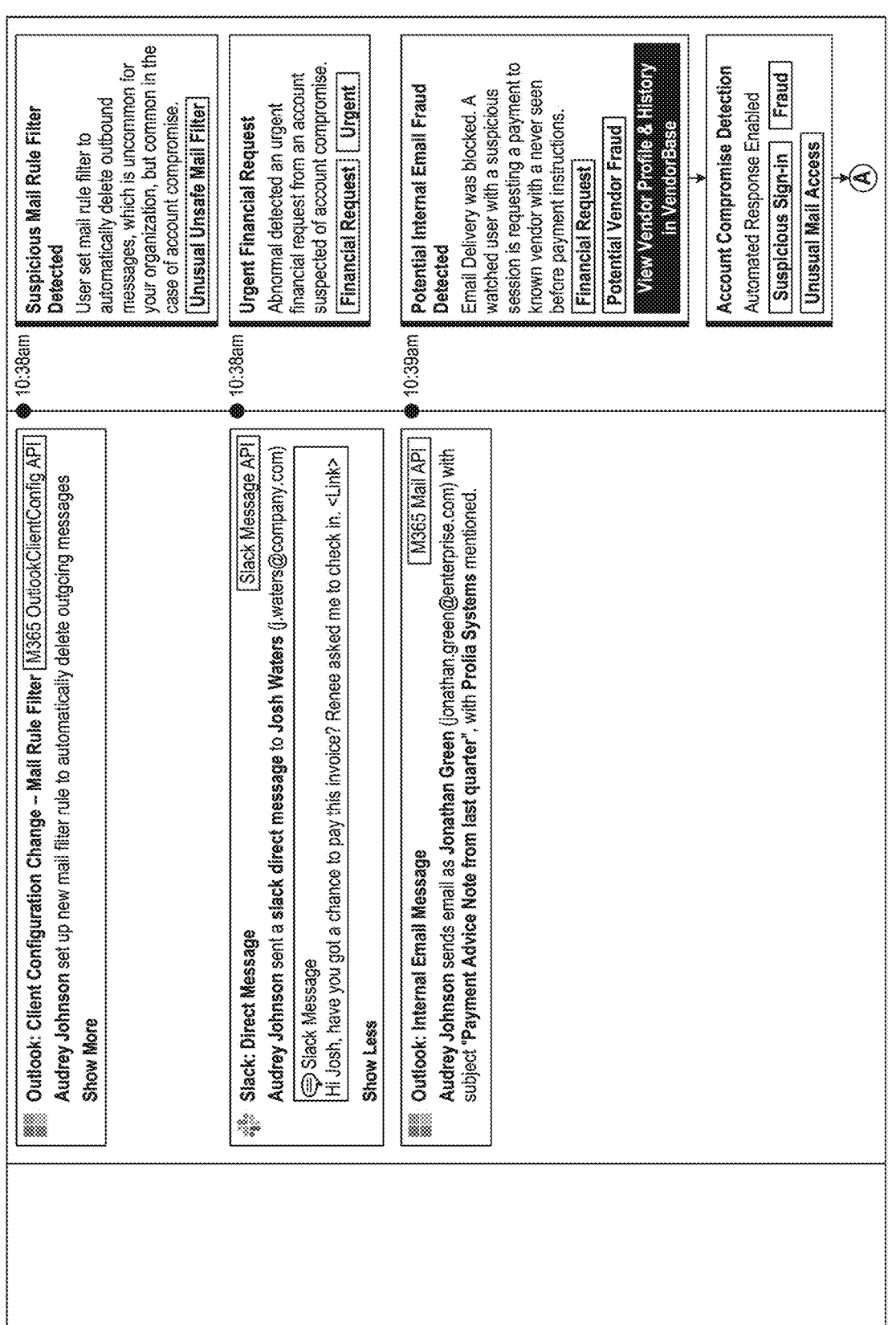
FIG. 13, CONT.

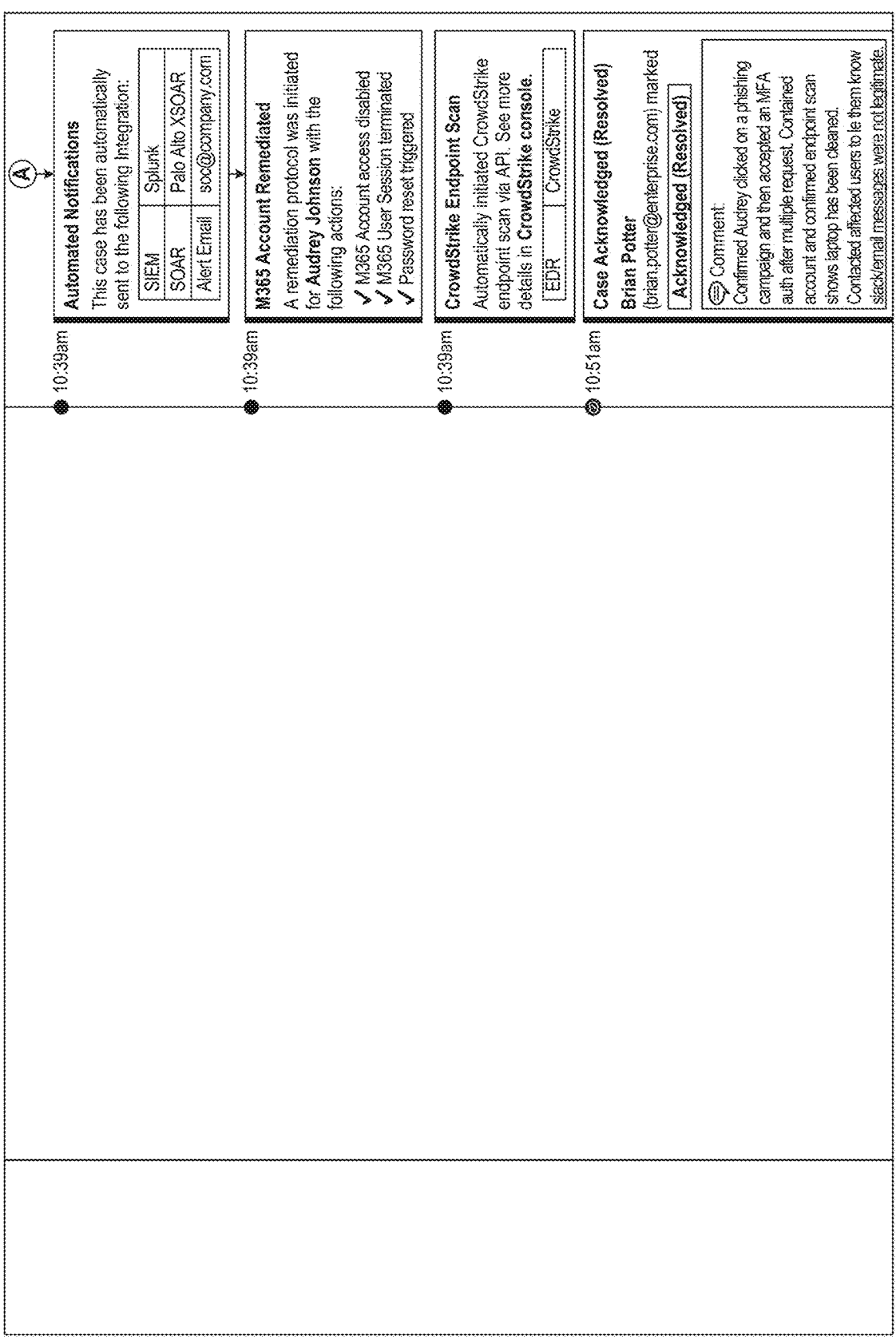
FIG. 13, CONT.

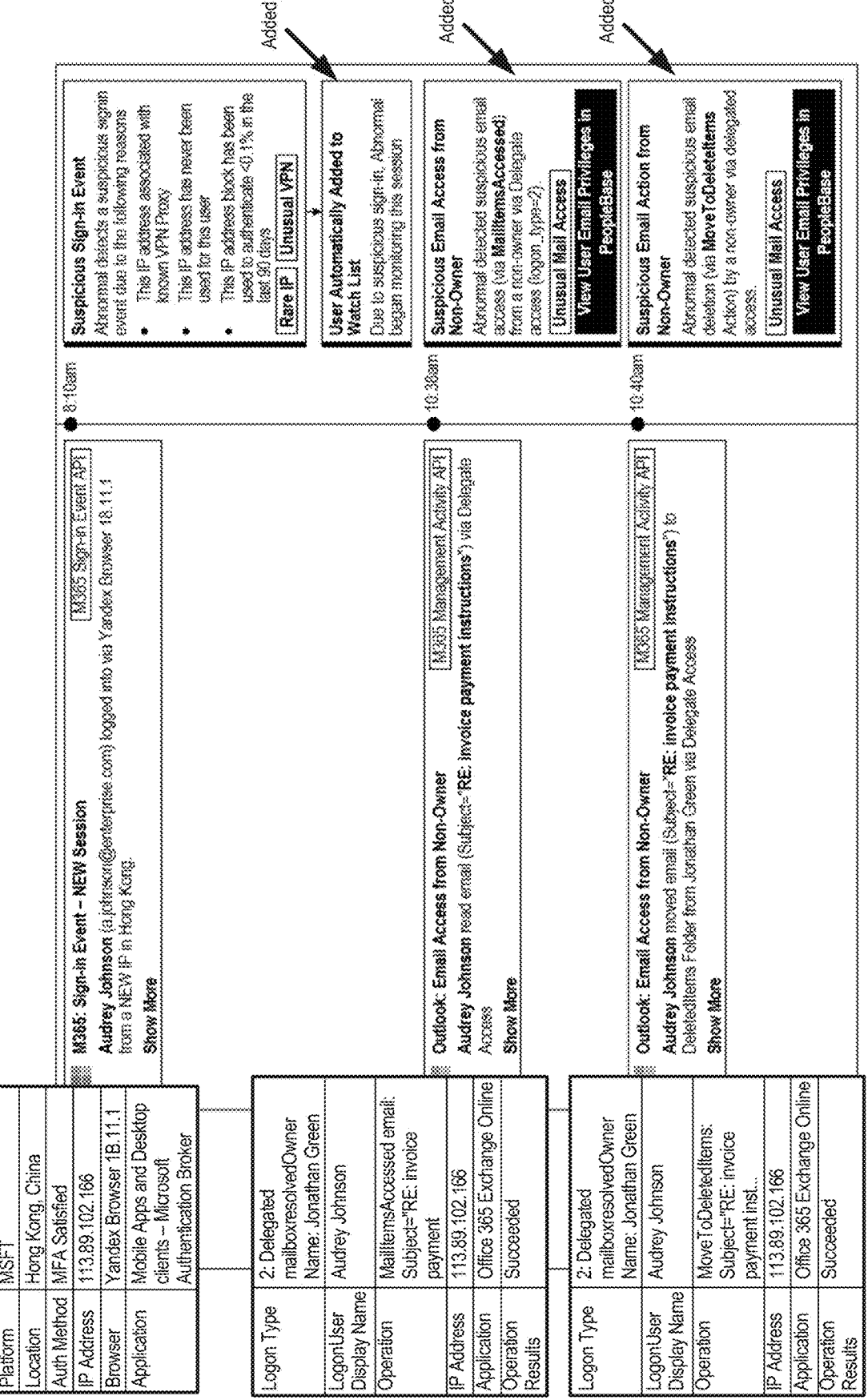
FIG. 14, CONT.

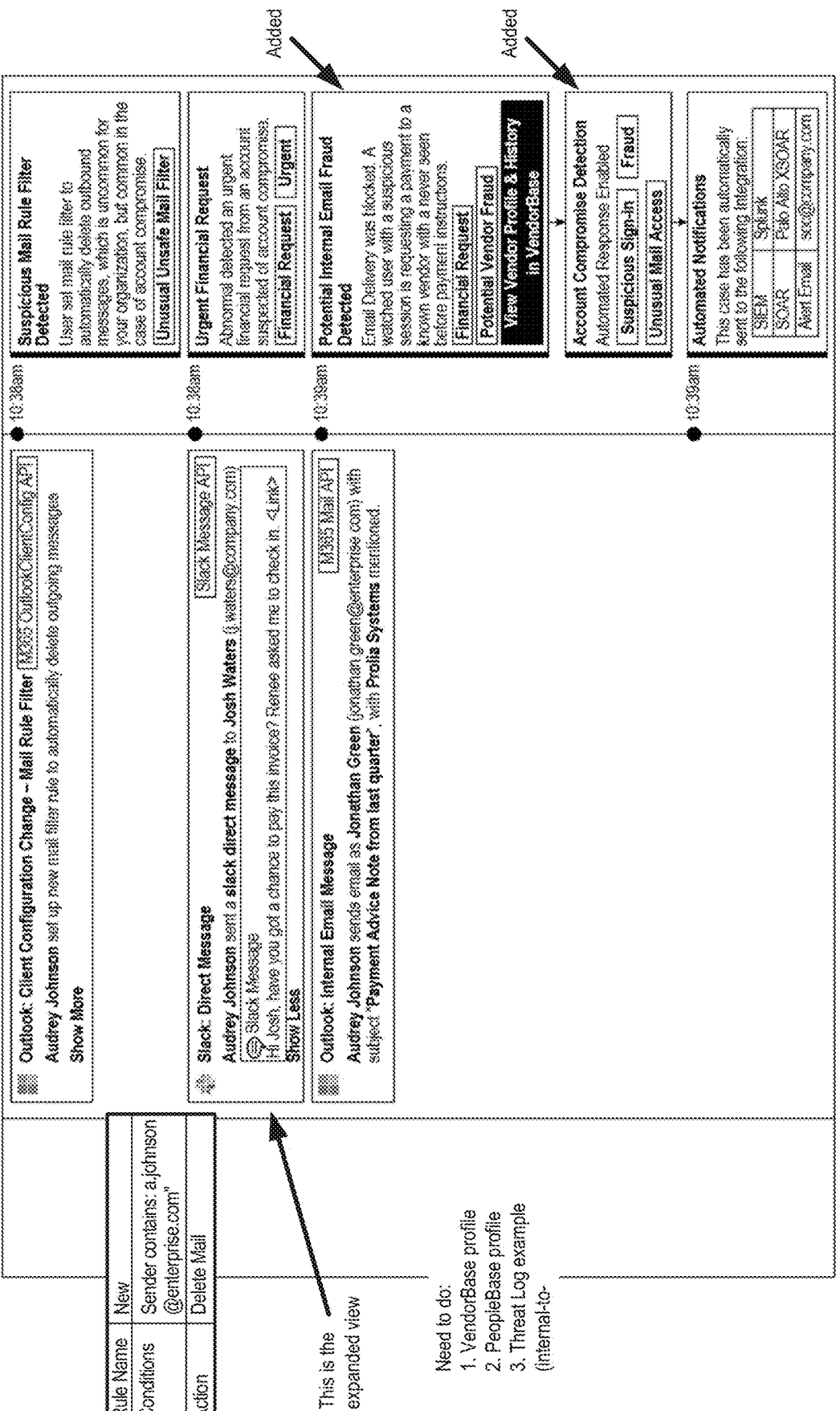
FIG. 14, CONT.

Abnormal ≪

REPORTING
Dashboard

MESSAGING
Threat Log
Search & Respond
Vendor Fraud

ACCOUNT
Abnormal Cases

SECURITY POSTURE
App Posture
People Posture
Tenant Posture

KNOWLEDGE
Appbase
Peoplebase
Tenantbase
Vendorbase

BUILD
Upgrade Abnormal
Deploy Products
Data Inspection
Settings ∧

People Security Posture

[Company ⌄]    🔔    ⚠    🔲    User Name ⌄

Review and manage changes to applications enabled in your environment.

[ To Review (7) ]  All Changes

| Target | Posture Category | Event Type | Tenant ⓘ | Modified On | Actor | Details | Action |
|---|---|---|---|---|---|---|---|
| danielle.andre@enterprise.com | [Workspace Owner] | Deleted | ⊹ Enterprise Corp | 10 minutes ago Mar 2, 11:14am | Brian Potter brian.potter@en... | View Changes | [Acknowledge] |
| danielle.andre@enterprise.com | [Super Admin] | Added | ◉ Enterprise | 1 day ago Nov 1, 10:45am | Brian Potter brian.potter@en... | View Changes | [Acknowledge] |
| brian.potter@enterprise.com | [Password Admin] | Changed | ▦ Enterprise — Main | 1 day ago Nov 1, 10:45am | Brian Potter brian.potter@en... | View Changes | [Acknowledge] |
| brian.potter@enterprise.com | [Super Admin] | Added | G Enterprise — Main | 1 day ago Nov 1, 10:45am | Brian Potter brian.potter@en... | View Changes | [Acknowledge] |
| brian.potter@enterprise.com | [Super Admin] | Deleted | ⊹ Enterprise | 1 day ago Nov 1, 10:45am | Danielle Andre danielle.andre@... | View Changes | [Acknowledge] |
| brian.potter@enterprise.com | [Super Admin] | Added | ⊹ Enterprise | 1 day ago Nov 1, 10:45am | Danielle Andre danielle.andre@... | View Changes | [Acknowledge] |

1-6 of 6 items

FIG. 15

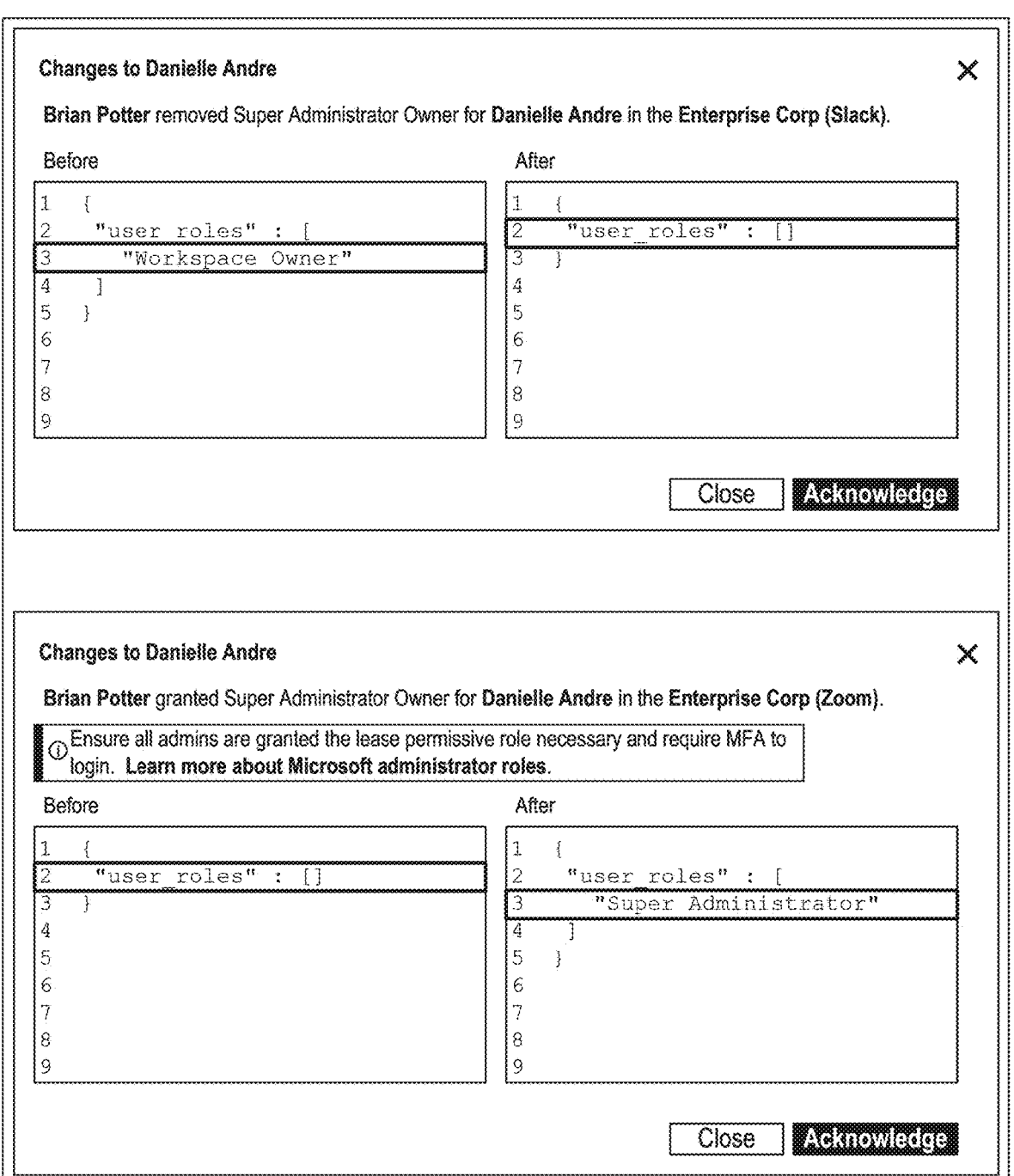
FIG. 15, CONT.

FIG. 16

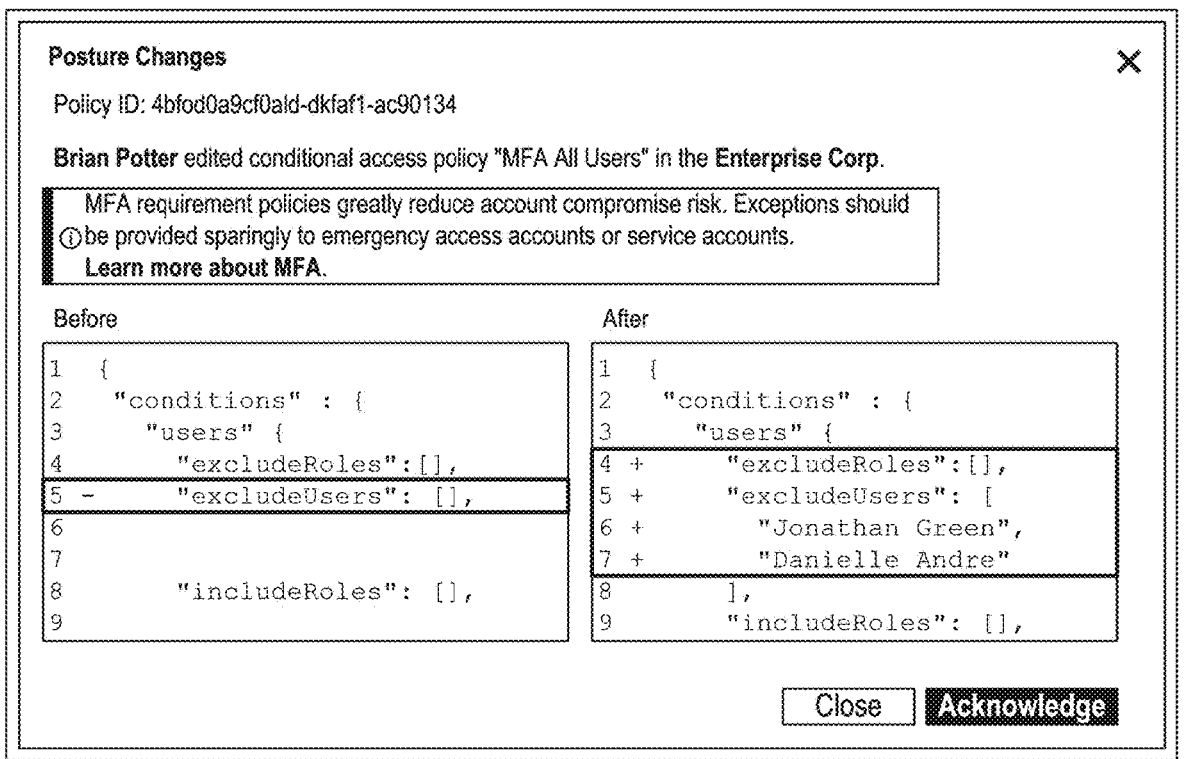
FIG. 16, CONT.

FIG. 17

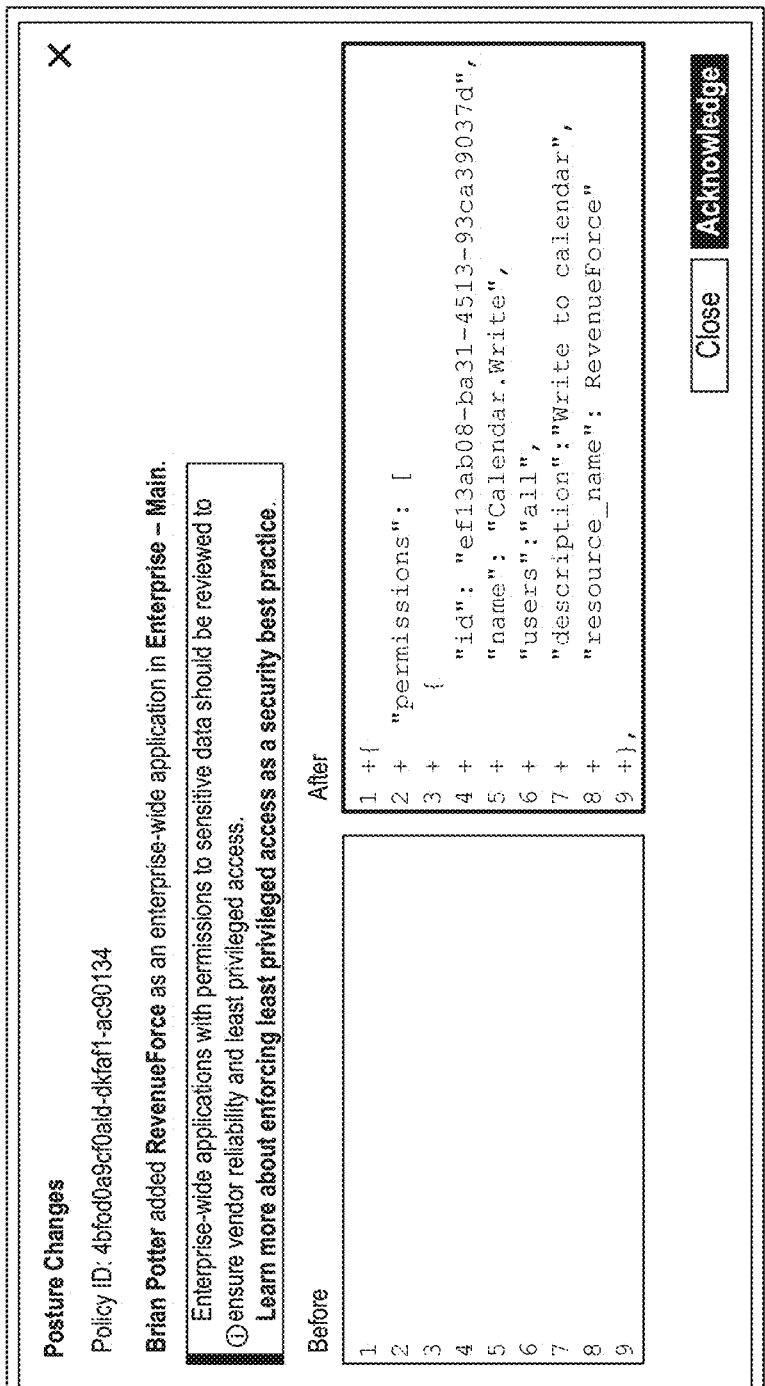
FIG. 17, CONT.

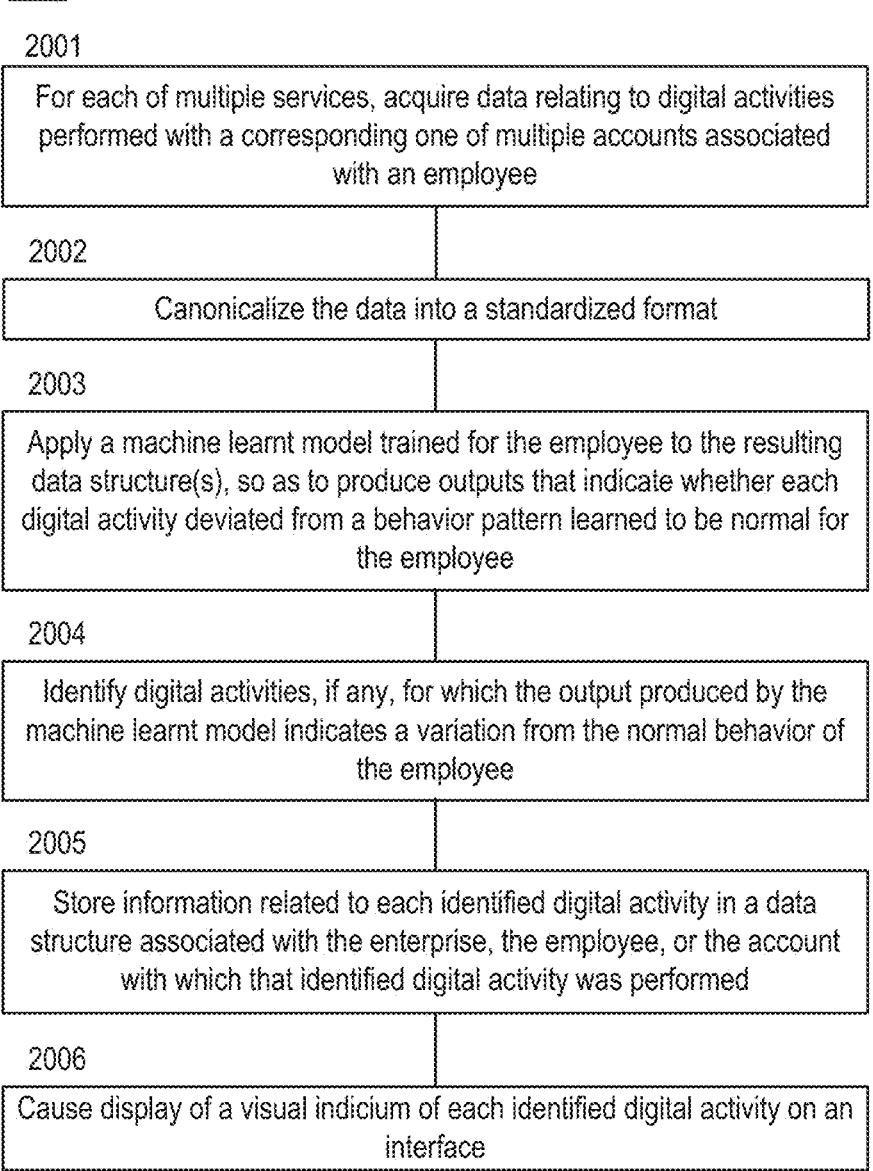

2000

2001

For each of multiple services, acquire data relating to digital activities performed with a corresponding one of multiple accounts associated with an employee

2002

Canonicalize the data into a standardized format

2003

Apply a machine learnt model trained for the employee to the resulting data structure(s), so as to produce outputs that indicate whether each digital activity deviated from a behavior pattern learned to be normal for the employee

2004

Identify digital activities, if any, for which the output produced by the machine learnt model indicates a variation from the normal behavior of the employee

2005

Store information related to each identified digital activity in a data structure associated with the enterprise, the employee, or the account with which that identified digital activity was performed

2006

Cause display of a visual indicium of each identified digital activity on an interface

Figure 21:
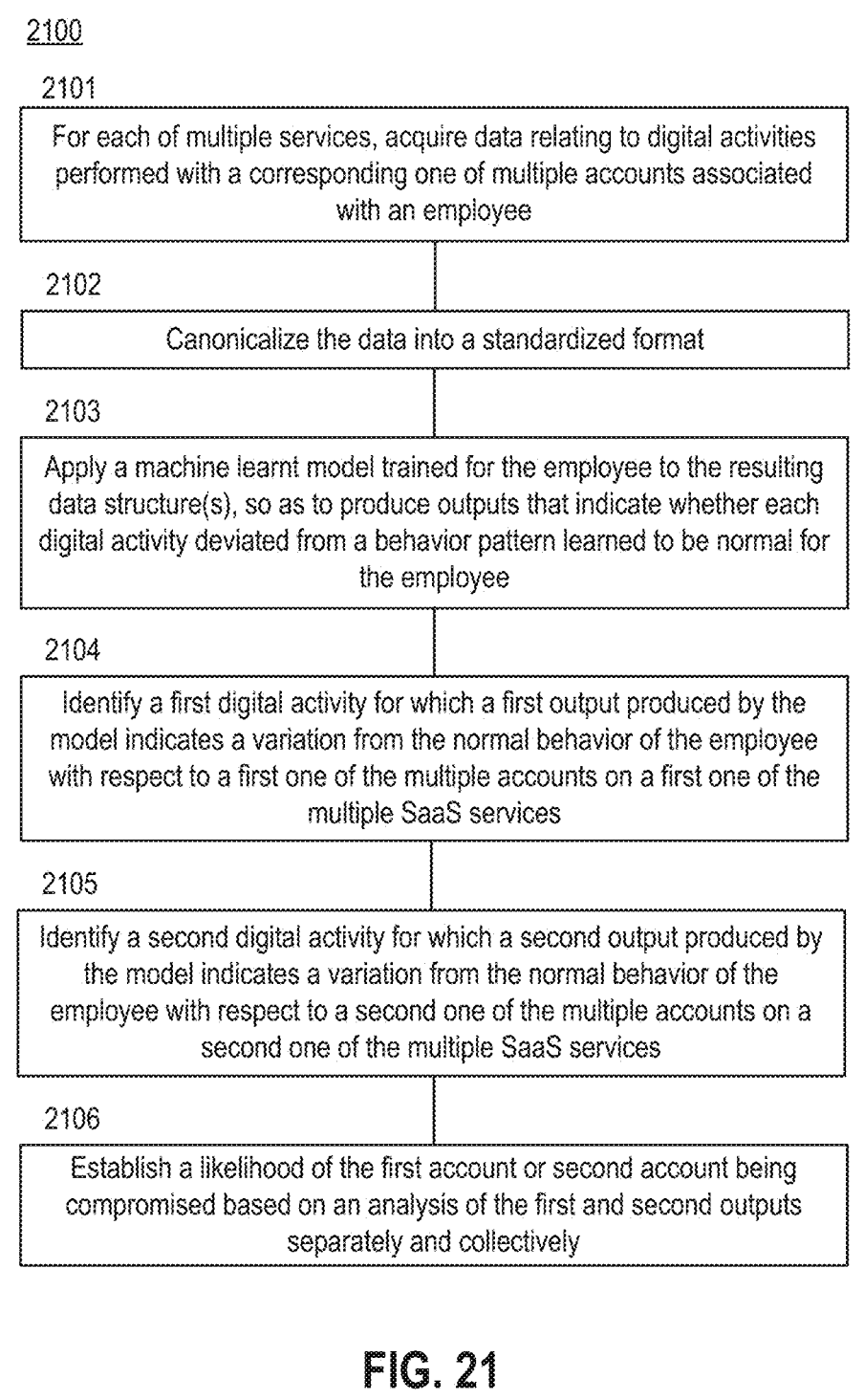

For each of multiple services, acquire data relating to digital activities performed with a corresponding one of multiple accounts associated with an employee

2102

Canonicalize the data into a standardized format

2103

Apply a machine learnt model trained for the employee to the resulting data structure(s), so as to produce outputs that indicate whether each digital activity deviated from a behavior pattern learned to be normal for the employee

2104

Identify a first digital activity for which a first output produced by the model indicates a variation from the normal behavior of the employee with respect to a first one of the multiple accounts on a first one of the multiple SaaS services

2105

Identify a second digital activity for which a second output produced by the model indicates a variation from the normal behavior of the employee with respect to a second one of the multiple accounts on a second one of the multiple SaaS services

2106

Establish a likelihood of the first account or second account being compromised based on an analysis of the first and second outputs separately and collectively

APPROACHES TO DOCUMENTING AND VISUALIZING INDICATIONS OF RISK DISCOVERED THROUGH AN ANALYSIS OF DIGITAL ACTIVITIES PERFORMED ACROSS DIFFERENT SERVICES AND USING THE SAME FOR DETECTING THREATS

CROSS-REFERENCE TO RELATED APPLICATIONS

This application claims priority to U.S. Provisional Application No. 63/497,889, titled "Approaches to Scoring Digital Activities of Accounts Across Platforms and Documenting Risk in Abnormal Behavior Case Timelines" and filed Apr. 24, 2023, which is incorporated by reference herein in its entirety.

TECHNICAL FIELD

Various embodiments concern computer programs and associated computer-implemented techniques for identifying and documenting digital activities performed with accounts associated with an enterprise to provide a more holistic view of threats to security of the enterprise.

BACKGROUND

Email has become vastly more sophisticated with the Internet connecting millions of individuals in real time. These technological advancements have incentivized malicious actors (also referred to as "attackers") to send malicious emails in greater numbers than ever before. Email has historically been the primary communication channel for many enterprises, and therefore it is an attractive point of entry for attackers.

Traditionally, enterprises protected themselves against threats using secure email gateways ("SEGs"). A SEG is an appliance-implemented via hardware, firmware, or software—that monitors incoming and outgoing emails to prevent delivery of harmful content. At a high level, a SEG acts as a firewall by scanning incoming and outgoing emails-including attachments and Uniform Resource Locators ("URLs")—to identify malicious ones with harmful content. SEGs employ predefined rules to identify malicious emails, and therefore tend to be successful in protecting against known threats and known types of threats. However, SEGs have struggled to maintain performance as the threats faced by enterprises have become more dynamic.

Additional defense mechanisms have been developed in an effort to protect against these more dynamic threats. Consider, for example, a social engineering attack that is intended to manipulate—for example, through phishing, pretexting, or fraud—an employee of an enterprise into performing a certain action or disclosing certain information. Because the social engineering attack is designed for the employee, a predefined rule may not be able to identify the threat before security of the enterprise is compromised. Instead, the enterprise may employ a more sophisticated defense mechanism that examines the domains of incoming emails to identify those incoming emails with domains that are similar but not identical to the domain of the enterprise. For example, if the domain of the enterprise is ABC_Company.com, the filtration scheme could flag an incoming email as possibly fraudulent in response to a determination that its domain is ABC-Company.com, ABCCompany.com, or AB&C_Company.com. The enterprise could also employ a more sophisticated defense mechanism that examines incoming emails to determine whether the name of the sender sufficiently matches the email address. For example, if the sender is "John Doe" but the email address is abc123@gmail.com, the filtration scheme could flag the incoming email as possibly fraudulent. As another example, if the sender is "John Doe" but the email address is BradSmith@gmail.com, the filtration scheme could flag the incoming email as possibly fraudulent.

While significant improvements have been made through the use of these more sophisticated defense mechanisms, these more sophisticated defense mechanisms are still largely ineffective against novel threats. Assume, for example, that over a short interval of time (e.g., several hours or days), employees of different enterprises receive comparable malicious emails threatening disclosure of sensitive personal information or sensitive financial information as part of a coordinated campaign. Conventional defense mechanisms would be unable to stop the coordinated campaign because the pattern of malicious emails had not been observed before. More sophisticated defense mechanisms would also struggle to stop the coordinated campaign because employees at different enterprises were targeted, and any insights gleaned by a first one of the enterprises would not necessarily translate into better detection of the malicious emails by a second one of the enterprises.

While email has been—and continues to be—arguably the most popular attack vector, it is not the only one. Enterprises must secure not only communication services—such as email services, instant messaging services, and videotelephony services—but also non-communication services that can be used to access, directly or indirectly, sensitive information. Examples of communication services include email services, such as those offered through Microsoft Office 365® and Google Workspace™; instant messaging services, such as those offered through Slack® and Cisco Webex®; and videotelephony services, such as those offered through Zoom® and Skype®. Examples of non-communication services include cloud infrastructure services, such as those offered through Google Cloud Platform™, Amazon Web Services®, and Microsoft Azure®; cloud office services, such as those offered through Microsoft Office 365 and Google Workspace; and other services that provide support for customer relationship management (e.g., Salesforce®), financial management (e.g., Workday®), software development (e.g., GitHub® and Figma®), collaboration (e.g., Atlassian® and ServiceNow®), authentication (e.g., Okta®), and combinations thereof (e.g., Oracle® E-Business Suite). Note that some services-Microsoft Office 365 and Google Workspace, for example—may allow employees to perform communication-related digital activities and non-communication related digital activities, and therefore could be categorized as a communication service and a non-communication service.

Efforts have been made to develop new defense mechanisms that are able to address—for example, through detection, isolation, or remediation—novel threats. However, these new defense mechanisms are designed to be service specific. For example, a developer of an email service may develop defense mechanisms for discovering threats through analysis of incoming and outgoing emails. However, those defense mechanisms cannot be readily extended to other types of communications or other services. Such an approach to developing new defense mechanisms in a siloed manner prevents insights learned by these services from being shared, allowing attackers to take advantage of the "gaps" between the various services that might be used by employees of an enterprise.

BRIEF DESCRIPTION OF THE DRAWINGS

FIG. 3 illustrates exemplary training and inferencing processes that use data regarding digital activities performed with one or more accounts associated with an employee of an enterprise.

FIGS. 6A-C include examples of interfaces that show how new sources may be made programmatically accessible to the threat detection platform, such that the threat detection platform is able to ingest data related to digital activities performed on those sources.

FIG. 7 includes a flow diagram of a process for standardizing data relating to digital activities across multiple services.

FIG. 8 includes a flow diagram of a process for canonicalizing data acquired from multiple Software-as-a-Service ("SaaS") services that are accessible to employees of an enterprise.

FIG. 9 includes a flow diagram of a process in which data acquired from multiple SaaS services is canonicalized and then examined in real time to identify threats to an enterprise.

FIGS. 10A-D include examples of interfaces that show how digital activities can be tracked on a per-employee basis, but in a consistent form, in order to gain a better understanding of which digital activities are normal for each employee of an enterprise.

FIG. 11 includes a flow diagram of a process for learning what constitutes normal behavior of an employee across multiple services.

FIG. 12 includes a flow diagram of a process for training a machine learning model—here, a neural network—to learn what constitutes normal behavior for an employee across multiple sources.

FIG. 15 illustrates how posture categories established for employees can be monitored to detect changes.

FIG. 16 illustrates how policy changes embodied as changes in tenant posture category can be monitored to detect changes.

FIG. 17 illustrates how changes in service availability (here, of an enterprise-wide application) embodied as changes in application posture category can be monitored to detect changes.

FIG. 20 includes a flow diagram of a process for surfacing indications of risk discovered through analysis of digital activities performed with multiple accounts associated with an employee across multiple services.

FIG. 21 includes a flow diagram of a process for determining the threat posed to an enterprise through analysis of digital activities performed with multiple accounts associated with an employee across multiple SaaS services.

Figure 1:
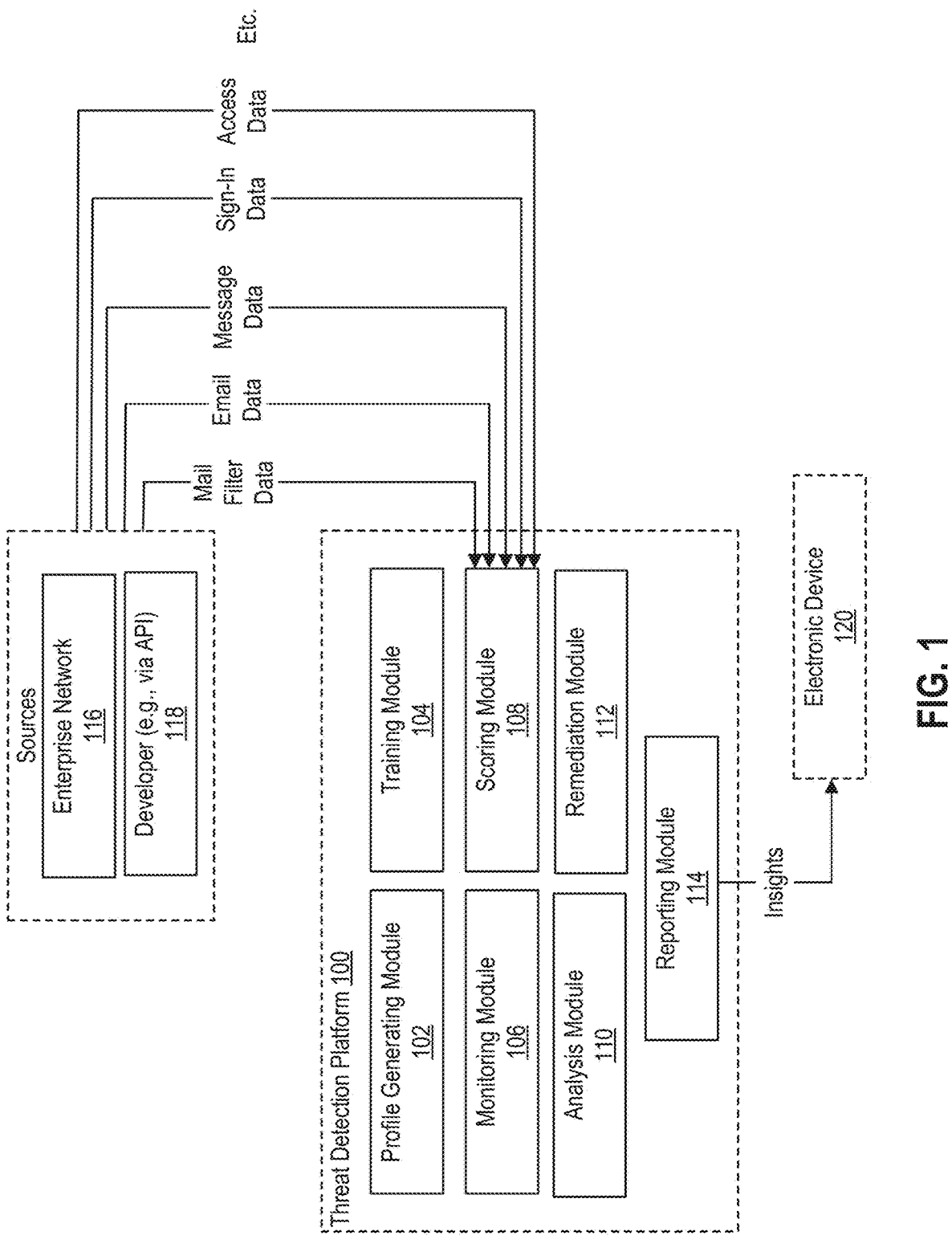
FIG. 1 depicts an example of a threat detection platform that is designed to examine the digital activities performed with accounts associated with employees to detect threats to the security of an enterprise.

Various features of the technology described herein will become more apparent to those skilled in the art from a study of the Detailed Description in conjunction with the drawings. Various embodiments are depicted in the drawings for the purpose of illustration. However, those skilled in the art will recognize that alternative embodiments may be employed without departing from the principles of the technology. Accordingly, although specific embodiments are shown in the drawings, the technology is amenable to various modifications.

DETAILED DESCRIPTION

Introduced here is a network-accessible platform (or simply "platform") that is designed to monitor digital activities that are performed across different services to ascertain, in real time, threats to the security of an enterprise. Consider, for example, a scenario in which employees of an enterprise are able to utilize different Software-as-a-Service ("SaaS") services. These SaaS services can include a first SaaS service for which the enterprise has a first plurality of accounts, each of which is associated with a different one of the employees, and a second SaaS service for which the enterprise has a second plurality of accounts, each of which is associated with a different one of the employees. The platform can monitor digital activities performed by the first and second pluralities of accounts on the first and second SaaS services, respectively, to determine the likelihood that any of those accounts are compromised. As further discussed below, the platform can establish the likelihood that a given account associated with a given employee is compromised based on not only an analysis of the digital activities performed with the given account, but also an analysis of digital activities performed with other digital accounts associated with the given employee.

In order to surface insights into the threats posed to an enterprise, the platform can apply machine learning models (also called "machine learnt models" or simply "models") to data that is representative of digital activities performed on different SaaS services with respective accounts. Each model may be trained to understand what constitutes normal behavior for a corresponding employee with respect to a single SaaS service or multiple SaaS services. Not only can these models be autonomously trained for the employees of the enterprise, but they can also be autonomously applied to detect, characterize, and catalog those digital activities that are indicative of a threat.

In stark contrast to conventional defense mechanisms, the platform can employ four approaches that allow threats—even sophisticated ones taking place across different SaaS services—to be detected in real time.

First, the platform can be programmed to ingest data regarding digital activities performed across different SaaS services and then canonicalize the data into one or more data structures having a given form. These data structures can be provided, as input, to the models that are responsible for determining whether behavior across the SaaS services deviates sufficiently from the norm to be considered representative of a threat. Assume, for example, that the platform acquires, from each of the SaaS services, data relating to the digital activities that are performed with a corresponding set of accounts on that SaaS service. In such a scenario, the platform can implement—for each of the SaaS services-a standardization mechanism that causes the data to be populated into a data structure. In some embodiments a separate data structure is maintained for each of the SaaS services, while in other embodiments a single data structure is maintained for the enterprise. Alternatively, a separate data structure could be maintained for each account, or a separate data structure could be maintained for each employee. Accordingly, the number of data structures that are created and maintained may depend on whether digital activities are monitored on a per-account, per-service, per-employee, or per-enterprise basis.

Second, the platform can be programmed to learn behavioral norms, on a per-employee basis, through an analysis of digital activities performed across different SaaS services. Assume, for example, that the platform is tasked with learning what constitutes normal behavior for an employee that is associated with a first account on a first SaaS service and a second account on a second SaaS service. In such a scenario, the platform can acquire a first dataset that is representative of digital activities performed with the first account and a second dataset that is representative of digital activities performed with the second account. As further discussed below, the platform can provide the first and second datasets to a machine learning algorithm that produces, as output, a model that is able to predict the likelihood of the first and second accounts being compromised based on an analysis of digital activities performed with the first and second accounts. Importantly, the model may be able to analyze the digital activities performed with the first and second accounts separately and collectively. Sometimes, a singular digital activity is sufficiently unusual to be flagged as evidence of a threat. Consider, for example, a scenario in which the first account completes a sign-in action in a country where the employee is known or presumed to not be located. However, it may also be the case that multiple digital activities—each of which is slightly or mildly unusual—are not sufficiently unusual when viewed separately but are sufficiently unusual when viewed together. Surfacing these "multi-event behavioral indicators" is not a trivial task, as the platform not only has to separately gauge the risk of each digital activity but also has to collectively gauge the risk of the multiple digital activities—even if those digital activities are performed across different SaaS services.

Third, the platform can be programmed to document and visualize indicators of risk in a more consistent manner. Referring again to the aforementioned example, the platform may apply a model to the first and second datasets to produce outputs that are indicative of the likelihood that the first account and/or the second account are compromised. Rather than store information regarding each digital activity represented in the first and second datasets, the platform may only store information regarding digital activities for which the output produced by the model indicates some variation from normal behavior of the employee. Accordingly, the outputs produced by the model may be used to filter the digital activities, ensuring that information is stored only for those digital activities that are unusual. Similarly, the platform can cause display of a visual indicium of the digital activities for which the output produced by the model indicates some variation from normal behavior of the employee. For example, the platform may document unusual digital activities performed across the first and second SaaS services by generating an abnormal behavior timeline (also called an "unusual activity timeline" or simply "timeline"). At a high level, the timeline may be representative of a multi-service "snapshot" of employee behavior that allows threats to be more easily detected and impacts thereof understood. Such an approach to documenting and visualizing indicators of risk not only allows for more comprehensible visual indicia of threat, but also ensures that computational resources are committed to storing information related to the highest priority digital activities.

Fourth, the platform can be programmed to ascertain actual behavioral deviation through an analysis of digital activities performed across different SaaS services. As mentioned above, an important aspect of how threat is determined is that the model may be able to analyze the digital activities performed with different accounts across different SaaS services both separately and collectively. Assume, for example, that the outputs produced by the model are representative of scores, indicating the degree to which the corresponding digital activity varies from the normal behavior of the corresponding account. In such a scenario, each score can be compared against a threshold—which may be established on a per-service or per-employee basis. In the event that a score exceeds the threshold, the platform may determine that the corresponding digital activity is singularly indicative of a threat. In the event that the score does not exceed the threshold, the platform may determine whether the score—in combination with one or more other scores—is collectively indicative of a threat. This could be done in an adaptive manner, such that scores indicative of higher degrees of variance from normal behavior are weighted more heavily or scores corresponding to more recent digital activities are weighted more heavily. Additionally or alternatively, scores that correspond to digital activities and/or services that are determined to be more prone to compromise may be weighted more heavily. As an example, if the threat detection platform determines or learns that accounts with a first SaaS service tend to be compromised more frequently than accounts with a second SaaS service, then digital activities performed on the first SaaS service may be weighted more heavily than digital activities performed on the second SaaS service.

Note that while embodiments may be described in the context of computer-executable instructions, aspects of the technology described herein can be implemented via hardware or firmware instead of, or in addition to, software. As an example, aspects of the platform may be embodied as instruction sets that are executable by a computer program via which a user is able to review, classify, and remediate threats to an enterprise.

Moreover, while embodiments may be described in the context of employees of an enterprise, those skilled in the art will recognize that aspects of the technology may be similarly applicable to any person. For example, users of a service—like users of the Gmail@ email service—may have their digital activities monitored to detect whether the respective accounts are potentially compromised. Such service could be offered automatically to the users of the service, or the users may be permitted to register for the service on their own. In scenarios where registration is required, each user may be required to complete a registration procedure in which that user specifies the account and service to be monitored.

Terminology

References to "an embodiment" or "some embodiments" mean that the feature, function, structure, or characteristic being described is included in at least one embodiment. Occurrences of such phrases do not necessarily refer to the same embodiment, nor are they necessarily referring to alternative embodiments that are mutually exclusive of one another.

The term "based on" is to be construed in an inclusive sense rather than an exclusive sense—that is, in the sense of "including, but not limited to." Accordingly, unless otherwise noted, the term "based on" is intended to mean "based at least in part on."

The terms "connected," "coupled," and variants thereof are intended to include any connection or coupling between two or more elements, either direct or indirect. The connection or coupling can be physical, logical, or a combination thereof. For example, elements may be electrically or communicatively coupled to one another despite not sharing a physical connection.

The term "module" may refer broadly to software, firmware, hardware, or combinations thereof. Modules are typically functional components that generate one or more outputs based on one or more inputs. A computer program may include or utilize one or more modules. For example, a computer program may include multiple modules that are responsible for completing different tasks, or a computer program may include a single module that is responsible for completing all tasks.

When used in reference to a list of multiple items, the word "or" is intended to cover all of the following interpretations: any of the items in the list, all of the items in the list, and any combination of items in the list.

The term "enterprise" may be used to refer to an entity of any size, complexity, or organizational structure. The term "enterprise" may be used interchangeably with the terms "business," "company," and "organization."

The term "account" may be used to refer to a digital profile with which an employee is able to perform digital activities on a corresponding service (e.g., a SaaS service). These digital profiles are commonly used to access software via which digital activities, such as exchanging emails or accessing information, can be performed. The digital activities that are performed with these digital profiles may be called "events," each of which can be attributed to a corresponding digital profile and therefore a corresponding employee.

Overview of Threat Detection Platform

FIG. 1 depicts an example of a threat detection platform 100 that is designed to examine the digital activities performed with accounts associated with employees to detect threats to the security of an enterprise. As shown in FIG. 1, the threat detection platform 100 may include a profile generating module 102, a training module 104, a monitoring module 106, a scoring module 108, an analysis module 110, a remediation module 112, and a reporting module 114. Some embodiments of the threat detection platform 100 include a subset of these components, while other embodiments of the threat detection platform 100 include additional components that are not shown in FIG. 1.

At a high level, the threat detection platform 100 can acquire data related to digital activities that are performed with accounts associated with employees and then determine, based on an analysis of the data, how to handle threats in a targeted manner. Some data may be acquired from an enterprise network 116, while other data may be acquired from a developer 118 of a service, for example, via an application programming interface ("API"). Consider a scenario in which the threat detection platform 100 is tasked with monitoring digital activities performed with a first plurality of accounts on a first SaaS service (e.g., Microsoft Office 365) and a second plurality of accounts on a second SaaS service (e.g., Slack), where the first and second pluralities of accounts are associated with an enterprise, employees of which are associated with one of the first plurality of accounts and one of the second plurality of accounts. In such a scenario, the threat detection platform 100 can acquire, from the first SaaS service via a first API, a first dataset that is representative of digital activities performed with the first plurality of accounts and acquire, from the second SaaS service via a second API, a second dataset that is representative of digital activities performed with the second plurality of accounts. Further, the threat detection platform 100 could acquire, from the enterprise network 116, a third dataset that is representative of digital activities (e.g., sign-in actions) performed with the first plurality of accounts, the second plurality of accounts, or a separate third plurality of accounts.

As shown in FIG. 1, the data acquired from the enterprise network 116 and/or developers 118 of services may include information related to emails, messages, mail filters, sign-in actions, access activities, and the like. For each service for which data is acquired by the threat detection platform 100, the nature of the underlying digital activities—and therefore, the content of the data—may vary. For example, data acquired from a communication service (e.g., Microsoft Office 365) may be examined to glean insights into communications (e.g., emails and/or messages) transmitted and received by a plurality of accounts, while data acquired from a non-communication service (e.g., Salesforce or Workday) may be examined to glean insights into sign-in actions of another plurality of accounts. As another example, data acquired from a first communication service (e.g., Microsoft Office 365) may be examined to glean insights into emails transmitted and received by a plurality of accounts, while data acquired from a second communication service (e.g., Slack) may be examined to glean insights into messages transmitted and received by another plurality of accounts. As further discussed below, the threat detection platform 100 can, and generally does, acquire data from different sources in order to better understand the behavior of employees across different services.

In some embodiments, the threat detection platform 100 is implemented, at least partially, within the enterprise network 116. In other embodiments, the threat detection platform 100 is implemented entirely within a remote computing environment (e.g., an instance on Amazon Web Services) to which data regarding digital activities of employees is routed for analysis. The remote computing environment can belong to, or be managed by, the enterprise or another entity. The threat detection platform 100 could also be implemented within a gateway or another suitable location. For example, the threat detection platform 100 could be integrated into the enterprise's email system (e.g., at the gateway) as part of an inline deployment, though such an approach to implementation may be computationally burdensome if data from another service (i.e., one not supported by the email system) is to be examined by the threat detection platform 100. In other embodiments, the threat detection platform 100 is integrated into the enterprise's email system via an API such as the Microsoft Outlook® API. In such embodiments, the threat detection platform 100 may obtain data related to emails transmitted and received by accounts associated with the enterprise via the API. Thus, the threat detection platform 100 can supplement and/or supplant other security products that are employed by the enterprise.

In a first variation, the threat detection platform 100 is maintained by a threat service (also referred to as a "security service") that has access to multiple enterprises' data. In this variation, the threat detection platform 100 can route data related to digital activities performed with accounts associated with the multiple enterprises to a computing environment managed by the security service. The computing environment may be an instance on Amazon Web Services, for example. The threat detection platform 100 may maintain one or more databases for each enterprise that include organizational charts, attribute baselines, models trained to understand employee behavior, and the like. For example, the threat detection platform 100 may maintain, for a first enterprise, a first database that includes information related to the first enterprise and its employees and maintain, for a second enterprise, a second database that includes information related to the second enterprise and its employees. The threat detection platform 100 may also maintain federated databases that are shared among at least some of the multiple enterprises. Examples of federated databases include databases specifying vendors and/or individuals who have been deemed fraudulent, domains from which incoming emails determined to be malicious originated, and the like. The security service may maintain different instances of the threat detection platform 100 for different enterprises, or the security service may maintain a single instance of the threat detection platform 100 for multiple enterprises-though data related to each of the multiple enterprises may be handled separately and analyzed independently by the threat detection platform 100. The data hosted in these instances can be obfuscated, encrypted, hashed, depersonalized (e.g., by removing personal identifying information), or otherwise secured or secreted. Accordingly, each instance of the threat detection platform 100 may only be able to access and then process data related to accounts that are associated with the corresponding enterprise(s).

In a second variation, the threat detection platform 100 is maintained by the enterprise whose accounts are being monitored-either remotely or on premises. In this variation, all relevant data may be hosted by the enterprise itself, and any information to be shared across multiple enterprises can be transmitted to a computing system that is maintained by the security service or a third party.

As shown in FIG. 1, the profile generating module 102, training module 104, monitoring module 106, scoring module 108, analysis module 110, remediation module 112, and reporting module 114 can be integral parts of the threat detection platform 100. Alternatively, these components could be implemented individually while operating "alongside" the threat detection platform 100. For example, the reporting module 114 may be implemented in a remote computing environment to which the threat detection platform 100 is communicatively connected across a network. As mentioned above, the threat detection platform 100 may be implemented by a security service on behalf of an enterprise or by the enterprise itself. In some embodiments, aspects of the threat detection platform 100 are interactable via a network-accessible computer program operating on a computer server or a distributed computing system. For example, an individual may be able to interface with the threat detection platform 100 through a web browser that is executing on an electronic computing device (also called an "electronic device" or "computing device").

The enterprise network 116 may be a mobile network, wired network, wireless network, or some other communication network maintained by the enterprise or an operator on behalf of the enterprise. As noted above, the enterprise may utilize a security service to examine digital activities to discover potential threats. For example, the enterprise may grant permission to the security service to monitor the enterprise network 116 by examining emails (e.g., incoming emails or outgoing emails) and then addressing those emails that are determined to represent threats. The threat detection platform 100 may be permitted to remediate the threats posed by those emails, or the threat detection platform 100 may be permitted to surface notifications regarding the threats posed by those emails. In some embodiments, the enterprise further grants permission to the security service to obtain data regarding other digital activities involving the enterprise (and, more specifically, employees of the enterprise) in order to build a profile that specifies communication patterns, behavioral traits, normal context of emails, normal content of emails, etc. For example, the threat detection platform 100 may identify the filters that have been created and/or destroyed by each employee to infer whether any significant variations in behavior have occurred. As another example, the threat detection platform 100 may examine the emails or messages received by a given employee to establish the characteristics of normal communications (and thus, be able to identify abnormal communications). As another example, the threat detection platform 100 may examine sign-in actions to establish characteristics (e.g., in terms of location, time, frequency) that can then be used to establish whether a single sign-in action is unusual or a combination of sign-in actions are unusual.

The threat detection platform 100 may manage one or more databases in which data can be stored. Examples of such data include enterprise data (e.g., email data, message data, sign-in data, access data, and mail filter data), remediation policies, and models that are trained to learn what constitutes normal behavior for employees, for example, in terms of communication patterns, behavioral traits, and the like. The data stored in the database(s) may be determined by the threat detection platform 100 (e.g., learned from data available on the enterprise network 116 or available from a developer 118), provided by the enterprise, or retrieved from the Internet or an external database (e.g., associated with LinkedIn®, Microsoft Office 365, or Google Workspace). The threat detection platform 100 may also store outputs produced by the various modules, including machine—and human-readable information regarding insights into threats and any remediation actions that were taken.

As shown in FIG. 1, the threat detection platform 100 may include a profile generating module 102 that is responsible for generating one or more profiles for the enterprise. For example, the profile generating module 102 may generate a separate profile for each employee of the enterprise based on an analysis of digital activities performed across one or more services. Alternatively, the profile generating module 102 may generate a separate profile for each account that is associated with the enterprise, in which case each employee may be associated with one or more profiles. Profiles could also be generated for business groups, organizational groups, or the enterprise as a whole. Examining the data may enable the profile generating module 102 to discover organizational information (e.g., employees, titles, and hierarchy), behavioral traits of employees (e.g., based on historical emails, messages, and historical mail filters), normal content of incoming or outgoing emails, behavioral patterns of employees (e.g., when each employee normally logs in), communication patterns of employees (e.g., who each employee communicates with internally and externally, when each employee normally communicates), etc. This information can be populated into a profile so that the profile can serve as a baseline for what constitutes normal digital activity by the corresponding account or employee.

A profile could include a number of behavioral traits associated with the corresponding account. The profile generating module 102 may determine the behavioral traits based on the data that is acquired from the enterprise network 116 and developers 118. Referring to FIG. 1, for example, the profile generating module 102 may determine the behavioral traits based on an analysis of access data, sign-in data, message data, email data, and mail filter data. For example, the email data may include information on the senders of past emails received by a given account, the content of those past emails, the frequency of those past emails, the temporal patterns of those past emails, the topics of those past emails, the geographical locations from which those past emails originated, the formatting characteristics of those past emails (e.g., usage of HTML, fonts, styles, etc.), and more. For the given account via which emails can be received or transmitted, the profile generating module 102 may attempt to build a profile that includes information regarding the other accounts that emails are commonly transmitted to or received from, the normal content of incoming and outgoing emails, the normal transmission times, the normal transmission locations, and the like. As a more specific example, consider a scenario in which an employee of an enterprise is associated with a first account via which she is able to perform digital activities on a first SaaS service (e.g., Microsoft Office 365) and a second account via which she is able to perform digital activities on a second SaaS service (e.g., Slack). To build a profile for the employee, the profile generating module 102 may examine digital activities performed in the past with the first and second accounts. Through this analysis, the profile generating module 102 can glean insights into behavior on the first SaaS service and behavior on the second SaaS service, but also behavior on the first SaaS service in relation to behavior on the second SaaS service. For instance, the profile generating module 102 may discover that when emails are transmitted by the first account to other employees of the enterprise (and more specifically, other accounts for the first SaaS service), the second account generally transmits messages to those same employees (and more specifically, other accounts for the second SaaS service) around the same time. This type of insight—which can only be gleaned through analysis of digital activities performed across different services—can be helpful in identifying threats when digital activity only slightly or mildly deviates from the norm.

Accordingly, the profile generating module 102 may attempt to build a profile for each employee, such that each profile is representative of an archetype of behavior of the corresponding employee across one or more services with her accounts. Additionally or alternatively, the profile generating module 102 may attempt to build a profile for each account, such that each profile is representative of an archetype of behavior of a corresponding account. As further discussed below, the profiles may be helpful in identifying digital activities that are unusual, and therefore may be indicative of a threat to the security of an enterprise.

The monitoring module 106 may be responsible for monitoring digital activities performed with accounts associated with employees of a given enterprise. For example, the monitoring module 106 may monitor communications handled by the enterprise network 116. These communications may include incoming emails (e.g., external and internal emails) received by a first plurality of accounts associated with employees of the enterprise, outgoing emails (e.g., external and internal emails) transmitted by the first plurality of accounts, and messages exchanged between the first plurality of accounts or a second plurality of accounts associated with the employees of the enterprise. In some embodiments, the monitoring module 106 is able to monitor communications in near real time so that appropriate action can be taken if, for example, a malicious email is discovered. If an incoming email is determined to be representative of a phishing attack (e.g., based on an output produced by the scoring module 108), then the incoming email may be prevented from reaching its intended destination by the monitoring module 106 at least temporarily. In some embodiments, the monitoring module 106 is able to monitor digital activities only upon the threat detection platform 100 being granted permission by the enterprise (and thus, given access to the enterprise network 116 or an API associated with a service).

The scoring module 108 may be responsible for examining digital activities to determine the likelihood that a threat exists. As further discussed below, the scoring module 108 may not only examine each digital activity on its own—comparing that digital activity to the baseline established for the corresponding account—but also examine combinations of digital activities performed on a single service or across multiple services.

For example, the scoring module 108 may examine each incoming email to determine how its characteristics compare to past emails sent by the sender or received by the recipient. In such a scenario, the scoring module 108 may determine whether characteristics such as timing, formatting, and location of origination (e.g., in terms of sender email address or geographical location) match the baseline established for the sender or recipient based on an analysis of past emails that have been determined to be non-malicious. For example, the scoring module 108 may determine that an email is likely malicious if the sender email address (support-xyz@gmail.com or JohnDoe1@gmail.com) differs from an email address (John.Doe@CompanyABC.com) that is known to be associated with the alleged sender (John Doe).

As another example, the scoring module 108 may determine that an account may be compromised if the account performs a sign-in action that is impossible or improbable given its most recent sign-in action. Similarly, the scoring module 108 may determine that an account may be compromised if the account performs an access action (e.g., of an enterprise network, enterprise-supported database, or enterprise-supported service) that is impossible or improbable given its most recent access action.

In addition to this "single-service analysis," the scoring module 108 may examine digital activities performed across different services. With this "multi-service analysis," the scoring module 108 may be able to identify sets of digital activities that are not noteworthy on their own but are indicative of risk when viewed together. Assume, for example, that the scoring module 108 monitors digital activities performed with a first account on a first service and a second account on a second service, where the first and second accounts are associated with the same employee. The scoring module 108 may discover that the first account performs a first digital activity (e.g., transmitting an email originating from a first geographical location) around the same time that the second account performs a second digital activity (e.g., accesses an enterprise network from a second geographical location). When viewed separately, neither the first digital activity nor the second digital activity may significantly deviate from normal behavior of the employee. However, when viewed together, the scoring module 108 may be able to establish that either the first account or the second account is likely compromised.

The scoring module 108 can make use of heuristics, rules, or models that are representative of neural networks or rely on decision trees (e.g., gradient-boosted decision trees), logistic regression, or linear regression. Accordingly, the scoring module 108 may produce discrete outputs or continuous outputs as further discussed below.

As mentioned above, the scoring module 108 may consider combinations of digital activities—across the same service or different services—to determine whether a threat exists. This may be done in a "rolling" manner, where each digital activity is compared against prior digital activities performed on the same service with the same account that have been identified as unusual to some degree. Each digital activity could also be compared against prior digital activities performed with related accounts (e.g., corresponding to the same employee but other services) that have been identified as unusual to some degree.

The analysis module 110 may be responsible for considering whether different combinations of digital activities are indicative of a threat. For example, the analysis module 110 may determine, based on the scores produced by the scoring module 108, whether a digital activity is individually indicative of a threat or collectively—with at least one other digital activity—indicative of a threat. Assume, for example, that the scores produced by the scoring module 108 are representative of deviation values, indicating the degree to which each corresponding digital activity deviates from past digital activities performed on the same service with that account. These deviation values can be supplied to the analysis module 110, and the analysis module 110 may input these deviation values into a rules-based engine, heuristics-based engine, or model that predicts the likelihood of a threat.

The remediation module 112 may perform one or more remediation actions in response to the analysis module 110 determining that an account may be compromised. The remediation action(s) may be based on the nature of the threat, the policies implemented by the enterprise, etc. These policies may be predefined or dynamically generated based on inference, analysis, or the data obtained by the threat detection platform 100 (e.g., from the enterprise network 116 or developers 118 of services). Examples of remediation actions include moving communications generated by a compromised account into a hidden folder (also referred to as a "quarantine folder") for further analysis, prohibiting a compromised account from accessing sensitive information, sending notifications (e.g., to the actual employee, enterprise, or member of the security service), resetting the password of the compromised account, ending all active sessions of the compromised account, and resetting connections with services or databases accessible to the compromised account.

The reporting module 114 may be responsible for reporting insights derived from the outputs that are produced by the scoring module 108. For example, the reporting module 114 may provide a summary of the threats discovered through analysis of the outputs produced by the scoring module 108 to an electronic device 120. The electronic device 120 may be managed by the employee associated with the account under examination, an individual associated with the enterprise (e.g., a member of the IT department), or an individual associated with a security service. The reporting module 114 can surface insights into threats in a human-readable format for display on an interface accessible via the electronic device 120. For example, the reporting module 114 may be responsible for generating a visual indicium of digital activities, performed with accounts associated with a given employee, that have been determined to deviate from the usual behavior of the given employee. The visual indicium could take the form of a timeline, as further discussed below.

As shown in FIG. 1, the threat detection platform 100 may also include a training module 104 that operates to train the models employed by the other modules. For example, the training module 104 may train the models that are applied by the scoring module 108 to the data acquired from the enterprise network 116 and/or developers 118 of services by feeding training data into those models. Additional information regarding the processes for training and implementing the models is provided below with respect to FIG. 3.

Moreover, the training module 104 may implement a retraining pipeline (or simply "pipeline") in order to protect against novel threats as further discussed below. At a high level, the pipeline may be representative of a series of steps that, when executed by the training module 104, cause the models employed by the scoring module 108 to be retrained. By consistently training the models using up-to-date information, the threat detection platform 100 can protect against novel threats that would otherwise escape detection.

Figure 2:
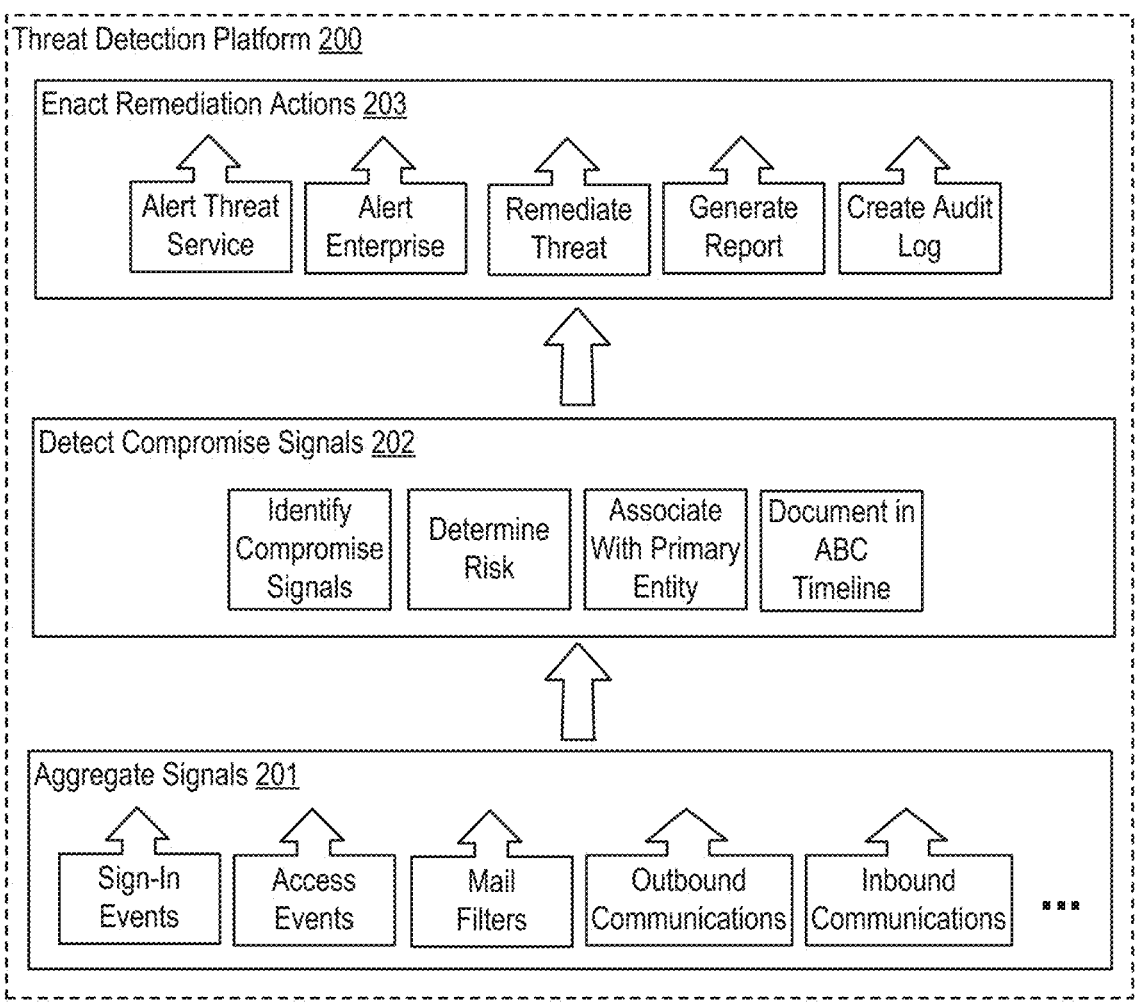
FIG. 2 illustrates how a threat detection platform may employ a multi-tiered approach to aggregate information related to the employees of an enterprise, examine the information to discover indicators of account compromise, and then enact remediation actions to address the threat to an enterprise.

FIG. 2 illustrates how a threat detection platform 200 may employ a multi-tiered approach to aggregate information (also referred to as "signals") related to the employees of an enterprise (step 201), examine the signals to discover ones that may be indicative of account compromise (step 202), and then enact remediation actions (step 203) to address the threat to an enterprise. The appropriate remediation action, if any, can be determined by the threat detection platform 200 based on those "compromise signals" that are detected through an analysis of the aggregated signals.

Unlike conventional security products, the threat detection platform 200 can be completely integrated within the enterprise environment. For example, the threat detection platform 200 may receive input that is indicative of an approval by an individual (e.g., an administrator associated with the enterprise) to access data related to the digital activities performed with accounts associated with employees of the enterprise. The data may include, for example, information on communications (e.g., incoming and outgoing emails, incoming and outgoing messages), mail filters, mail groups, sign-in events, access events, identity risk events, active directory, etc. The approval may be given through an interface that is generated by the threat detection platform 200. For example, the individual may access an interface generated by the threat detection platform 200 and then approve access to the data as part of a registration process.

Then, the threat detection platform 200 can establish a connection with one or more sources from which the data can be acquired. For example, the threat detection platform 200 may establish, via an API, a connection with a computer server that is managed by the enterprise or some other entity (e.g., a developer of a service). Consider, for example, a scenario in which the threat detection platform 200 is instructed to acquire data from a first SaaS service via which employees transmit and receive emails—potentially among other things—using a first plurality of accounts and data from a second SaaS service via which the employees transmit and receive messages—again, potentially among other things—using a second plurality of accounts. In such a scenario, the threat detection platform 200 may acquire the data from the first SaaS service via a first API and acquire the data from the second SaaS service via a second API.

The threat detection platform 200 can download the data from the source(s) into a programming environment that is managed by the threat detection platform 200. For instance, the threat detection platform 200 may obtain information regarding outbound communications, inbound communications, mail filters, access events, and sign-in events involving accounts associated with the enterprise. As further discussed below, the threat detection platform 200 may process the information in order to define the digital activities that are performed with each account over time. The information that defines each digital activity may be referred to as a "signal." As mentioned above, all of these digital activities need not necessarily be performed with the same accounts. Employees may use a first plurality of accounts for digital activities related to email (e.g., creating mail filters, receiving emails, transmitting emails) and a second plurality of accounts for digital activities related to accessing an enterprise network, an enterprise-supported database, or an enterprise-supported service.

Figure 3:
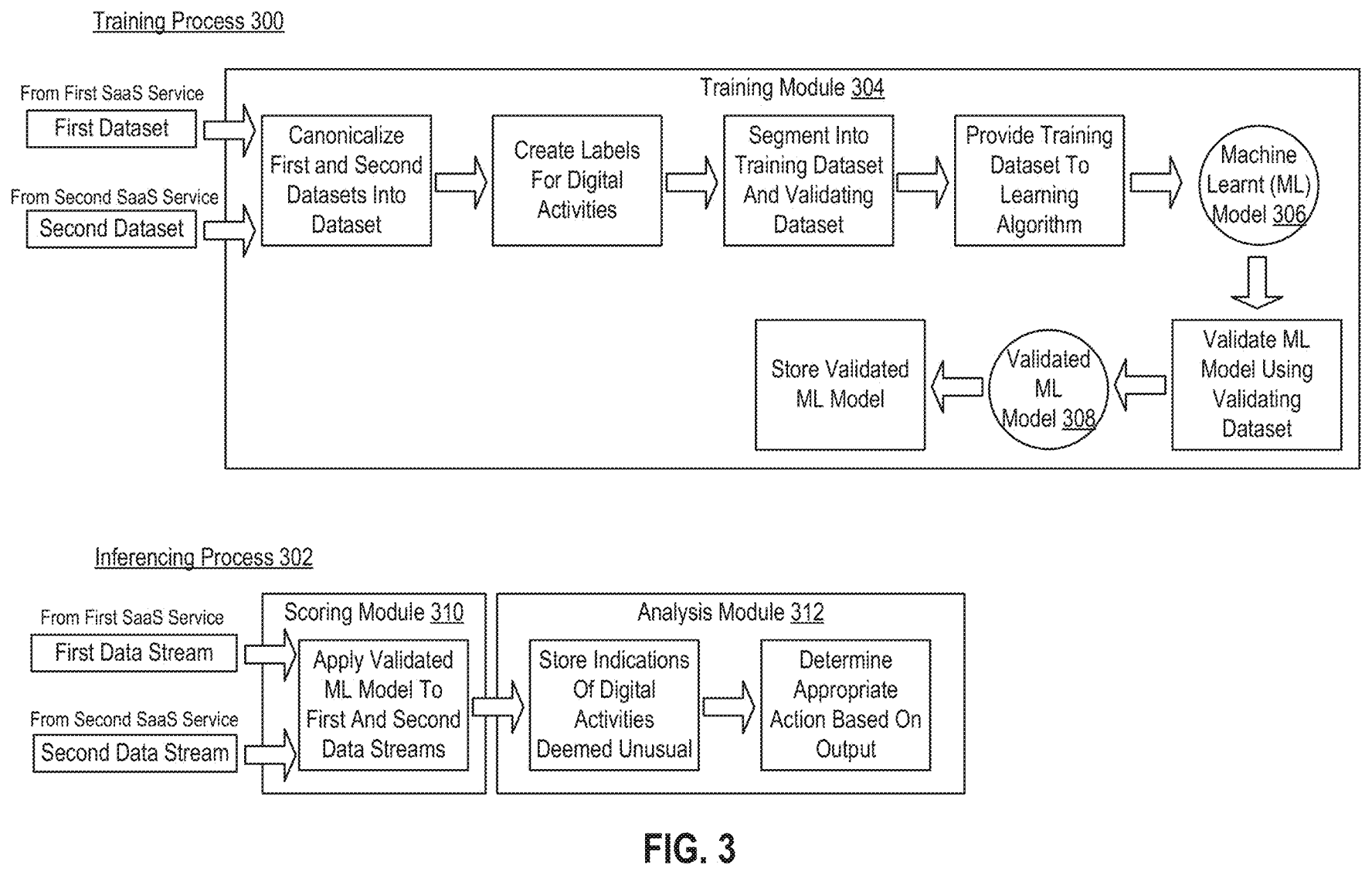

FIG. 3 illustrates exemplary training and inferencing processes 300, 302 that use data regarding digital activities performed with one or more accounts associated with an employee of an enterprise. For the purpose of illustration, the training and inferencing processes 300, 302 are discussed in the context of two services, namely, a first SaaS service for which the employee has a first account and a second SaaS service for which the employee has a second account. However, those skilled in the art will recognize that the training and inferencing processes 300, 302 can be carried out similarly regardless of how many accounts and services are monitored.

Referring to the training process 300, the training module 304 may initially obtain (i) a first dataset that includes information regarding digital activities performed with the first account in the past and (ii) a second dataset that includes information regarding digital activities performed with the second account in the past. In some embodiments, the first and second datasets correspond to the same interval of time, generally having a predetermined length. For example, the first dataset may include information regarding digital activities performed with the first account over the preceding month, three months, or six months, while the second dataset may include information regarding digital activities performed with the second account over the preceding month, three months, or six months. As another example, the first dataset may include information regarding digital activities performed with the first account over a predefined period of time (e.g., July 2023 through December 2023), and the second dataset may include information regarding digital activities performed with the second account over the same predefined period of time.

Then, the training module 304 can canonicalize the first and second datasets into a canonicalized dataset. Note that, in some embodiments, another module (e.g., profile generating module 102 of FIG. 1) is responsible for canonicalizing the first and second datasets into the canonicalized dataset. The training module 304 may ingest data from different sources—here, for example, from the first and second SaaS services—and therefore may canonicalize the respective datasets into one or more data structures having a given form. In some embodiments, a single data structure is created and then maintained for the employee, such that information regarding digital activities performed with the first and second accounts is stored in the same data structure. In other embodiments, more than one data structure is created and then maintained for the employee. For example, a separate data structure could be created and then maintained for each service for which the employee has an account. Therefore, in this example, the training module 304 could maintain a first data structure for the first SaaS service and a second data structure for the second SaaS service, though the first and second data structures may still have the same form. Further information regarding canonicalization can be found below.

In some embodiments, the training module 304 creates labels for the various digital activities that are represented in the canonicalized dataset. Because the training module 304 is interested in establishing a baseline for normal behavior of the employee across the first and second SaaS services, labels may not be necessary. Instead, the training module 304 may simply presume that all digital activities reflected in the first and second datasets (and therefore, in the canonicalized dataset) are representative of normal behavior. However, the training module 304 may append labels to the digital activities indicating as much. Moreover, the training module 304 could append labels to the digital activities that indicate the degree to which each digital activity is representative of normal behavior, and therefore how strongly each digital activity should be considered when defining the baseline. For example, if the employee moves between different business groups, organizational groups, or physical locations, then her behavior may change, and labels can be used to flag those changes. As another example, the canonicalized dataset could include digital activities that are known to be malicious, and labels can be used to flag those digital activities. These malicious digital activities may be present because the employee has been targeted by attackers in the past, or these malicious digital activities may be present because the training module 304 has "injected" them into the canonicalized dataset. To improve robustness of the model (and specifically, its ability to identify threats), the training module 304 may "inject" malicious digital activities that involve other employees of the same enterprise or employees of other enterprises—in which case, the information may be manipulated so as to appear to affect the employee for whom the model is being trained.

This canonicalized dataset can be segmented by the training module 304 into two datasets, namely, a training dataset and a validating dataset. Generally, the training dataset is larger than the validating dataset, with the training dataset being about 60-90 percent of the size of the canonicalized dataset.

At a high level, the process of training a model involves providing a machine learning algorithm (or simply "learning algorithm") with the training dataset from which to learn relationships and the validating dataset from which to validate the learned relationships. The learning algorithm tries to discover patterns in the training dataset and then outputs the model 306 that captures these patterns. In order for the learning algorithm to create an accurate model, the training dataset must contain evidence of the answer to be predicted—commonly called the "target." In this scenario, the digital activities represented in the training dataset—and more specifically, characteristics of the digital activities— can serve as examples of normal behavior of the employee with respect to the first and second SaaS services. As mentioned above, the training dataset could also include malicious digital activities—that are labeled as such—so that the model 306 learns how to detect at least that type of threat.

Evaluating whether the model performs as expected is an important part of the training process 300. The data to which the model is applied during the inferencing process 302 has an unknown target, and therefore it is important to check the accuracy of the model 306 on data for which the target is known. That's where the validating dataset can be used, namely, as a means of assessing accuracy as a proxy for predictive accuracy on future data.

To properly evaluate the model 306, the training module 304 can hold onto a portion of the canonicalized dataset, namely, the validating dataset, that is used only for validation. Evaluating the predictive accuracy of the model 306 with the same training dataset supplied to the learning algorithm is not useful, as the model 306 would be rewarded for remembering the training dataset rather than learning to generalize from it. Specifically, portions of data in the validating dataset corresponding to different digital activities can be supplied to the model 306 that produces, as output, predictions regarding degree of abnormality from the baseline. These predictions can then be compared to outcomes that are known for those digital activities in order to establish a metric that indicates how well the model 306 performs. If, for example, a malicious digital activity is "injected" into the validating dataset, then the training module 304 may seek to ensure that the model 306 actually predicts that digital activity as malicious when the corresponding portion of the validating dataset is supplied as input. The metric may be representative of an indication of how well the predictions output by the model 306 match the known outcomes, which may be represented as labels. In response to a determination that the metric exceeds a threshold—indicating that performance of the model 306 is sufficient—the training module 304 can store the now-validated model 308. For example, the validated model 308 may be stored in a digital profile that is maintained for the employee or a digital profile that is maintained for the employer (and that includes various models validated for its employees). In response to a determination that the metric does not exceed the threshold—indicating that performance of the model 306 is not sufficient—the training module 304 may perform some other action. For example, the training module 304 may initiate a retraining operation in which aspects (e.g., weights) of the model 306 are adjusted to see whether performance can be improved. As another example, the training module 304 may restart the training process 300 with different data or more data.

Thereafter, the threat detection platform may be tasked with implementing the validated model 308. Assume, for example, that the threat detection platform obtains streams of data, in real time, from the first and second SaaS services as digital activities are performed with the first and second accounts. In such a scenario, the scoring module 310 can apply the validated model 308 to the first and second streams of data in an ongoing manner, such that for each digital activity performed with the first account or second account, a prediction is made as to whether that digital activity is representative of unusual behavior. As further discussed below, the validated model 308—or the scoring module 310—may consider digital activities individually and collectively when determining whether behavior is unusual.

The analysis module 312 can store indications of digital activities for which the prediction output by the validated model 308 indicated at least some degree of deviation from normal behavior. While indications of all digital activities performed with the first and second accounts could be stored by the analysis module 312, this approach is generally not preferred due to computational resource considerations. Instead, the analysis module 312 may only store indications of digital activities that might lead, directly or indirectly, to a conclusion that the first account or second account is compromised.

Moreover, the analysis module 312 may determine which remediation action, if any, is appropriate based on the predictions output by the validated model 308. Upon identifying an appropriate remediation action, the analysis module 312 may transmit an instruction to implement the appropriate remediation action to a remediation module (e.g., remediation module 112 of FIG. 1). Alternatively, the predictions output by the validated model 308—or analysis thereof output by the analysis module 312—could be transmitted to the remediation module, in which case the remediation module may be responsible for determining the appropriate remediation action as well as implementing it.

Several examples of models are provided below:

Binary Classification Models: The output of a binary classification model specifies one of two classes. An example of such a model is one that when applied to data related to a digital activity, determines whether the corresponding account is or is not compromised.

Non-Binary Classification Models: The output of a non-binary classification model specifies one of at least three classes. An example of such a model is one that when applied to data related to a digital activity, specifies whether the corresponding account is not compromised, is subject to a first type of attack, is subject to a second type of attack, or is subject to a third type of attack. The number of classes can vary, though it generally depends on whether sufficient training data is available for the model to learn patterns that are representative of each class.

Regression Models: The output of a regression model is generally a single number (e.g., 50 percent) or an interval of numbers (e.g., 40-60 percent). An example of such a model is one that when applied to data related to a digital activity, estimates the probability that the corresponding account is compromised. One of the benefits of a regression model is that it can provide context that is helpful in better understanding the threat posed. For example, different action may be taken if a regression model indicates that the likelihood of an account being compromised is 80-90 percent versus 50-60 percent or 20-30 percent.

The nature of the validated model 308 may affect not only how its outputs are used by the threat detection platform, but also how training, validating, and inferencing are performed. To train a binary classification model, the training module 304 may use the learning algorithm known as logistic regression. To train a multiclass classification model, the training module 304 may use the learning algorithm known as multinomial logistic regression. Other learning algorithms that could be used for classification include (i) the Decision Tree Classifier, which uses a decision tree, as a predictive model, to go from observations to conclusions about the target, (ii) the Random Forest Classifier, which implements ensemble learning by constructing various decision trees during the training stage and then making a prediction based on the outputs of those decision trees during the inferencing stage, (iii) the XGBoost Classifier, (iv) the Naïve Bayes algorithm, which is based on Bayes theorem, (v) support-vector machines ("SVMs"), which, during the training stage, map examples to points in space to maximize the width of the gap between different classifications and then, during the inferencing stage, maps new examples into that same space to formulate a prediction, and (vi) neural networks, which learn by adjusting weights assigned to nodes across different layers. To train a regression model, the training module 304 may use the learning algorithm known as linear regression.

The nature of the validated model 308—and the nature of the learning algorithm and underlying model architecture—may depend on the expectations of the threat detection platform and computational resources available to the threat detection platform. Neural networks, especially deep ones with more than three layers of nodes, tend to require a significant amount of computational resources during the training stage (and a decent amount of computational resources during the inferencing stage). Performance is generally quite good, however. Accordingly, the training module 304 may opt to train and implement a neural network so long as sufficient computational resources are available.

Ingesting Data Regarding Digital Activities Across Different Sources

To detect threats to an enterprise, a threat detection platform may monitor the digital activities that are performed with accounts associated with its employees across different services as discussed above. The threat detection platform can be programmed to ingest data from these different services, as well as canonicalize the data into data structures having a given form. Canonicalizing the data has several benefits. First, several of the aforementioned learning algorithms—and the corresponding models produced as output—perform more efficiently when handling data with a known structure. Simply put, the consistent structure can make it less "costly" to train and implement the model, especially if the model is to be implemented continually and in real time. Second, a consistent approach to canonicalization allows the threat detection platform to better monitor digital activities performed across different services, as data regarding different types of digital activities can be more easily logged and compared.

To ensure that data ingested from various sources can be analyzed by the threat detection platform (and more specifically, its scoring module), the threat detection platform may employ a standardization mechanism that canonicalizes the "language" of any network-accessible source from which data could be obtained. Simply put, the standardization mechanism can be designed so that data ingested from a given source can be readily used by the various modules of the threat detection platform. For example, the standardization mechanism may be designed to canonicalize data into (i) employees, (ii) digital activities, (iii) contextual information regarding those digital activities, and (iv) a take-action administrator stream. Note that the standardization mechanism may need to be designed for each source from which data is to be ingested by the threat detection platform.

Taking an informed approach to designing how data can be ingested by the threat detection platform may provide greater flexibility for future extensions. For example, the threat detection platform may be readily extendable to on-premises applications and standard interfaces, dataflows, and architectures—simply through the development of new standardization mechanisms. For example, if data regarding physical access actions (e.g., of physical buildings using a physical badge) were made available to the threat detection platform, this data could be similarly considered in determining whether an enterprise is at risk.

Figure 4:
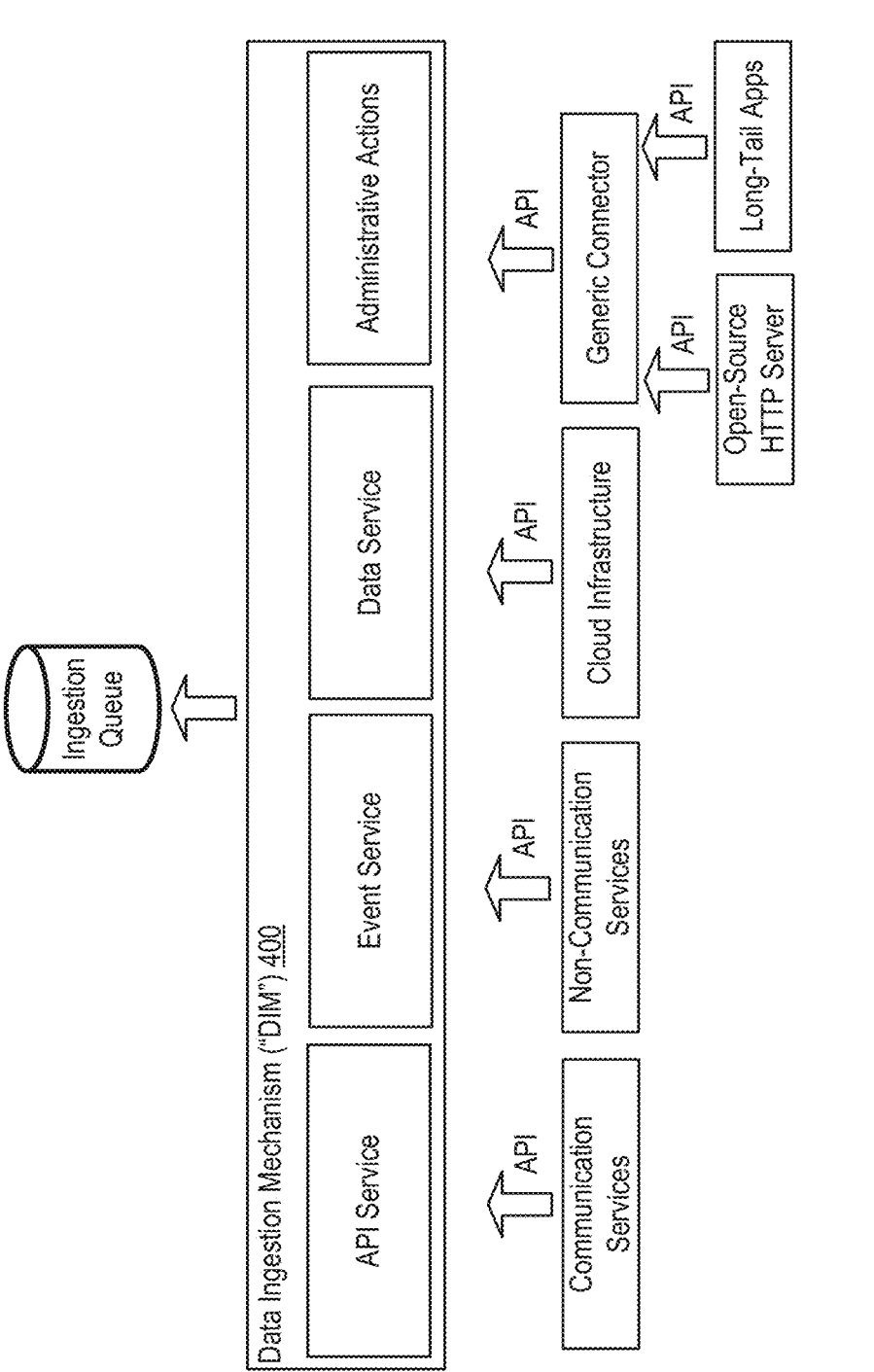
FIG. 4 includes a high-level illustration of a data ingestion mechanism that can be implemented by a threat detection platform.

FIG. 4 includes a high-level illustration of a data ingestion mechanism ("DIM") 400 that can be implemented by a threat detection platform (e.g., threat detection platform 100 of FIG. 1). As shown in FIG. 4, the DIM 400 may support one or more APIs via which data can be ingested from various sources. Here, for example, the DIM 400 supports APIs via which data can be acquired from SaaS services (e.g., those offered by Microsoft, Google, Salesforce, Workday, ServiceNow, Oracle, etc.) and cloud infrastructures (e.g., Google Cloud Platform, Amazon Web Services, and Microsoft Azure). In some embodiments, the DIM 400 supports an API that serves as a generic data interface via which data can be provided to the threat detection platform in nearly any form, whether structured or unstructured. Via this API, data can be acquired from an open-source Hypertext Transfer Protocol ("HTTP") server, on-premises computer programs (also called "long-tail computer programs" or "long-tail applications"), and the like. Because this "generic API" can serve as a connection mechanism between the threat detection platform and sources of data, it may also be called a "generic connection mechanism" or "generic connector."

Figure 5A:
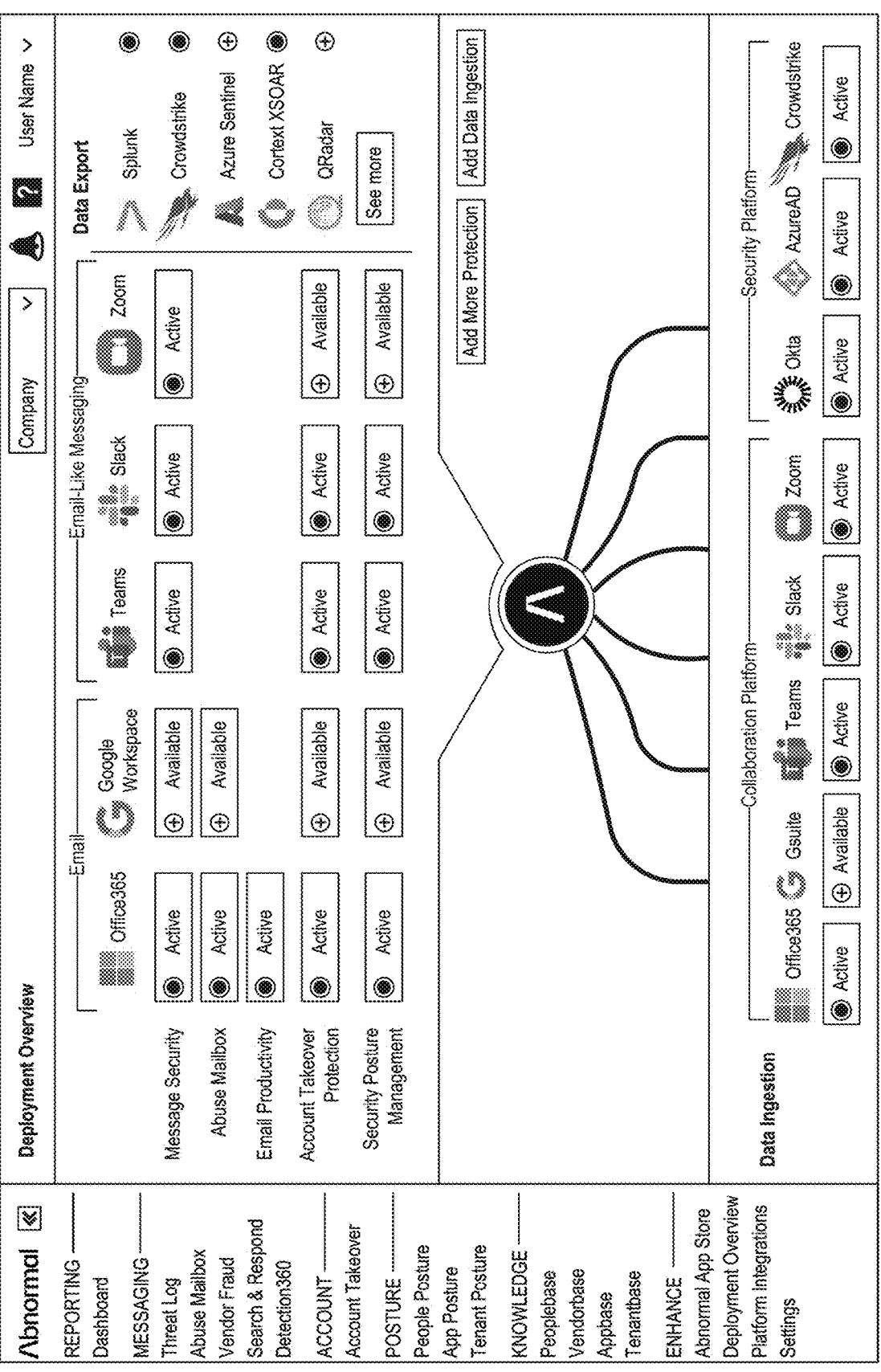
FIG. 5A includes an example of an interface that shows how deployment can be summarized visually, so as to indicate the services for which data is presently being received and analyzed by the threat detection platform.
Figure 5B:
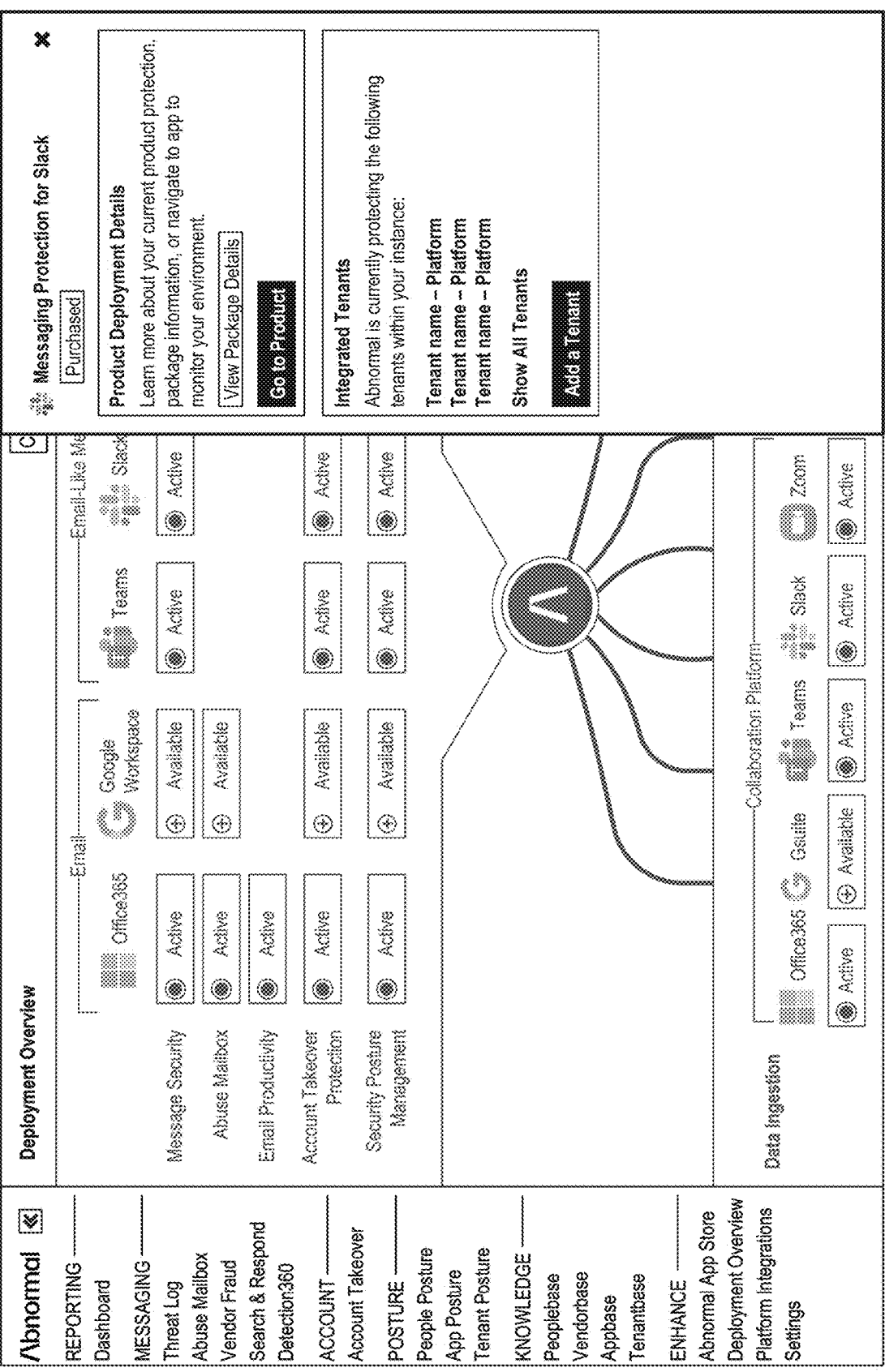
FIG. 5B includes an example of an interface that shows how further information regarding protected employees can be made readily accessible.
Figure 6B:
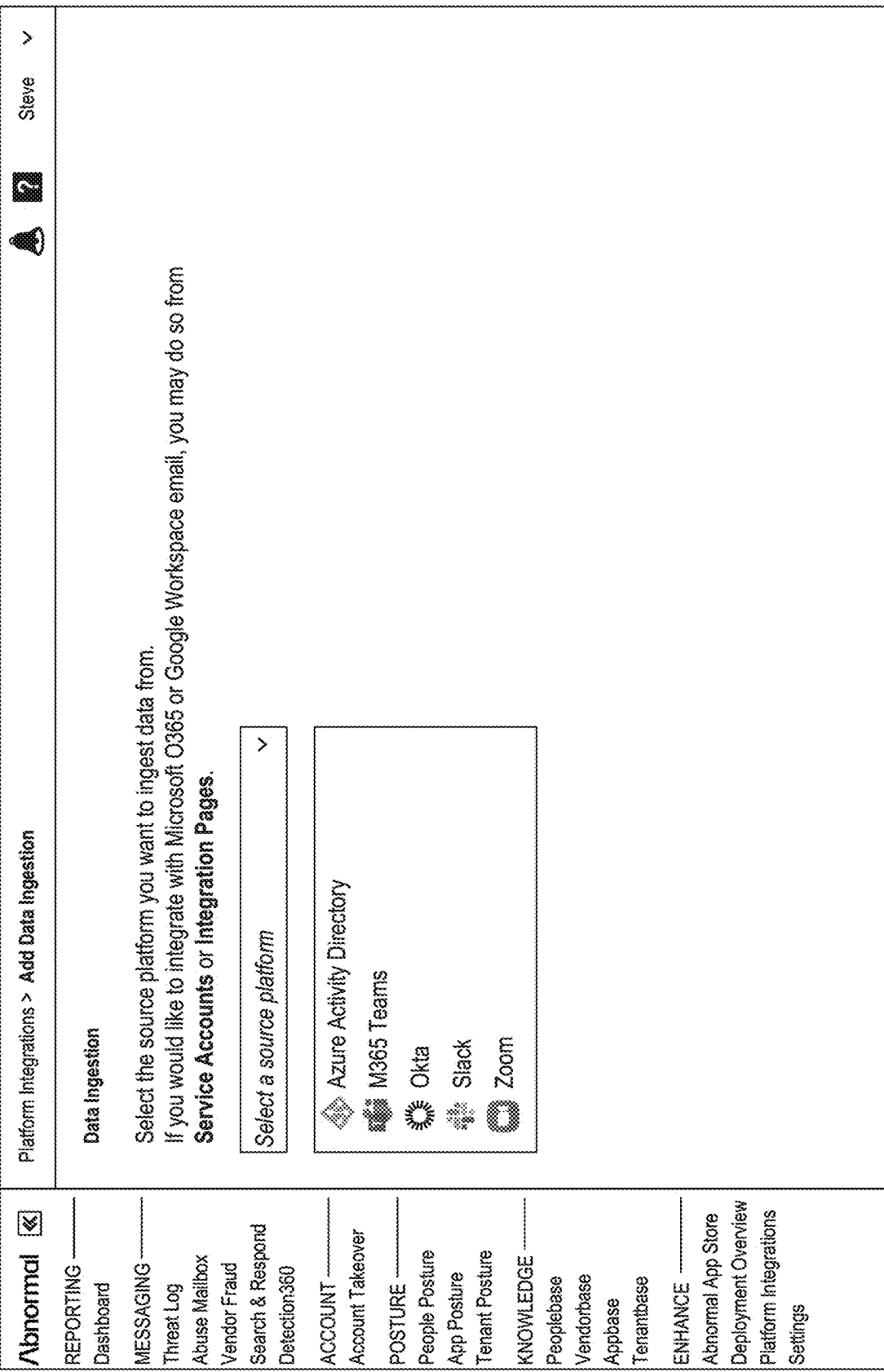
Figure 6C:
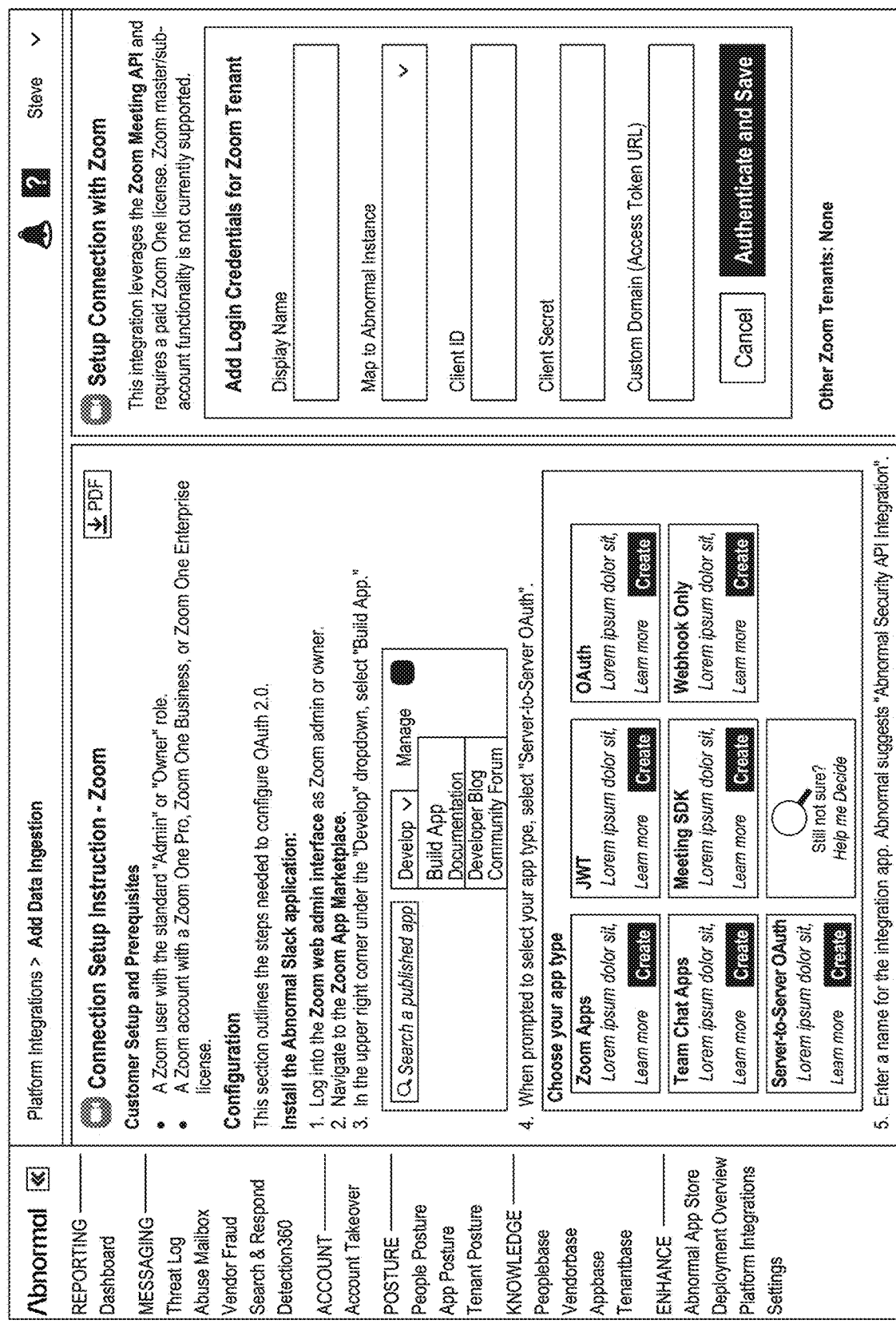

As further discussed below, each API supported or accessed by the DIM 400 may include—or interface with—a standardization mechanism that allows the data ingested from a corresponding service to be more readily handled by the various modules of the threat detection platform. FIG. 5A includes an example of an interface that shows how deployment can be summarized visually, so as to indicate the services for which data is presently being received and analyzed by the threat detection platform. FIG. 5B, meanwhile, includes an example of an interface that shows how further information regarding protected employees can be made readily accessible. FIGS. 6A-C include examples of interfaces that show how new sources may be made programmatically accessible to the threat detection platform, such that the threat detection platform is able to ingest data related to digital activities performed on those sources. Specifically, the interface in FIG. 6A shows the sources with which the threat detection platform is currently integrated, the interface in FIG. 6B shows how a new source can be identified, and the interface in FIG. 6C shows how the new source can be integrated into the threat detection platform.

Accordingly, the threat detection platform—via the DIM 400—may obtain or monitor data that is available from one or more sources, aggregate the data, and then canonicalize the digital activities represented in the data into a single event stream—on either a per-employee or per-account basis—to perform behavioral analysis. Such an approach ensures that the data available from these sources can be holistically examined to gain a better understanding of behavioral patterns on a per-account, per-employee, or per-enterprise basis.

FIG. 7 includes a flow diagram of a process 700 for standardizing data relating to digital activities across multiple services. These services may be SaaS services, for example.

For each of the multiple services, the threat detection platform can initially acquire data related to digital activities that are performed with a set of accounts associated with an enterprise (step 701). As mentioned above, the threat detection platform may acquire the data from each of the multiple services via a corresponding one of multiple APIs, each of which is offered and supported by one of the multiple services. Alternatively, the threat detection platform may offer and support its own API at which the data can be received from the multiple services. Generally, the set of accounts is one of multiple sets of accounts, each of which is associated with a corresponding one of the multiple services.

Then, the threat detection platform can canonicalize the data such that multiple data structures are produced (step 702). These data structures can be produced on a per-account, per-employee, or per-service basis. For example, in the event that the multiple data structures are produced on a per-service basis, each data structure may specify (i) the set of accounts associated with the corresponding service, (ii) digital activities that were performed with the set of accounts, and (iii) information regarding the set of accounts and/or the digital activities that were performed with the set of accounts. In some embodiments, each data structure further specifies (iv) an indication as to whether action should be taken by the threat detection platform on behalf of the enterprise, though the indication may not be populated into the data structure until the likelihood of compromise is established as discussed below with reference to step 703.

Canonicalization can take several forms.

In some embodiments, the threat detection platform implements a separate set of rules for each of the multiple services. When implemented, a set of rules may convert data acquired from a corresponding service into a given form, such that the data acquired from the multiple services has the same form and/or can be populated into data structures having the same form.

In other embodiments, the threat detection platform implements a separate model for each of the multiple services that acts as a standardization mechanism for that service. Accordingly, the threat detection platform may have access to multiple models, each of which is designed and trained to standardize data acquired from a different one of multiple sources. These models may produce, as output, data in a given form or data structure—in which the data is populated—having the same form.

Thereafter, the threat detection platform can establish a likelihood of compromise based on an analysis of the multiple data structures (step 703). Assume, for example, that the enterprise has multiple employees, each of whom is associated with an account in each of the multiple sets of accounts, such that each employee is associated with multiple accounts. To establish the likelihood of compromise, the threat detection platform can—for each of the multiple employees—identify the multiple accounts that are associated with that employee; establish entries across the multiple data structures that are associated with the multiple accounts; apply, to the entries, a model that is trained to understand what constitutes normal behavior of that employee with respect to the multiple services; and determine the likelihood of compromise based on an output produced by the model.

In response to a determination that the likelihood of compromise for a given account among the multiple sets of accounts does not exceed a threshold, the threat detection platform may not take any further action (step 704). However, in response to a determination that the likelihood of compromise of the given account does exceed the threshold, the threat detection platform may perform a remediation action on behalf of the enterprise (step 705). For example, the threat detection platform may transmit, to a given employee associated with the given account or someone else (e.g., a member of the IT department), a notification that specifies the threat. As another example, the threat detection platform may transmit an instruction to a given one of the multiple services that is associated with the given account. The instruction may be representative of a request to (i) reset a password of the given account, (ii) terminate active sessions, if any, of the given account, or (iii) reset connections, if any, of the given account with a network associated with the enterprise.

FIG. 8 includes a flow diagram of a process 800 for canonicalizing data acquired from multiple SaaS services that are accessible to employees of an enterprise. Those skilled in the art will recognize that the process 800 is discussed in the context of SaaS services for the purpose of illustration. The process 800 may be similarly applicable if data is acquired from sources other than, or in addition to, SaaS services.

For each of the multiple SaaS services, the threat detection platform can initially acquire data that is related to digital activities that are performed with one of multiple sets of accounts associated with the enterprise (step 801). Each of the multiple sets of accounts may be associated with a different one of the multiple SaaS services. Assume, for example, that the employees are able to access three SaaS services, namely, SaaS Service A, SaaS Service B, and SaaS Service C. In such a scenario, the threat detection platform may acquire, from SaaS Service A, a first dataset regarding digital activities that are performed with a first set of accounts, each of which may be associated with a different one of the employees. Similarly, the threat detection platform may acquire, from SaaS Service B, a second dataset regarding digital activities that are performed with a second set of accounts, and the threat detection platform may acquire, from SaaS Service C, a third dataset regarding digital activities that are performed with a third set of accounts. To acquire the first, second, and third datasets, the threat detection platform may establish a connection with SaaS Services A, B, and C via respective APIs. Thus, the threat detection platform may establish, via a first API, a connection with SaaS Service A via which the first dataset can be downloaded into a local processing environment; establish, via a second API, a connection with SaaS Service B via which the second dataset can be downloaded into the local processing environment; and establish, via a third API, a connection with SaaS Service C via which the third dataset can be downloaded into the local processing environment.

For each of the multiple SaaS services, the threat detection platform can then provide the data, as input, to a standardization mechanism that canonicalizes the data into a data structure having predetermined fields (step 802), so as to produce multiple data structures for the multiple SaaS services. As mentioned above, data structures could be produced on a per-account or per-employee basis rather than a per-service basis in some embodiments. The nature and number of predetermined fields can vary depending on the level of detail provided by each of the multiple SaaS services, but also the level of detail needed by the threat detection platform to ascertain whether a threat exists. For example, if the threat detection platform produces data structures on a per-service basis, then the predetermined fields may include (i) a first field or a first set of fields in which a corresponding set of accounts is specified, (ii) a second field or a second set of fields in which digital activities that were performed with the corresponding set of accounts are specified, (iii) a third field or a third set of fields in which information regarding the context of the digital activities or the corresponding set of accounts is specified, and (iv) a fourth field or a fourth set of fields in which indications of whether remediation action should be taken are specified. At a high level, the third field or the third set of fields may be representative of a space for contextual information related to the digital activities or the corresponding set of accounts. Consider, for example, the afore-mentioned scenario in which data structures are produced on a per-service basis. In such a scenario, a separate data structure may be maintained for each of the multiple SaaS services, such that a first one of the multiple SaaS services is associated with a first data structure, a second one of the multiple SaaS services is associated with a second data structure, etc. In the first data structure, there may be entries that correspond to different digital activities performed with accounts for the first SaaS service. Each of these entries may include a third field—or a third set of fields—that specifies accounts across the other ones of the multiple SaaS services that are associated with the same employee. This contextual information can allow the threat detection platform to better understand connectedness of various accounts across the multiple SaaS services. As another example, the third field—or the third set of fields—may include information regarding a context of the digital activity that is determined, inferred, or otherwise gleaned by the threat detection platform, whereas the second field—or the second set of fields—may simply identify the digital activity itself. Again, the fourth field or the fourth set of fields may remain empty until a determination of risk is made, for example, based on an output produced by a scoring module (e.g., scoring module 108 of FIG. 1).

In some embodiments, the standardization mechanism is an API that is developed and maintained by the threat detection platform. This API may be representative of a software intermediary that allows for many-to-one communication between different SaaS services and the threat detection platform. Alternatively, the threat detection platform may implement multiple APIs, each of which is representative of a software intermediary that allows for one-to-one communication between one of the multiple SaaS services and the threat detection platform. In other embodiments, the standardization mechanism is a model that is trained by the threat detection platform. Like the API, the model may be programmed and trained to allow for many-to-one communication or one-to-one communication. That is, the model may be programmed and trained to standardize data received from a single SaaS service, or the model may be programmed and trained to standardize data received from any of multiple SaaS services.

Thereafter, the threat detection platform can determine, for each account, a likelihood of compromise based on an analysis of the multiple data structures (and more specifically, the digital activities that are performed with each account) (step 803).

FIG. 9 includes a flow diagram of a process 900 in which data acquired from multiple SaaS services is canonicalized and then examined in real time to identify threats to an enterprise. Again, those skilled in the art will recognize that the process 900 is discussed in the context of SaaS services for the purpose of illustration. The process 900 may be similarly applicable if data is acquired from sources other than, or in addition to, SaaS services.

Initially, the threat detection platform can establish a separate connection with each of multiple SaaS services that are accessible to employees of an enterprise (step 901). For example, for each of the multiple SaaS services, the threat detection platform may initiate a connection with a corresponding one of multiple APIs. Each API may be supported by a corresponding one of the multiple SaaS services and allow for communication therewith. For each of the multiple SaaS services, the enterprise may have a separate set of accounts. For example, the enterprise may have a first set of accounts for a first SaaS service and a second set of accounts for a second SaaS service. Accordingly, each of the employees may be associated with multiple accounts (e.g., one account in the first set and one account in the second set). Note that some accounts could be used across different SaaS services. For example, an employee could be associated with a single account that provides access to a first SaaS service and a second SaaS service. In such a scenario, the threat detection platform may still acquire data from the first and second SaaS services as discussed above, though the digital activities performed on the first and second SaaS services may be attributed to a single account rather than multiple accounts associated with the same employee.

The threat detection platform can then canonicalize data received from the multiple SaaS services by populating the data, or analyses of the data (e.g., outputs produced by models), into at least one data structure having predetermined fields (step 902). This can be performed in real time as data is received from the multiple SaaS services, such that a data structure—maintained for an account, an employee, or the enterprise itself—is updated as digital activities are performed. Assume, for example, that the threat detection platform is tasked with creating data structures on a per-employee basis. In such a scenario, each data structure can be updated whenever a digital activity is performed with any of the accounts associated with the corresponding employee. Such an approach allows the threat detection platform to document and then analyze conduct across different SaaS services, in a way that allows for threats—especially cross-services ones—to be detected more reliably and quickly.

Further, the threat detection platform can determine, in real time, whether action is needed to address a threat to the enterprise by continually analyzing the at least one data structure (step 903). For example, for each of the employees, the threat detection platform may apply a model to entries in the at least one data structure that correspond to digital activities performed with accounts associated with that employee. The model may be trained to understand what constitutes normal behavior of that employee with respect to the multiple SaaS services, and therefore can predict whether any of the digital activities represent a deviation from normal behavior.

FIGS. 10A-D include examples of interfaces that show how digital activities can be tracked on a per-employee basis, but in a consistent form, in order to gain a better understanding of which digital activities are normal for each employee of an enterprise. In embodiments where the data can be accessed via APIs, direct enterprise integration (e.g., into the computing environment of an enterprise) and direct service integration (e.g., into the computing environment of a service provider) normally are not necessary.

Learning Behavioral Norms Across Different Services

Another important aspect of the threat detection platform is its ability to learn behavioral norms, on a per-employee basis, across different services. Assume, for example, that the threat detection platform is tasked with learning the behavioral norms of an employee who is able to access two services, namely, a first SaaS service for which she has a first account and a second SaaS service for which she has a second account. In such a scenario, the threat detection platform can acquire a first dataset that is representative of digital activities performed with the first account and a second dataset that is representative of digital activities performed with the second account. As further discussed below, the threat detection platform may attempt to learn not only what constitutes normal behavior with the first account and what constitutes normal behavior with the second account, but also what constitutes normal behavior across the first and second accounts.

Sometimes, a singular digital activity is sufficiently unusual to be flagged as evidence of a threat. Consider, for example, a scenario in which the first account completes a sign-in action in a country where the employee is known or presumed to not be located. However, it may also be the case that multiple digital activities—each of which is slightly or mildly unusual—are not sufficiently unusual when viewed separately but are sufficiently unusual when viewed together. Surfacing these "multi-event behavioral indicators" is not a trivial task, as the threat detection platform not only has to separately gauge the risk of each digital activity but also has to collectively gauge the risk of the multiple digital activities—even if those digital activities are performed across different services.

FIG. 11 includes a flow diagram of a process 1100 for learning what constitutes normal behavior of an employee across multiple services. Initially, the threat detection platform can acquire, via a first API, a first dataset related to past digital activities that are performed with a first account associated with the employee on a first SaaS service and acquire, via a second API, a second dataset related to past digital activities that are performed with a second account associated with the employee on a second SaaS service (step 1101). In some embodiments, the threat detection platform canonicalizes the first and second datasets as discussed above with respect to FIGS. 7-9.

The threat detection platform can then segment the first dataset into a first pair of segments, namely, a first segment that includes a portion of the past digital activities performed with the first account on the first SaaS service and a second segment that includes another portion of the past digital activities performed with the first account on the first SaaS service (step 1102). Similarly, the threat detection platform can segment the second dataset into a second pair of segments, namely, a third segment that includes a portion of the past digital activities performed with the second account on the second SaaS service and a fourth segment that includes another portion of the past digital activities performed with the second account on the second SaaS service (step 1103).

The threat detection platform can then provide the first and third segments—for example, as a concatenated training dataset—to a learning algorithm that produces, as output, a model that is able to predict the likelihood of the first and second accounts being compromised based on an analysis of digital activities performed with the first and second accounts on the first and second SaaS services (step 1104). The model could be, for example, a neural network with weights that are tuned as the learning algorithm learns from an analysis of the first segment, the third segment, and the first and third segments together. This "individual-and-collective learning" allows the model to understand what constitutes normal behavior of the employee in a more holistic manner. By learning from the first and third segments together, the learning algorithm may discover patterns—for example, that the second account generally performs a digital activity, like sending a message to another employee, proximate to the first account performing a digital activity, like receiving an email from that other employee—that would not be discovered if patterns were separately learned for the first and second SaaS services. The threat detection platform may use the second and fourth segments—for example, as a concatenated validating dataset—to validate the model (step 1105). How the model can be trained and validated is further discussed above with respect to FIG. 3. In response to a determination that performance of the model matches a criterion (e.g., exceeds a threshold), the threat detection platform can store the model in a data structure that is associated with the employee or the enterprise (step 1106).

Thereafter, the threat detection platform can use the model to predict the likelihood of either the first account or the second account being compromised. Assume, for example, that the threat detection platform acquires, via the first API, data that relates to one or more digital activities performed with the first account on the first SaaS service. In such a scenario, the threat detection platform can apply the model to the data, so as to generate an output that is representative of a prediction as to whether the first account is compromised. Similarly, if the threat detection platform acquires, via the second API, data that related to one or more digital activities performed with the second account on the second SaaS service, then the model can be applied to the data to generate an output that is representative of a prediction as to whether the second account is compromised. In the event that the output indicates that either the first account or the second account is compromised, the threat detection platform can determine an appropriate remediation action, if any.

Because the model is also trained to understand patterns across the first and second SaaS services, data acquired from the first and second SaaS services could be supplied to the model, together, as input. Thus, the threat detection platform may provide data acquired from the first SaaS service and data acquired from the second SaaS service to the model as input, so as to generate a prediction as to whether the first account or the second account is compromised. Accordingly, the model could be separately applied to each data stream from a source or collectively applied to multiple data streams from multiple sources to glean insights into whether behavior of accounts associated with a single employee across those different sources is normal.

FIG. 12 includes a flow diagram of a process 1200 for training a model—here, a neural network—to learn what constitutes normal behavior for an employee across multiple sources. For the purpose of illustration, the process 1200 is described in the context of SaaS services. However, the process 1200 may be similarly applicable to other types of sources. For example, the process 1200 may be similarly applicable if the neural network is tasked with learning what constitutes normal behavior across a SaaS service and an enterprise network, or a SaaS service and a cloud infrastructure, or a SaaS service, an enterprise network, and a cloud infrastructure.

For each of multiple SaaS services that are accessible to the employee, the threat detection platform can initially acquire data that is related to past activities performed thereon with one of multiple accounts that are associated with the employee (step 1201). Each of the multiple accounts may be associated with a different one of the multiple SaaS services and be permitted to perform digital activities thereon. As discussed above, the data could be provided, as input, to a standardization mechanism that canonicalizes the data into at least one data structure having predetermined fields (step 1202). For example, the data may be canonicalized into a single data structure that serves as a record of digital activities performed by the multiple accounts across the multiple SaaS services. As another example, the data may be canonicalized into multiple data structures, each of which serves as a record of digital activities performed by one of the multiple accounts on one of the multiple SaaS services.

Thereafter, the threat detection platform can train the neural network using the at least one data structure, such that the neural network learns what constitutes normal activity for the employee on each of the multiple SaaS services separately and across the multiple SaaS services collectively (step 1203). Specifically, the neural network may learn behavioral traits of the employee with respect to the multiple SaaS services. These behavioral traits may relate to the time at which a service is accessed, a frequency at which a service is accessed, a location from which a service is accessed, content of communications, recipients of outbound communications, originators of inbound communications, frequency of communications, formatting characteristics of communications, and the like. Generally, the employee is one of multiple employees that are employed by an enterprise, and this process 1200 can be carried out for some or all of the multiple employees. Accordingly, a separate neural network could be trained for each employee of the enterprise—or at least each employee who has at least one account for a service.

This allows the threat detection platform to monitor digital activities performed with accounts associated with the enterprise in real time. Assume, for example, that the threat detection platform acquires, in real time, data that relates to one or more digital activities performed on one of the multiple SaaS services. For each digital activity represented in the data, the threat detection platform can provide a corresponding portion of the data to an appropriate neural network that predicts whether a corresponding account is compromised. The appropriate neural network can be determined by identifying the corresponding account that performed that digital activity, identifying the employee that is associated with the corresponding account, and then identifying the neural network that is trained for the employee.

While the process 1200 is described in the context of training a neural network, those skilled in the art will recognize that the process 1200 may be carried out similarly with a different type of learning algorithm and model.

In sum, the threat detection platform can be programmed to build a separate model for each account based on retrospective information regarding digital activities performed with that account—or each employee based on retrospective information regarding digital activities performed with one or more accounts associated with that employee—in order to better identify instances of compromise in near real time. For example, the threat detection platform may ingest digital activities performed with an account over the last three months, six months, or twelve months and then the threat detection platform may build a model that understands how the account normally completes digital activities such as accessing the enterprise network, communicating internally (e.g., via internal email with other employees), communicating externally (e.g., via external email with vendors), accessing documents, etc. The model may help identify when the behavior of the account has changed.

Such an approach allows the threat detection platform to employ an effective model nearly immediately upon receiving approval from the enterprise to deploy it. Unlike conventional security products that only have access moving forward in time (i.e., after receiving the approval), the threat detection platform may employ a backward-looking approach to develop models that are effective upon deployment. Such an approach also enables the threat detection platform to go through a repository of past digital activities to identify whether any accounts should presently be suspected of compromise.

The aforementioned API-based approach to acquiring data from services for which employees of an enterprise have accounts provides a consistent way of looking at information related to digital activities performed with the accounts. Because the threat detection platform can directly access data related to the digital activities performed with those accounts, the threat detection platform can examine digital activities that are invisible to—or overlooked by—standard integration solutions. For example, a SEG integration that occurs through the mail exchanger ("MX") record will only be able to see external emails arriving from, or destined for, external sources. The only way to make internal email visible to the SEG integration would be to externally reroute the email through the gateway, which generally is not practical. These types of digital activities are visible to the threat detection platform, however, due to how data regarding digital activities is acquired.

Approaches to Documenting and Visualizing Indications of Risk

An important aspect of the threat detection platform is its ability to document and visualize threats discovered through analysis of digital activities. Again, threats may be represented by a single digital activity, called "single-activity behavioral indicators" or "single-event behavioral indicators," or threats may be represented by multiple digital activities, called "multi-activity behavioral indicators" or "multi-event behavioral indicators," performed on a single service or across multiple services.

Consider, for example, a scenario in which the threat detection platform acquires data, in real time, from two services, namely, a first SaaS service and a second SaaS service, and applies models thereto to identify digital activities that are indicative of account compromise. Rather than store information regarding each digital activity represented in the data, the threat detection platform may only store information regarding digital activities for which the output produced by one of the models indicates some variation from normal behavior of the corresponding employee. Accordingly, the outputs produced by the model may be used to filter the digital activities, ensuring that information is stored only for those digital activities that are unusual.

Moreover, the threat detection platform can cause display of a visual indicium of the digital activities for which the output produced by the model indicates some variation from normal behavior of the employee. Referring again to the aforementioned example, the threat detection platform may document unusual digital activities performed across the first and second SaaS services by generating a timeline. With this timeline, threats—especially those evidenced by digital activities across different services—can be more easily detected and impacts thereof understood.

Figure 13:
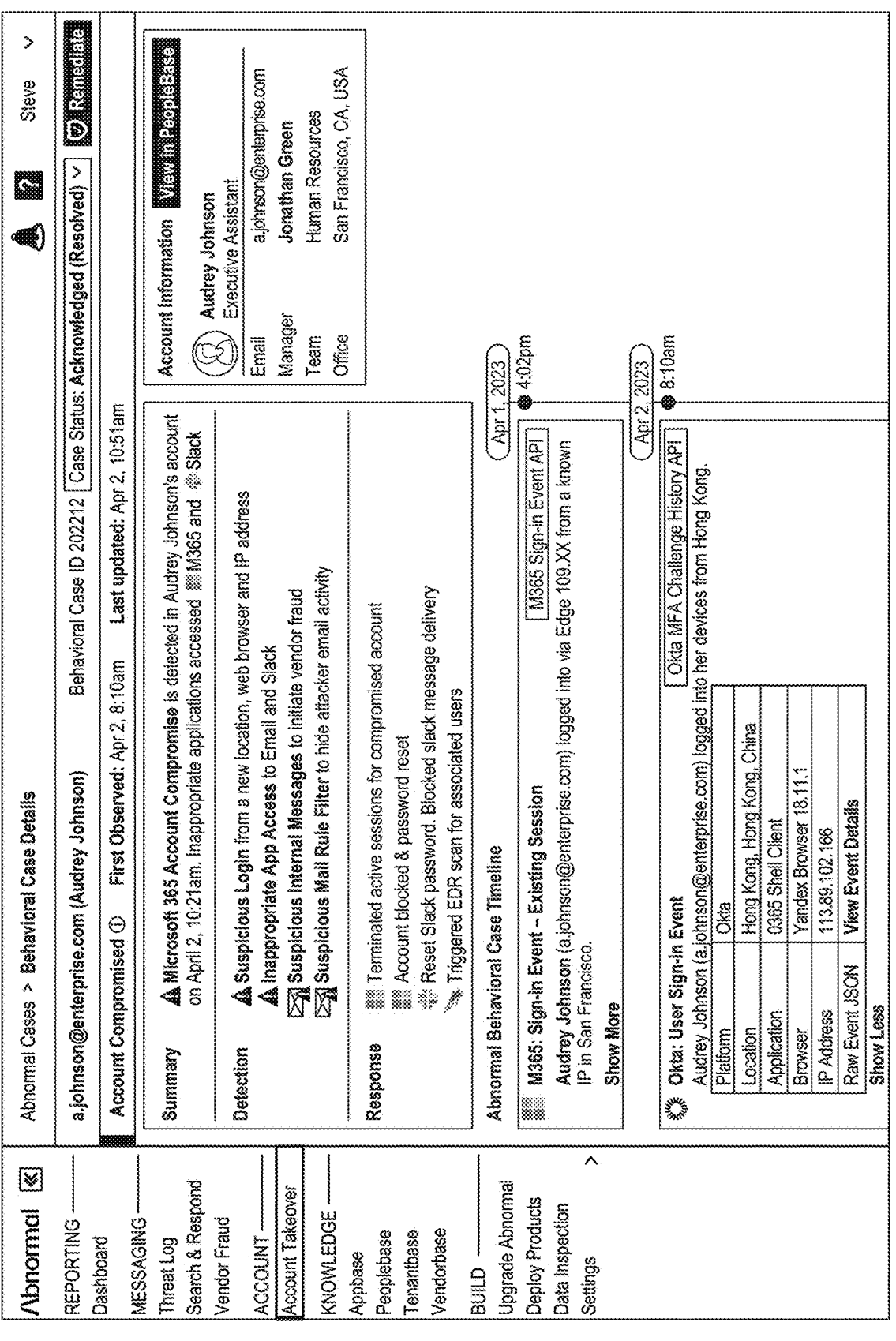
FIG. 13 includes an example of a timeline that can be dynamically updated as new digital activities are performed with accounts associated with an employee, new determinations regarding risk are made, and new remediation actions are performed.
Figure 14:
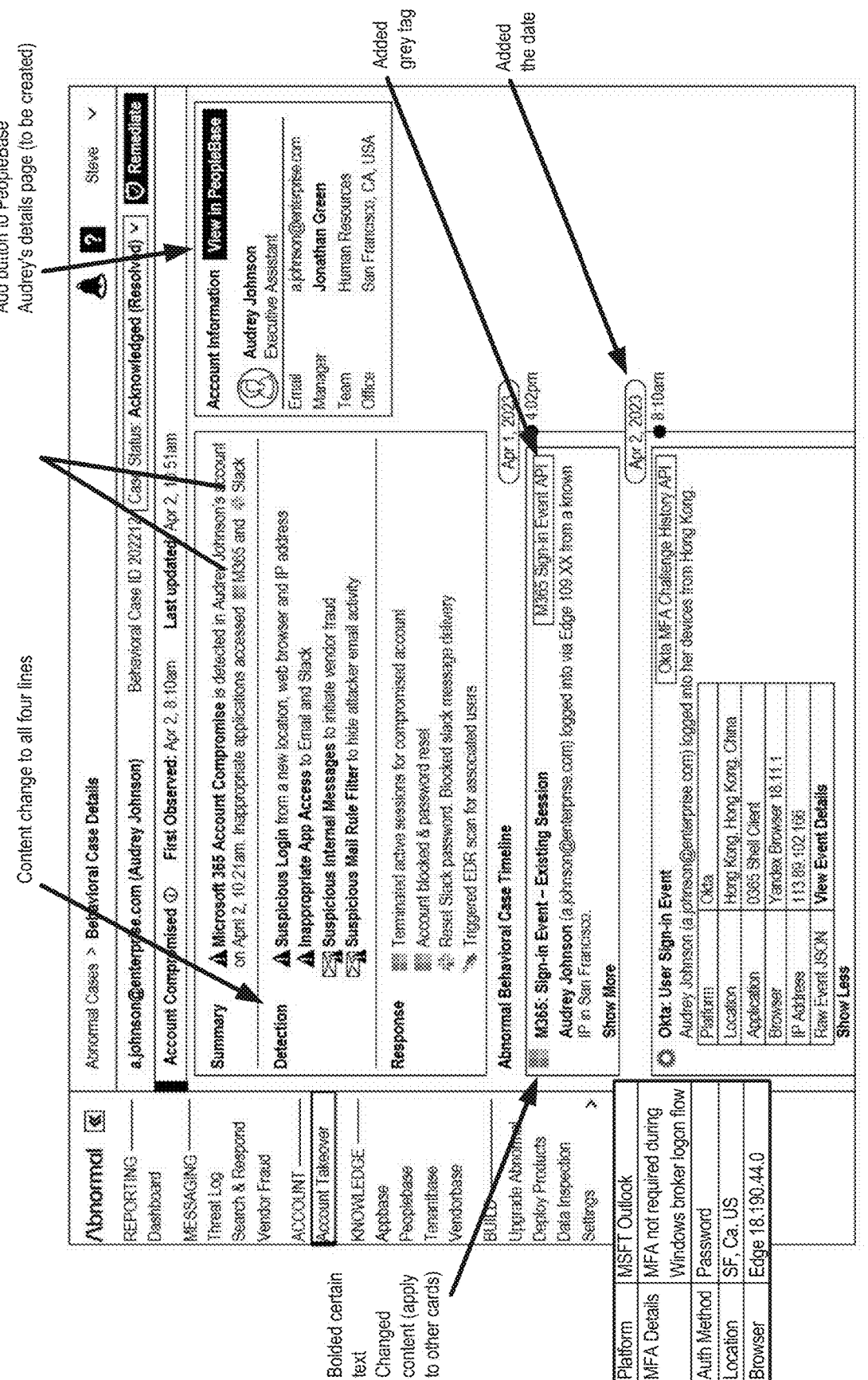
FIG. 14 includes additional notes explaining context that may be added by the threat detection platform to make the timeline more readily comprehensible and more readily actionable.

At a high level, the timeline is representative of a conglomeration of digital activities that might influence a determination as to whether there is a threat. Examples of digital activities include sign-in actions (e.g., with information regarding account, Internet Protocol address, country, etc.), communications (e.g., with information regarding sender, recipient, time of transmission, content, etc.), posture changes (e.g., with information regarding new roles or responsibilities or modifications to access rights), access actions (e.g., of physical locations), and the like. An example of a timeline—which can be dynamically updated as new digital activities are performed with accounts associated with the employee (here, Audrey Johnson), new determinations regarding risk are made, and new remediation actions are performed—is shown in FIG. 13. FIG. 14, meanwhile, includes additional notes explaining context that may be added by the threat detection platform to make the timeline more readily comprehensible and more readily actionable.

For each source from which data is ingested, the threat detection platform can implement a filtration mechanism (also called a "translation mechanism") that outputs, into a data structure, the digital activities that "power" the timeline. Assume, for example, that the threat detection platform acquires data from several SaaS services for which employees of an enterprise have accounts. As discussed above, the threat detection platform can canonicalize the data acquired from each SaaS service and then determine, using models trained for the employees, the degree to which each digital activity deviates from normal behavior. For each SaaS service, the threat detection platform may implement a filtration mechanism that determines which digital activities performed on that SaaS service should be retained and which digital activities performed on that SaaS service should be discarded. Accordingly, the threat detection platform may implement different filtration mechanisms for different types of digital activities, from completing sign-in actions to receiving and transmitting communications and making posture changes.

Figure 16:
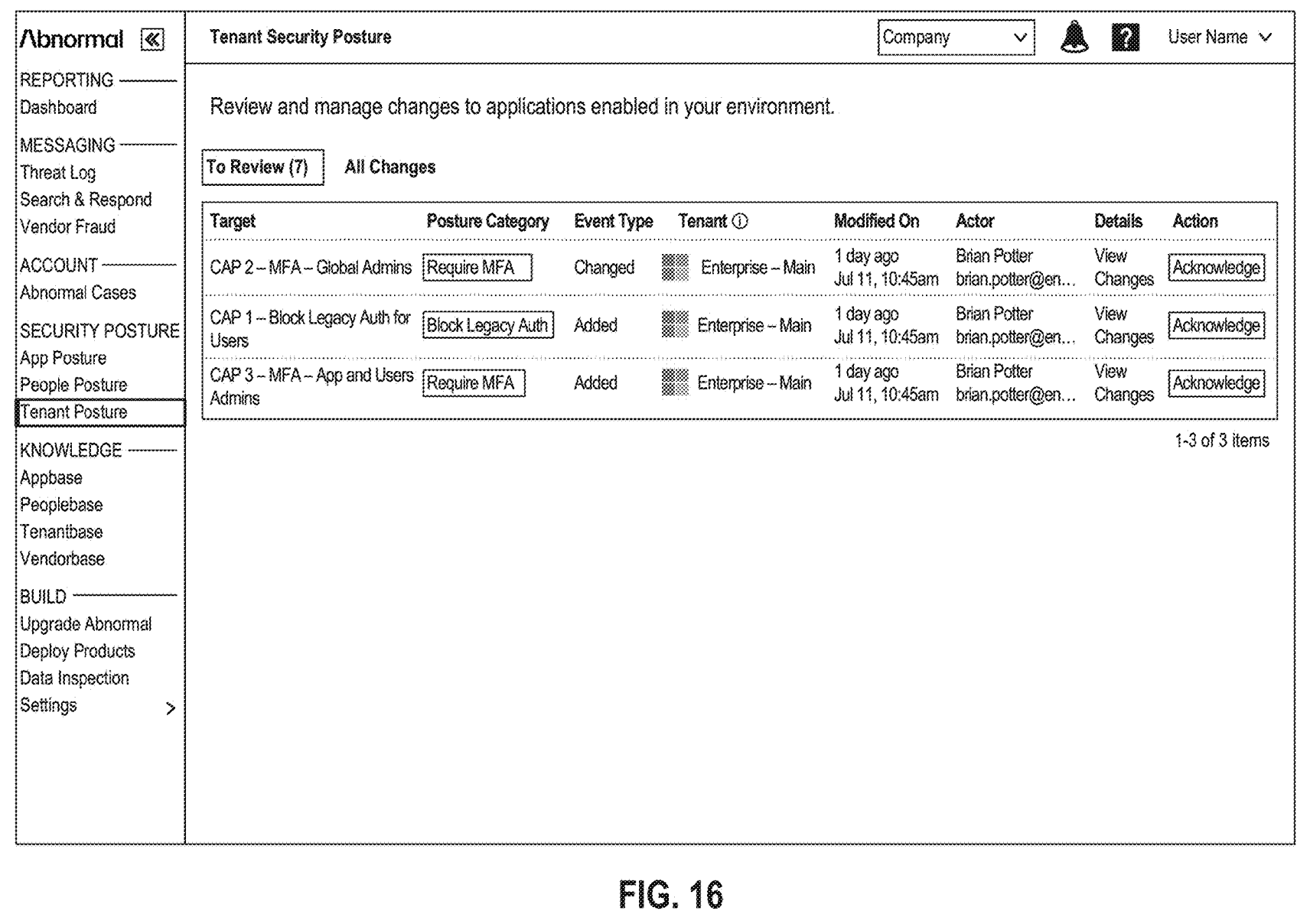
Figure 17:
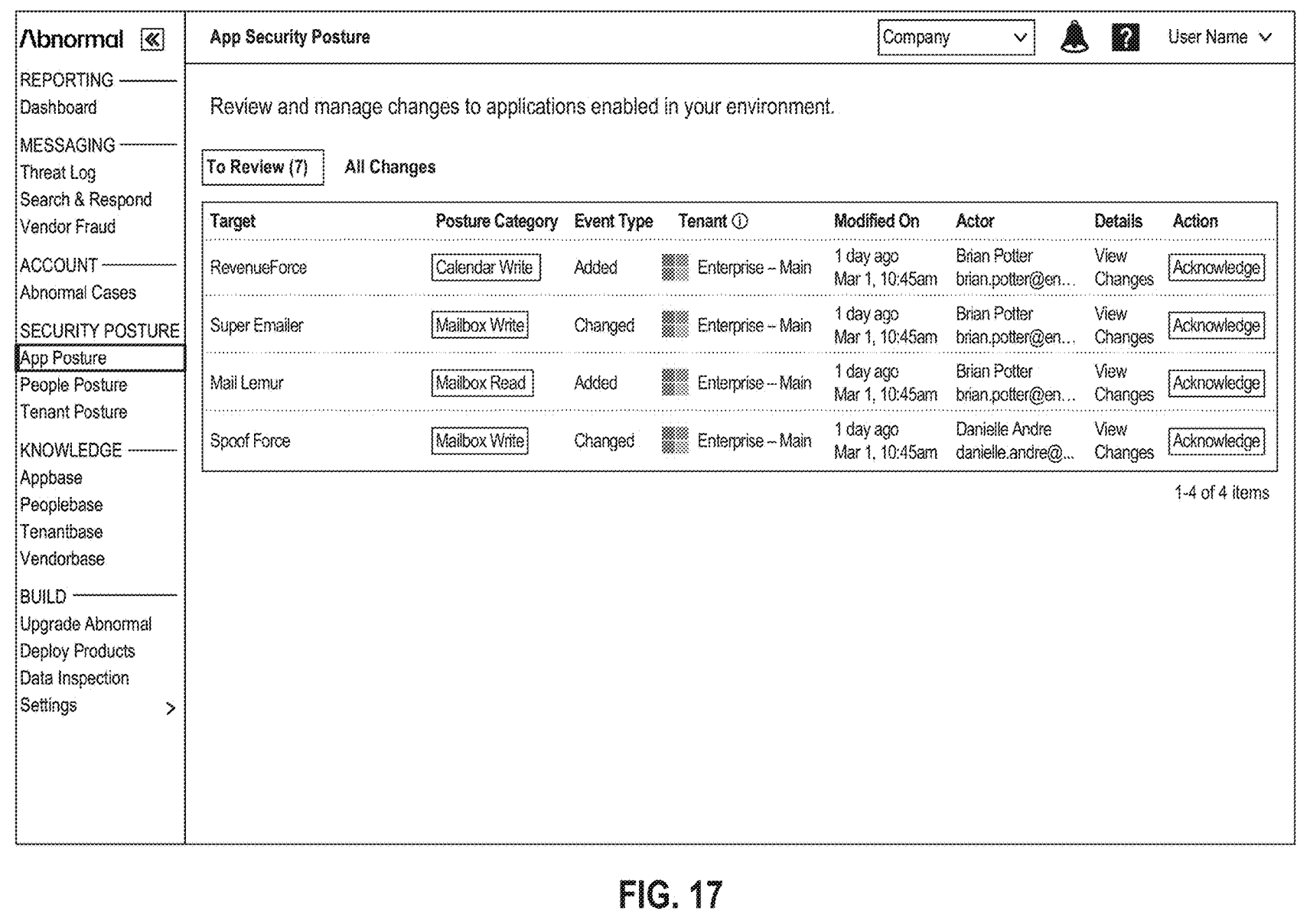

As an example, properly identifying and documenting changes in posture may be important in establishing a log for auditing purposes. FIGS. 15-17 include examples of interfaces that show how posture can be determined and documented by the threat detection platform. Specifically, FIG. 15 illustrates how posture categories established for employees can be monitored to detect changes, FIG. 16 illustrates how policy changes embodied as changes in tenant posture category can be monitored to detect changes, and FIG. 17 illustrates how changes in service availability (here, of an enterprise-wide application) embodied as changes in application posture category can be monitored to detect changes. Simply put, the log may allow for further analysis of when the rights of a given account were changed, as well as how the rights of the given account were changed.

Figure 18:
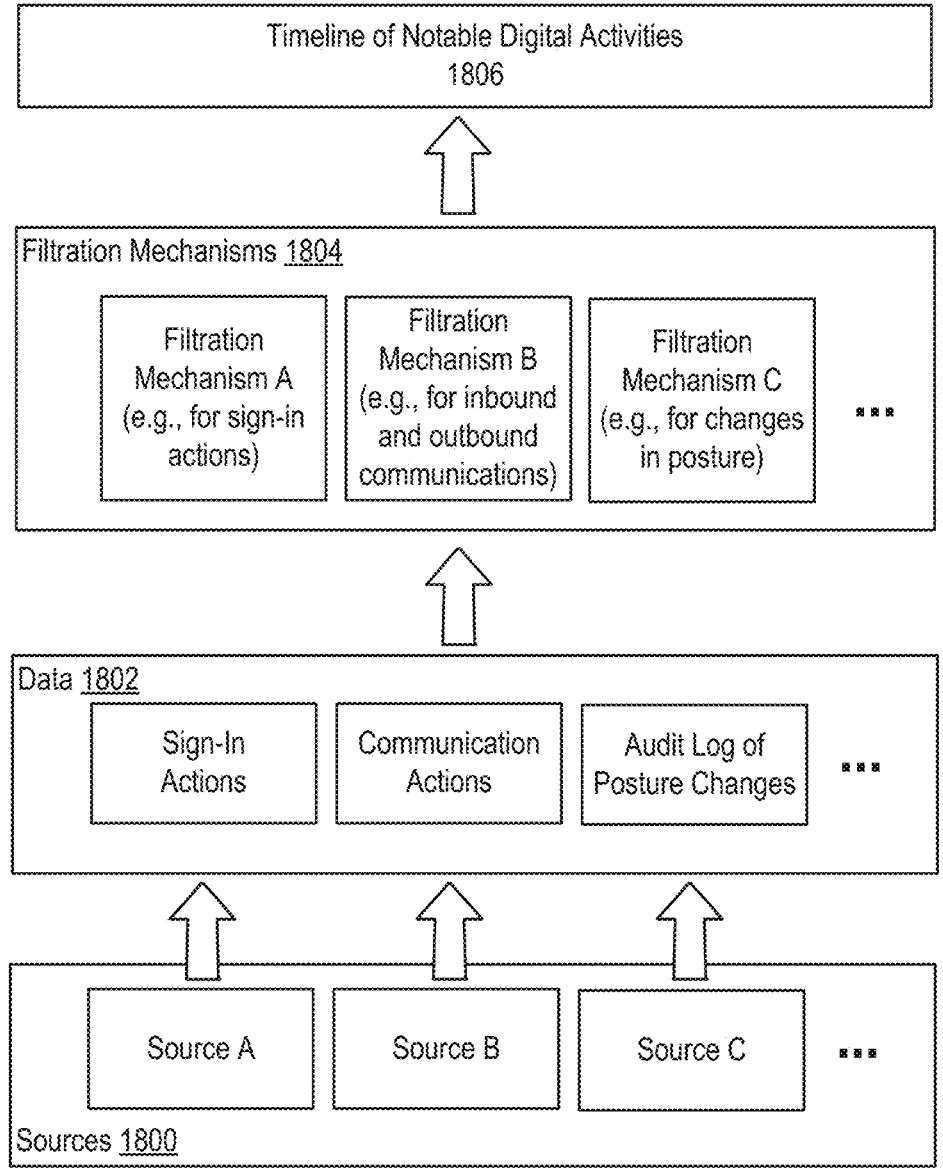
FIG. 18 includes a diagrammatic illustration that shows how the threat detection platform can consume or define digital activities from data acquired from one or more sources, convert the digital activities into per-activity judgments regarding how interesting, critical, or unusual each digital activity is, and then concatenate the per-activity judgments into a standard scheme for identifying notable digital activities.

FIG. 18 includes a diagrammatic illustration that shows how the threat detection platform can consume or define digital activities from data 1802 acquired from one or more sources 1800, convert the digital activities into per-activity judgments regarding how interesting, critical, or unusual each digital activity is, and then concatenate the per-activity judgments into a standard scheme for identifying notable digital activities. Specifically, the threat detection platform can apply filtration mechanisms 1804 to identify those digital activities that are representative of unusual behavior, to at least some degree, and should be populated onto the timeline 1806.

The timeline enables security professionals, such as Chief Information Security Officers ("CISOs"), to utilize the threat detection platform consistently by:

Aggregating digital activities across different sources;

Providing contextual judgment on the entirety of the multi-activity timeline, rather than sporadic or isolated judgment of individual digital activities; and Allowing for artificial intelligence ("AI") augmentation with tools that boost productivity, for example, by assisting with dynamic consideration of new digital activities.

Figure 10C:
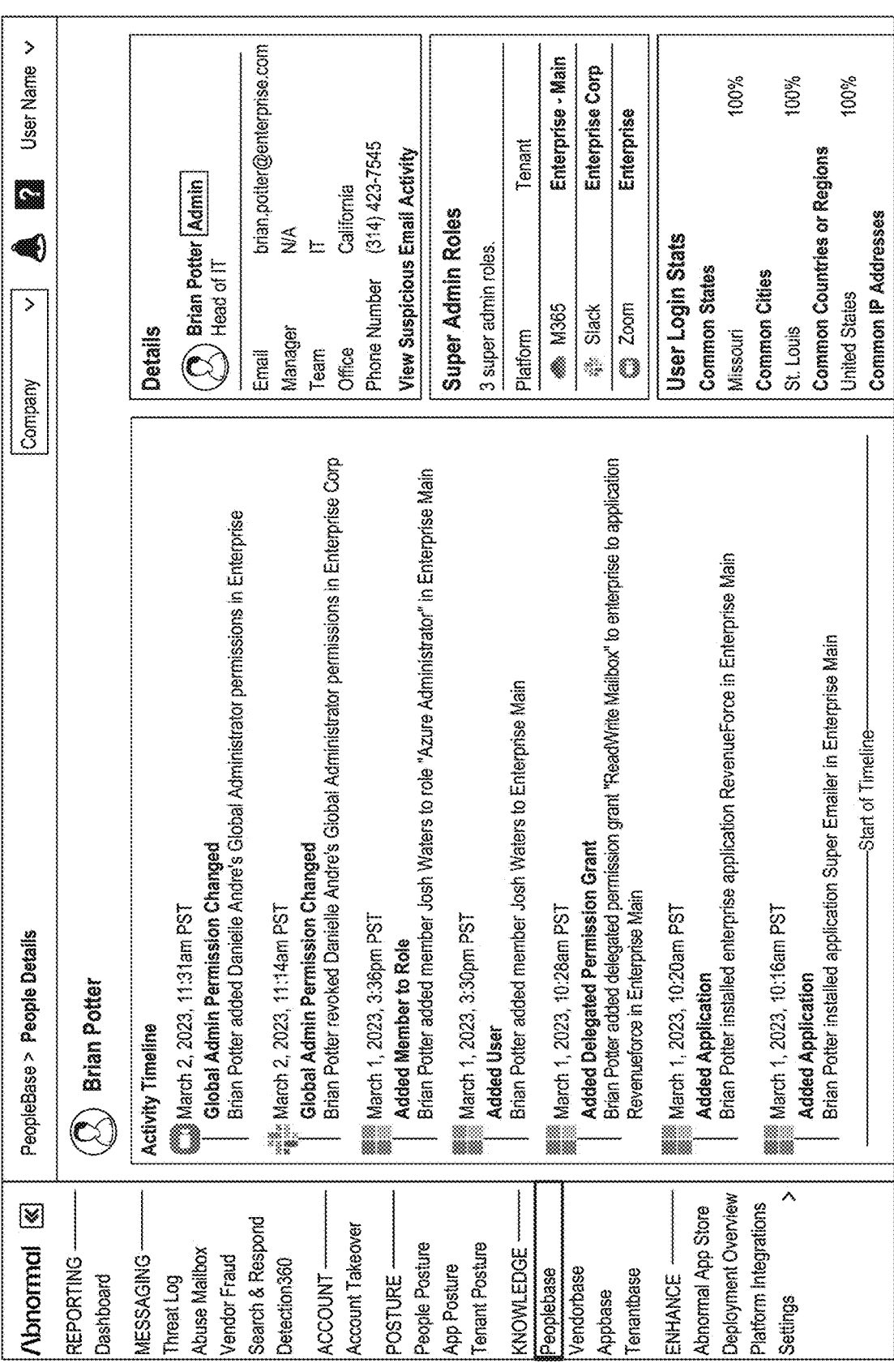
Figure 10D:
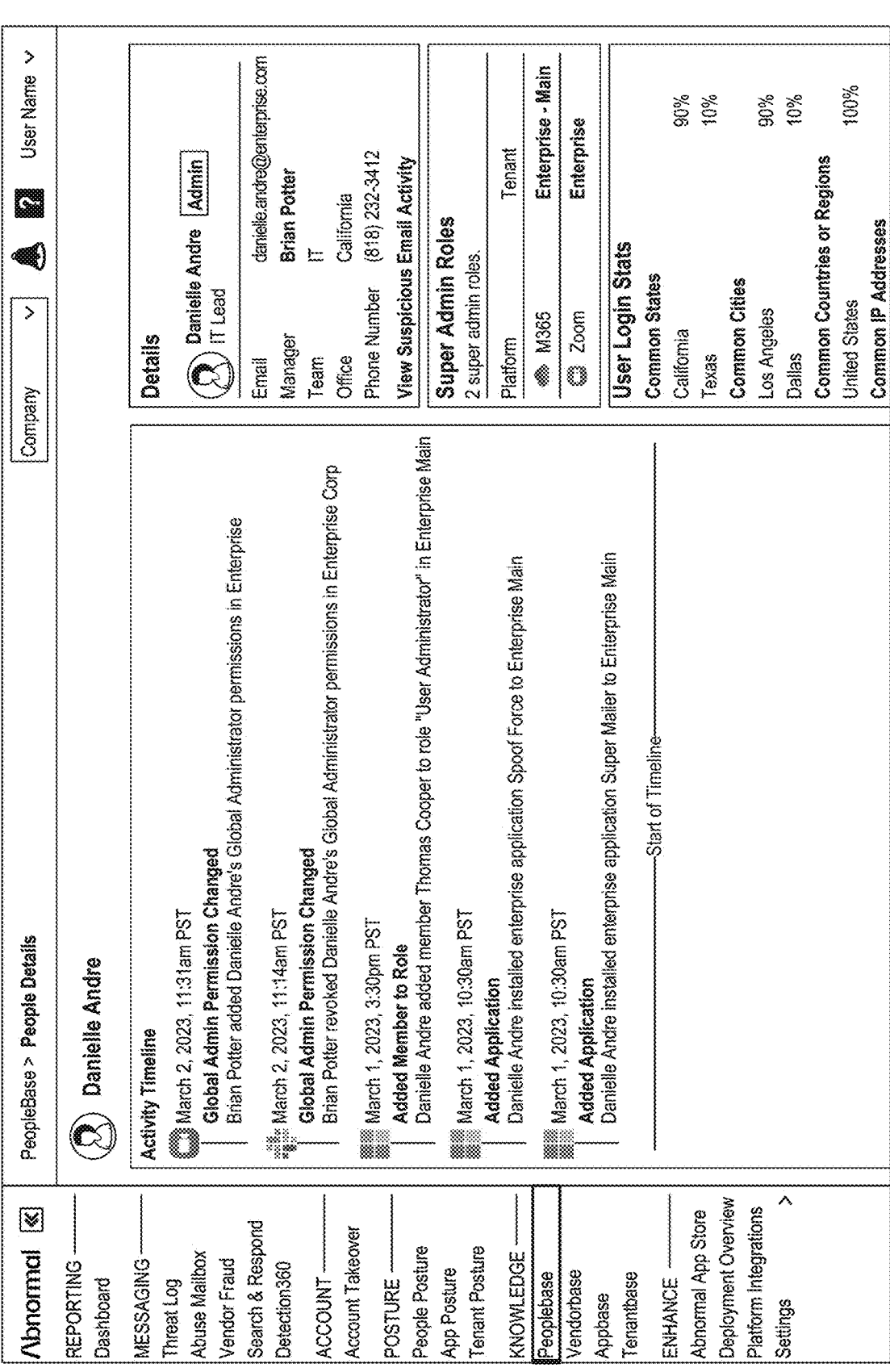
Figure 19:
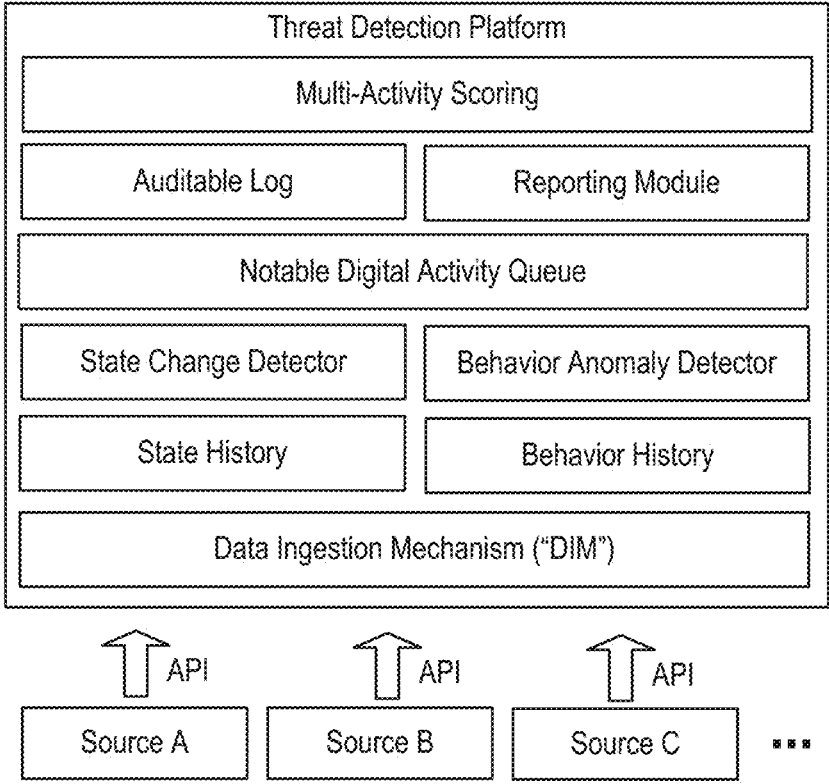
FIG. 19 shows how the threat detection platform can approach detecting and flagging anomalous digital activities by implementing a layered approach, where digital activities are initially examined to ascertain whether each digital activity is representative of a meaningful change in state or unusual behavior and then those notable digital activities are loaded into a queue.

Consider, for example, a scenario in which the threat detection platform discovers a combination of events—say, a change in administrative privileges and a sign-in action from an unusual location (e.g., another country)—that are collectively indicative of a threat. Rather than have a security professional develop a theory and prepare a summary of events, the threat detection platform could instead automatically generate documentation (e.g., in the form of a slide or memorandum) that summarizes its findings. The documentation could be based on preexisting templates, or the documentation could be generated through the use of generative AI. The ability to assist security professionals in documenting and explaining threats may be called the "threat hunter tool." At a high level, the threat hunter tool is representative of a user experience ("UX") layer that resides on top of the timeline. The threat hunter tool may be accessible to, or part of, a reporting module (e.g., reporting module 114 of FIG. 1). Users may be able to access an interface that is generated by the threat detection platform, review notable digital activities, and generate cases (e.g., summarizing the nature of the threat, confidence in the determination, severity of the threat, etc.) without much—or any—input from those users. The threat hunter tool serves several purposes. First, it allows threats to be more quickly documented, leading to quicker resolution or remediation. Second, it allows threats to be documented in a more consistent manner. Simply put, the reports produced by the threat detection platform may have consistent format or content, allowing the reports to be more efficiently reviewed. Third, it allows for improved stratification of threats, as only those threats for which risk exceeds a threshold (e.g., severe threats and moderate threats) may be elevated for consideration by a security professional. That is, the threat detection platform may autonomously triage threats so that those threats most likely to cause meaningful harm are reviewed by a security professional more quickly, though the threat detection platform may still allow the security professional to review digital activities at a deeper level if desired. FIG. 19 shows how the threat detection platform can approach detecting and flagging anomalous digital activities by implementing a layered approach, where digital activities are initially examined to ascertain whether each digital activity is representative of a meaningful change in state or unusual behavior and then those notable digital activities are loaded into a queue. Digital activities loaded into the queue may not only be visualized in a timeline, as shown in FIGS. 10B-D, but may also be documented in a data structure. The threat detection platform may maintain data structures with information regarding notable digital activities—or analyses thereof—on a per-account, per-employee, or per-enterprise basis.

FIG. 20 includes a flow diagram of a process 2000 for surfacing indications of risk discovered through analysis of digital activities performed with multiple accounts associated with an employee across multiple services. For each of the multiple SaaS services, the threat detection platform can initially acquire data relating to digital activities performed with a corresponding one of the multiple accounts (step 2001) and canonicalize the data into a standardized format (step 2002), as discussed above. Moreover, the threat detection platform can apply a model trained for the employee to the resulting data structure(s) (step 2003), so as to produce outputs that indicate whether each digital activity deviates from a behavioral pattern learned to be normal for the employee. In embodiments where a separate data structure is maintained for each of the multiple SaaS services, the model can be applied to each data structure separately and/or the model can be applied to the multiple data structures collectively. Said another way, the model can be designed and trained to be separately applied to data that is streamed from each SaaS service or collectively applied to multiple streams of data to glean insights into whether behavior on a single SaaS service is normal and whether behavior across multiple SaaS services is normal.

The threat detection platform can then identify digital activities, if any, for which the output produced by the model indicates a variation from the normal behavior of the employee (step 2004). This can be accomplished by determining whether the output matches a criterion—which will depend on the nature of the model (e.g., whether the model is a binary classification model, non-binary classification model, or regression model). For each of the identified digital activities, the threat detection platform can store information related to that identified digital activity in a data structure associated with the enterprise, employee, or account with which that identified digital activity was performed (step 2005). Moreover, the threat detection platform can cause display of a visual indicium of that identified digital activity on an interface (step 2006). For example, information regarding that identified digital activity may be posted to a timeline, on which digital activities are arranged in temporal order to visually indicate activity level and threat over time. Specifically, the threat detection platform may create, for each identified digital activity, the visual indicium that includes at least some of the information and then arrange the visual indicia in temporal order so as to generate the timeline as shown in FIGS. 10B-D.

In some embodiments, insights can be gleaned by the threat detection platform through analysis of the timeline or the data structure.

For example, the threat detection platform may determine that one of the multiple accounts is at higher risk of being compromised due to an increasing frequency of unusual digital activities. In such a scenario, the threat detection platform may generate a summary of the threat posed by compromise of a given one of the multiple accounts. That summary could specify the primary entity and one or more digital activities that resulted in the determination being made. Generally, the primary entity is one of the multiple accounts that is suspected of being compromised. However, the primary entity could also be another account associated with another employee that is being targeted via one of the multiple accounts. The primary entity could also be a communication or a document that is involved in the one or more digital activities.

As another example, the threat detection platform may determine that the model requires retraining if a given number or percentage of digital activities deemed to be unusual are marked as normal through the interface. Such action may be representative of an acknowledgment that changes in behavior of the employee are normal, and therefore should be taken into account by the model through retraining.

Accordingly, the threat detection platform may generate visualizations—like timelines as shown in FIGS. 10B-D—to better help users understand the threat posed by singular digital activities and the threat posed by more coordinated attacks across multiple accounts.

Together, multiple digital activities in the timeline may define a "case" that exhibits characteristics of an attack. Generally, the core components include (i) a primary entity, (ii) a series of notable digital activities, and (iii) a judgment (and in some embodiments, a prediction of attack type and/or a prediction of attack severity). Generally, the primary entity is an employee, an account, or a document, depending on the type of digital activity (and therefore, the nature of the source from which the data representing the digital activity is acquired). However, the primary entity could be another type of object or even a piece of information. For example, if a digital activity is representative of a transmission or receipt of a communication, then the primary entity may be the person that is associated with the account that transmitted or received the communication. As another example, if a digital activity is representative of a sign-in action for a service through which information is accessed, then the primary entity may be the information. Meanwhile, the series of notable digital activities may include any digital activities involving the primary entity that have been determined to be unusual. Digital activities that have been deemed normal may be discarded by the threat detection platform to conserve computational resources, and therefore may not be recorded in the timeline.

The timeline allows the threat detection platform to use its core infrastructure, as discussed above with reference to FIGS. 1-3, across different use cases (e.g., from business email compromise to internal phishing to account takeover), across different services (e.g., from communication services to non-communication services), etc. By aggregating digital activities for a primary entity, the threat detection platform allows for higher-order determinations such as:

External Attacker Risk: Establish whether account(s) associated with a given employee are at risk from an external attacker;

Insider Attacker Risk: Establish whether account(s) associated with a given employee are being leveraged to do internal harm; and Document Risk: Establish whether there is a trend line (e.g., in terms of which employees have accessed the document, the frequency of access events, etc.) for a given document that makes the given document a high-priority issue.

Performing these higher-order determinations allows the threat detection platform to emulate security analysts in two key respects. First, the threat detection platform can ascertain whether multiple digital activities-when considered in combination with one another—are indicative of a threat. Second, the threat detection platform can monitor digital activities occurring across different services, which can be—and often are—entirely unrelated to each other. However, the threat detection platform can monitor digital activities across different platforms in real time—something security analysts simply cannot do—and, therefore, is also able to identify and address threats in real time. Moreover, the threat detection platform can more consistently and accurately identify the digital activities that are unusual. Security analysts tend to have "false positives," where a digital activity is determined to be unusual despite being normal, and "false negatives," where a digital activity is determined to be normal despite being unusual, due to the subjective nature of identifying threats.

Ascertaining Behavioral Deviations Through Multi-Activity Scoring

A significant benefit of the approach to detecting threats introduced here is that the threat detection platform can discover deviations in behavior within a single service, as well as deviations in behavior across multiple services. To accomplish this, the threat detection platform can employ a multi-activity scoring methodology, where digital activities are scored individually and collectively, to ascertain risk in near real time. Consider, for example, a scenario in which the threat detection platform applies a model to data streamed from a first SaaS service for which an employee has a first account and data streamed from a second SaaS service for which the employee has a second account. Over time, the model will output a series of predictions, in temporal order, as digital activities are performed with the first and second accounts. In determining whether the first account is compromised, the threat detection platform may consider not only its most recent digital activity but also other, less recent digital activities (and potentially digital activities performed with the second account, as discussed above). This methodology for "multi-activity scoring" may be adaptive, such that the scores are sensitive to timeliness. For example, in determining whether the first account is compromised, the threat detection platform may consider all digital activities performed with the first account within a predetermined interval of time (e.g., one day, three days, seven days), placing more weight on more recent digital activities. As another example, the determination may be sensitive to increasing "unusualness." For example, the threat detection platform may determine that first and second digital activities are mildly unusual separately but, in combination, are highly unusual. In such a scenario, the combination of the first and second digital activities can be viewed as a stronger indicator that a threat exists.

Multi-event scoring may depend on accurately identifying digital activities by parsing data acquired from different sources and then sorting those digital activities—generally by account or employee—so that digital activity of a given person across multiple services can be better understood by the threat detection platform. Accordingly, the threat detection platform may establish relationships between accounts and then programmatically associate accounts corresponding to the same person. For example, the threat detection platform may specify, in a data structure (e.g., a table), that a first account for a first source (e.g., a first SaaS service) is associated with the same person as a second account for a second source (e.g., a second SaaS service). This data structure—which maps employees to accounts—can serve as a reference for identifying the appropriate model upon receiving data regarding a digital activity performed with a given account from a source. Establishing—or at least knowing—the relationships between accounts across different services is an important aspect of monitoring digital activities of employees across those different services. Digital activities of each employee can then be scored by the threat detection platform in real time as discussed above.

FIG. 21 includes a flow diagram of a process 2100 for determining the threat posed to an enterprise through analysis of digital activities performed with multiple accounts associated with an employee across multiple SaaS services. For each of the multiple SaaS services, the threat detection platform can initially acquire data relating to digital activities performed with a corresponding one of the multiple accounts (step 2101) and canonicalize the data into a standardized format (step 2102), as discussed above. Moreover, the threat detection platform can apply a model trained for the employee to the resulting data structure(s) (step 2103), so as to produce outputs that indicate whether each digital activity deviates from a behavioral pattern learned to be normal for the employee.

Through analysis of the outputs, the threat detection platform can identify a first digital activity for which a first output produced by the model indicates a variation from the normal behavior of the employee with respect to a first one of the multiple accounts on a first one of the multiple SaaS services (step 2104). Moreover, the threat detection platform can identify a second digital activity for which a second output produced by the model indicates a variation from the normal behavior of the employee with respect to a second one of the multiple accounts on a second one of the multiple SaaS services (step 2105). In such a scenario, the threat detection platform can establish the likelihood of the first account or second account being compromised based on an analysis of the first and second outputs separately and collectively (step 2106). Said another way, the threat detection platform can determine whether the first account is compromised based on an analysis of the first output and based on an analysis of the first and second outputs, and the threat detection platform can determine whether the second account is compromised based on an analysis of the second output and based on an analysis of the first and second outputs. Note that the likelihood of account compromise can be established in a similar manner if the first and second outputs are produced for digital activities performed on the same SaaS service. Moreover, while the process 2100 has been described in the context of two digital activities, the process 2100 may be similarly applicable to scenarios in which the threat detection platform is considering three digital activities, four digital activities, or more than four digital activities.

Consider, for example, a scenario in which the model outputs scores within a predetermined range (e.g., 0-1 or 0-100), where higher scores correlate to a higher degree of abnormality with respect to the baseline established for the employee. Note that, in some embodiments, lower scores may correlate to a higher degree of abnormality with respect to the baseline established for the employee. In this scenario, the first output is representative of a first score that indicates the degree to which the first digital activity varies from the normal behavior of the first account on the first SaaS service, and the second output is representative of a second score that indicates the degree to which the second digital activity varies from the normal behavior of the second account on the second SaaS service. The threat detection platform can compare the first score against a first threshold to establish whether the first digital activity differs from normal behavior of the first account on the first SaaS service by at least a certain amount, compare the second score against a second threshold to establish whether the second digital activity differs from normal behavior of the second account on the second SaaS service by at least a certain amount, and compare a sum of the first and second scores against a third threshold. The threat detection platform can determine that a given one of the first and second accounts is compromised in response to a determination that (i) the first score exceeds the first threshold, (ii) the second score exceeds the second threshold, or (iii) the sum of the first and second scores exceeds the third threshold. In response to determining that the given account is compromised, the threat detection platform can generate a notification or perform a remediation action as discussed above.

In some embodiments, the threat detection platform establishes the likelihood of account compromise in an adaptive manner. For example, the threat detection platform may weigh the scores such that scores indicative of higher variance from normal behavior are weighted more heavily. Additionally or alternatively, the threat detection platform could weigh more recent scores more heavily, so that determinations are more responsive to changes in behavior.

The threat detection platform may implement heuristics or rules that function as filters on the number or type of digital activities that can be considered in determining the likelihood of account compromise. For example, upon discovering that the prediction from the model indicates that a given digital activity is unusual, the threat detection platform may—by default—consider all other unusual digital activities occurring within a preceding interval of time having a known duration. Thus, the threat detection platform may consider other unusual digital activities—occurring on the same service or a different service-within one day, three days, or seven days. However, those unusual digital activities that occur outside of that interval of time may not be considered. Attacks are rarely carried out over long periods of time, and therefore limiting the "window" at which the threat detection platform looks is unlikely to impact its ability to address threats but can result in meaningful savings in terms of computational resources.

In sum, the threat detection platform can employ multi-activity scoring methodology to determine whether multiple digital activities performed with the same account on the same service are indicative of a threat and whether multiple digital activities performed with different accounts on different services are indicative of a threat. By applying a model to data related to digital activities performed with accounts associated with an employee, the threat detection platform can characterize the risk posed by each of those digital activities. Specifically, the model can output a separate prediction for each of those digital activities, such that a series of predictions are output—in temporal order—over time. For each prediction (and therefore, each digital activity), the threat detection platform can establish whether the corresponding account is compromised based on an analysis of that prediction on its own and an analysis of predictions made for prior digital activities performed with the corresponding account and/or predictions made for prior digital activities performed with other accounts associated with the employee.

Central Remediation of Threats

Another benefit of this approach to identifying threats is that the threat detection platform can allow for simple remediation of threats, even those bridging multiple services. For example, the threat detection platform could take the same action (e.g., suspension) for accounts associated with the same person across different services, or the threat detection platform could take different actions (e.g., suspension for an account with a non-communication service and diversion and review of outgoing communications for an account with a communication service) for accounts associated with the same person across different services. Additionally or alternatively, the threat detection platform may notify an individual associated with the enterprise (e.g., a member of the IT department) or an individual associated with a security service that remediation of one or more accounts may be necessary.

Processing System

Figure 22:
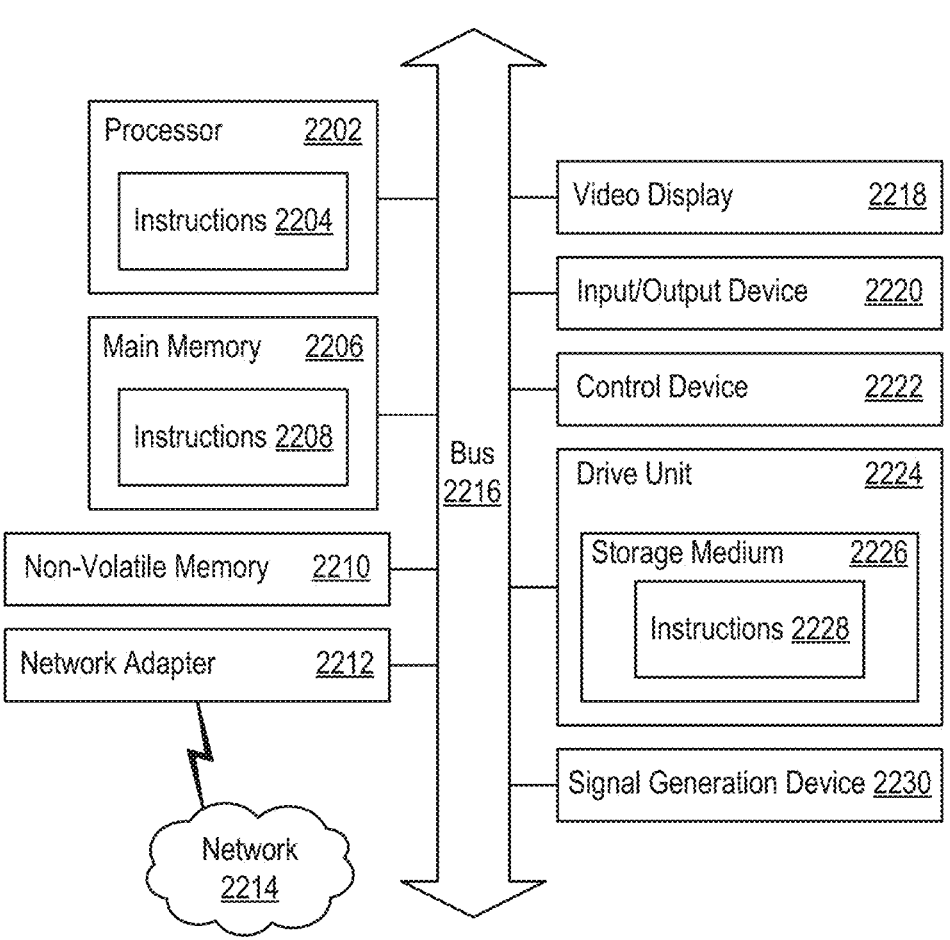
FIG. 22 is a block diagram illustrating an example of a processing system in which at least some operations described herein can be implemented.

FIG. 22 is a block diagram illustrating an example of a processing system 2200 in which at least some operations described herein can be implemented. For example, components of the processing system 2200 may be hosted on an electronic device that includes a threat detection platform (e.g., threat detection platform 100 of FIG. 1).

The processing system 2200 may include a processor 2202, main memory 2206, non-volatile memory 2210, network adapter 2212, video display 2218, input/output device 2220, control device 2222 (e.g., a keyboard, pointing device, or mechanical input such as a button), drive unit 2224 that includes a storage medium 2226, or signal generation device 2230 that are communicatively connected to a bus 2216. The bus 2216 is illustrated as an abstraction that represents one or more physical buses and/or point-to-point connections that are connected by appropriate bridges, adapters, or controllers. The bus 2216, therefore, can be a system bus, Peripheral Component Interconnect ("PCI") bus, PCI-Express bus, HyperTransport bus, Industry Standard Architecture ("ISA") bus, Small Computer System Interface ("SCSI") bus, Universal Serial Bus ("USB"), Inter-Integrated Circuit ("I²C") bus, or bus compliant with Institute of Electrical and Electronics Engineers ("IEEE") Standard 1394.

The processing system 2200 may share a similar computer processor architecture as that of a computer server, router, desktop computer, tablet computer, mobile phone, video game console, wearable electronic device (e.g., a watch or fitness tracker), network-connected ("smart") device (e.g., a television or home assistant device), augmented or virtual reality system (e.g., a head-mounted display), or another electronic device capable of executing a set of instructions (sequential or otherwise) that specify action(s) to be taken by the processing system 2200.

While the main memory 2206, non-volatile memory 2210, and storage medium 2226 are shown to be a single medium, the terms "storage medium" and "machine-readable medium" should be taken to include a single medium or multiple media that stores one or more sets of instructions 2204, 2208, 2228. The terms "storage medium" and "machine-readable medium" should also be taken to include any medium that is capable of storing, encoding, or carrying a set of instructions for execution by the processing system 2200.

In general, the routines executed to implement the embodiments of the present disclosure may be implemented as part of an operating system or a specific application, component, program, object, module, or sequence of instructions (collectively referred to as "computer programs"). The computer programs typically comprise one or more instructions (e.g., instructions 2204, 2208, 2228) set at various times in various memories and storage devices in an electronic device. When read and executed by the processor 2202, the instructions cause the processing system 2200 to perform operations to execute various aspects of the present disclosure.

While embodiments have been described in the context of fully functioning electronic devices, those skilled in the art will appreciate that the various embodiments are capable of being distributed as a program product in a variety of forms. The present disclosure applies regardless of the particular type of machine- or computer-readable medium used to actually cause the distribution. Further examples of machine- and computer-readable media include recordable-type media such as volatile memory, non-volatile memory 2210, removable disks, hard disk drives ("HDDs"), optical disks (e.g., compact disc read-only memory ("CD-ROMs") and Digital Versatile Discs ("DVDs")), cloud-based storage, and transmission-type media such as digital and analog communication links.

The network adapter 2212 enables the processing system 2200 to mediate data in a network 2214 with an entity that is external to the processing system 2200 through any communication protocol supported by the processing system 2200 and the external entity. The network adapter 2212 can include a network adapter card, a wireless network interface card, a switch, a protocol converter, a gateway, a bridge, a hub, a receiver, a repeater, or a transceiver that includes an integrated circuit (e.g., enabling communication over Bluetooth or Wi-Fi)

Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method performed by a threat detection platform for surfacing indications of risk discovered through analysis of digital activities performed with multiple accounts associated with an individual across multiple Software-as-a-Service (SaaS) services, the method comprising:

for each of the multiple SaaS services, acquiring, via a corresponding one of multiple application programming interfaces (APIs), data relating to digital activities performed with a corresponding one of the multiple accounts; and canonicalizing the data into a standardized format such that:

(i) each of the digital activities is represented by a separate data structure, and (ii) a series of data structures, having the same form and arranged in temporal order, is created for each of the multiple SaaS services;

applying a machine learnt model to the multiple series of data structures created for the multiple SaaS services, wherein the machine learnt model is trained to understand what constitutes normal behavior of the individual with respect to the multiple SaaS services;

identifying digital activities for which an output produced by the machine learnt model indicates a variation from the normal behavior of the individual;

for each of the identified digital activities, storing information related to that identified digital activity in a data structure; and causing display, on an interface, of a text-based visual indicium that includes (i) a natural language description of that identified digital activity and (ii) an indication of a SaaS service of the multiple SaaS services that is associated with that identified digital activity; and generating a timeline by arranging text-based visual indicia produced for the identified digital activities in temporal order for display on the interface.

2. The method of claim 1, further comprising:

determining, based on an automated analysis of the timeline, that a given account of the multiple accounts is likely to have been compromised.

3. The method of claim 2, further comprising:

generating, in response to said determining, a summary of a threat posed by compromise of the given account, wherein the summary specifies (i) a primary entity and (ii) one or more digital activities that resulted in the determination being made.

4. The method of claim 3, wherein the primary entity is the individual, the given account, or a communication or a document involved in the one or more digital activities.

5. The method of claim 1, wherein the data is streamed from the multiple SaaS services via the multiple APIs as the digital activities are performed, and wherein said applying, said identified, said storing, and said causing are performed in real time, such that the timeline is updated in real time.

6. The method of claim 1, wherein the timeline allows for aggregated viewing and analyzing of the identified digital activities performed across the multiple SaaS services.

7. The method of claim 1, wherein the individual is one of multiple employees of an enterprise, and wherein said acquiring, said canonicalizing, said applying, said identifying, said storing, and said causing are performed for each of the multiple employees, such that a separate timeline is generated for each of the multiple employees.

8. The method of claim 1, wherein the data is acquired from the multiple SaaS services in real time as the digital activities are performed with the multiple accounts, and wherein said canonicalizing, said applying, said identifying, said storing, and said causing are performed in response to said acquiring, such that the timeline is dynamically updated, so as to allow a user to monitor activity across the multiple SaaS services in real time.

9. The method of claim 1, further comprising:

receiving input that is indicative of an instruction, provided through interface, to address compromise of an account of the multiple accounts through execution of a remediation action.

10. The method of claim 9, wherein the individual is an employee of an enterprise, wherein the instruction is representative of a request to (i) reset a password of the account, (ii) terminate active sessions, if any, of the account, or reset connections, if any, of the account with a network associated with the enterprise.

11. The method of claim 10, further comprising:

for each of the identified digital activities, transmitting a notification to an appropriate person in real time, so that the appropriate person is able to immediately address any potential threat.

12. The method of claim 11, wherein the appropriate person is a security professional that is associated with the enterprise.

13. The method of claim 11, wherein the appropriate person is the individual with a corresponding account that performed that identified digital activity.

\* \* \* \* \*